US011186347B1

(12) United States Patent
Levin

(10) Patent No.: US 11,186,347 B1
(45) Date of Patent: Nov. 30, 2021

(54) ADJUSTABLE FRAME FOR ALLOWING A BACKREST TO RECLINE, A COMBINATION ADJUSTABLE FRAME AND VEHICLE AND/OR SEAT FRAME, AND/OR A METHOD OF USE THEREOF

(71) Applicant: Eric Martin Levin, Severna Park, MD (US)

(72) Inventor: Eric Martin Levin, Severna Park, MD (US)

( * ) Notice: Subject to any disclaimer, the term of this patent is extended or adjusted under 35 U.S.C. 154(b) by 0 days.

(21) Appl. No.: 17/030,775

(22) Filed: Sep. 24, 2020

(51) Int. Cl.
  *B63B 29/04* (2006.01)
  *B63B 3/48* (2006.01)
  *F16C 11/06* (2006.01)

(52) U.S. Cl.
  CPC ............. *B63B 29/04* (2013.01); *B63B 3/48* (2013.01); *F16C 11/06* (2013.01); *B63B 2029/043* (2013.01)

(58) Field of Classification Search
  CPC ...... B63B 29/04; B63B 3/48; B63B 2029/043
  See application file for complete search history.

(56) References Cited

U.S. PATENT DOCUMENTS

| D121,266 S | 7/1940 | Archer |
| D135,333 S | 3/1943 | Brown |
| 2,792,053 A | 5/1957 | Kursman |
| 3,215,468 A | 11/1965 | Swenson |
| 3,347,572 A | 10/1967 | Pfaff, Jr. |
| 3,741,595 A | 6/1973 | Horgan, Jr. |
| D227,833 S | 7/1973 | Olson |
| 3,774,964 A * | 11/1973 | Turner .................... B60N 2/233 297/366 |
| D274,581 S | 6/1984 | Gallock |
| 4,463,632 A | 8/1984 | Parke |
| 4,879,963 A * | 11/1989 | Dionne ................... A01K 97/10 114/363 |
| 4,926,783 A | 5/1990 | Lathers |
| D312,004 S | 11/1990 | Smith |
| 5,020,854 A | 6/1991 | Powell |
| 5,052,076 A | 10/1991 | Spaeth |
| 5,058,949 A | 10/1991 | Von Hoffman |
| 5,171,063 A | 12/1992 | Stidd |
| 5,301,570 A | 4/1994 | Li |
| D377,574 S | 1/1997 | Mades |
| 5,688,023 A | 11/1997 | Blocker, Jr. |
| 5,688,024 A | 11/1997 | Arizpe-Gilmore |
| 5,697,318 A | 12/1997 | Kobayashi |
| 5,904,398 A | 5/1999 | Farricielli |
| D411,381 S | 6/1999 | Greaves |
| 6,095,611 A * | 8/2000 | Bar ....................... A61G 5/1067 297/440.21 |
| 6,135,476 A | 10/2000 | Dickie |

(Continued)

*Primary Examiner* — S. Joseph Morano
*Assistant Examiner* — Jovon E Hayes
(74) *Attorney, Agent, or Firm* — Garcia-Zamor Intellectual Property Law, LLC; Ruy Garcia-Zamor

(57) ABSTRACT

An adjustable frame configured to detachably connect to a backrest to allow the backrest to be transitioned between two or more angular positions relative to a horizontal plane, with at least one position being more upright and at least one position being more reclined. The adjustable frame may include a turret rotatably positioned on a base socket, the rotation of the turret from one position to another on the base socket causing the backrest to be held at a different angular position.

20 Claims, 30 Drawing Sheets

(56) References Cited

U.S. PATENT DOCUMENTS

| | | | |
|---|---|---|---|
| 6,283,059 B1 | 9/2001 | Scully, Jr. | |
| 6,321,912 B1 | 11/2001 | Lippert | |
| 6,322,145 B1 | 11/2001 | Melgarejo | |
| 6,513,876 B1 | 2/2003 | Agler | |
| 6,527,341 B1 | 3/2003 | Martin | |
| 6,880,482 B2 * | 4/2005 | Huse | B63B 29/04 114/363 |
| 6,981,741 B2 | 1/2006 | Sirjoo | |
| 6,983,992 B2 | 1/2006 | Oomori | |
| 7,066,548 B2 | 6/2006 | Butler | |
| 7,107,927 B2 | 9/2006 | Hopper | |
| 7,125,079 B1 * | 10/2006 | Lee | A47C 3/18 297/353 |
| 7,137,351 B2 | 11/2006 | Picou | |
| 7,213,692 B2 | 5/2007 | Wang | |
| D569,118 S | 5/2008 | Lin | |
| 7,367,616 B2 | 5/2008 | Summerford | |
| D673,786 S | 1/2013 | Szymaski | |
| D675,837 S | 2/2013 | Szymaski | |
| D675,838 S | 2/2013 | Szymaski | |
| D676,681 S | 2/2013 | Szymaski | |
| 8,960,799 B2 | 2/2015 | Koon | |
| D727,046 S | 4/2015 | Alexander | |
| D727,047 S | 4/2015 | Alexander | |
| 9,021,975 B1 * | 5/2015 | Fodor | B63B 29/04 114/363 |
| 9,138,059 B2 | 9/2015 | Kwok | |
| D740,579 S | 10/2015 | Begin | |
| 9,955,790 B2 | 5/2018 | Tang | |
| 10,040,378 B2 * | 8/2018 | Hansen | B60N 2/876 |
| 10,065,711 B2 * | 9/2018 | Fuller, IV | B63B 29/04 |
| 10,182,953 B2 | 1/2019 | Tsuber | |
| 2004/0184895 A1 | 9/2004 | Liao | |
| 2005/0179288 A1 | 8/2005 | Lizaso | |
| 2006/0033375 A1 | 2/2006 | Wu | |
| 2006/0202536 A1 | 9/2006 | Luchetti | |
| 2008/0035047 A1 * | 2/2008 | McDonough | B63B 29/00 114/357 |
| 2009/0146477 A1 * | 6/2009 | Yamada | B60N 2/309 297/354.1 |
| 2010/0037814 A1 | 2/2010 | Sahr | |
| 2010/0045078 A1 * | 2/2010 | Lee | A47C 7/402 297/118 |
| 2010/0102613 A1 | 4/2010 | Labuwy | |
| 2012/0155949 A1 | 6/2012 | Chang | |
| 2013/0093232 A1 | 4/2013 | Lin | |
| 2015/0097405 A1 | 4/2015 | Schukalski | |
| 2015/0274263 A1 | 10/2015 | Nutz | |
| 2015/0313365 A1 | 11/2015 | Thomas | |
| 2016/0262543 A1 * | 9/2016 | Currie | A47C 7/425 |

\* cited by examiner

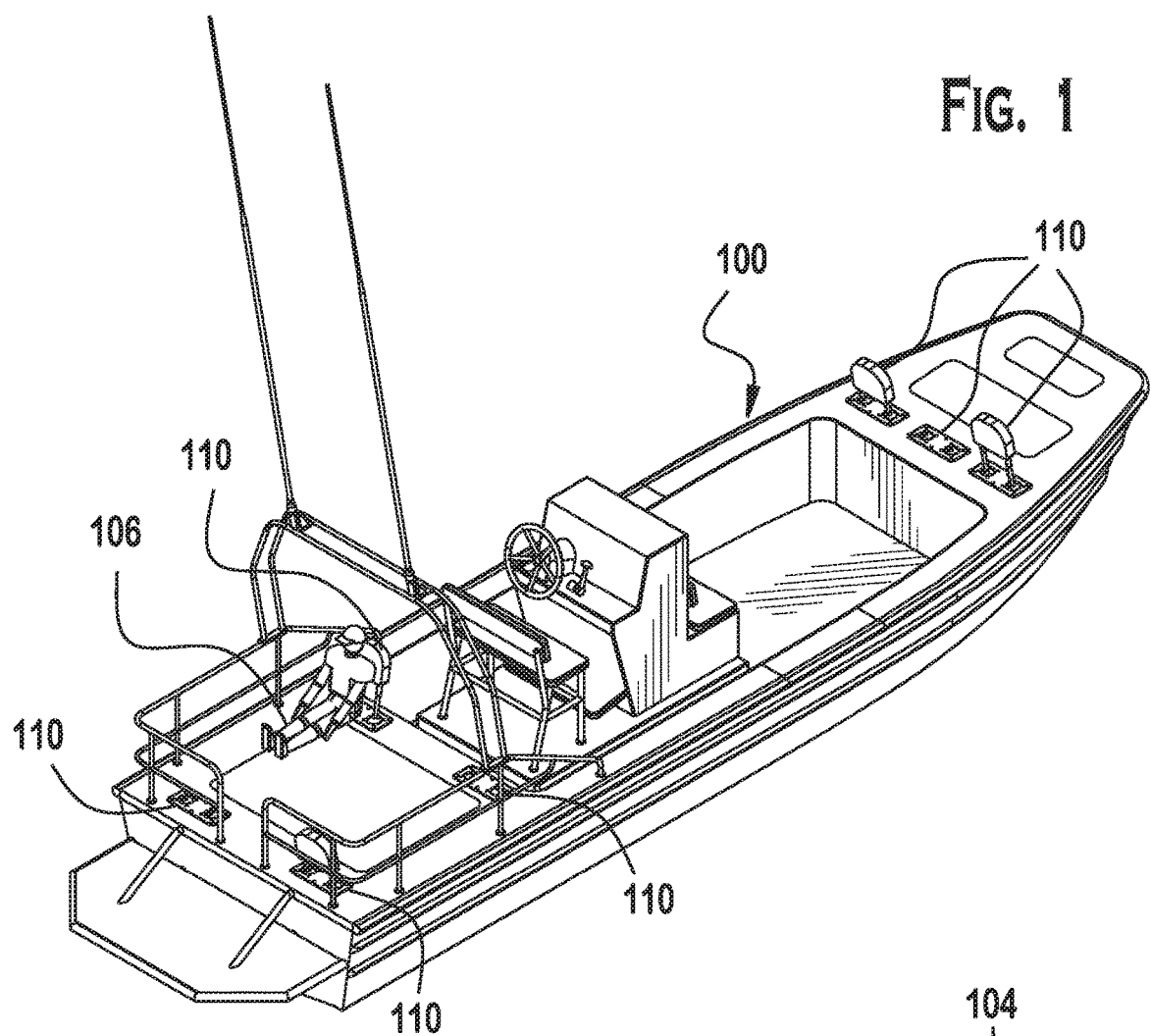

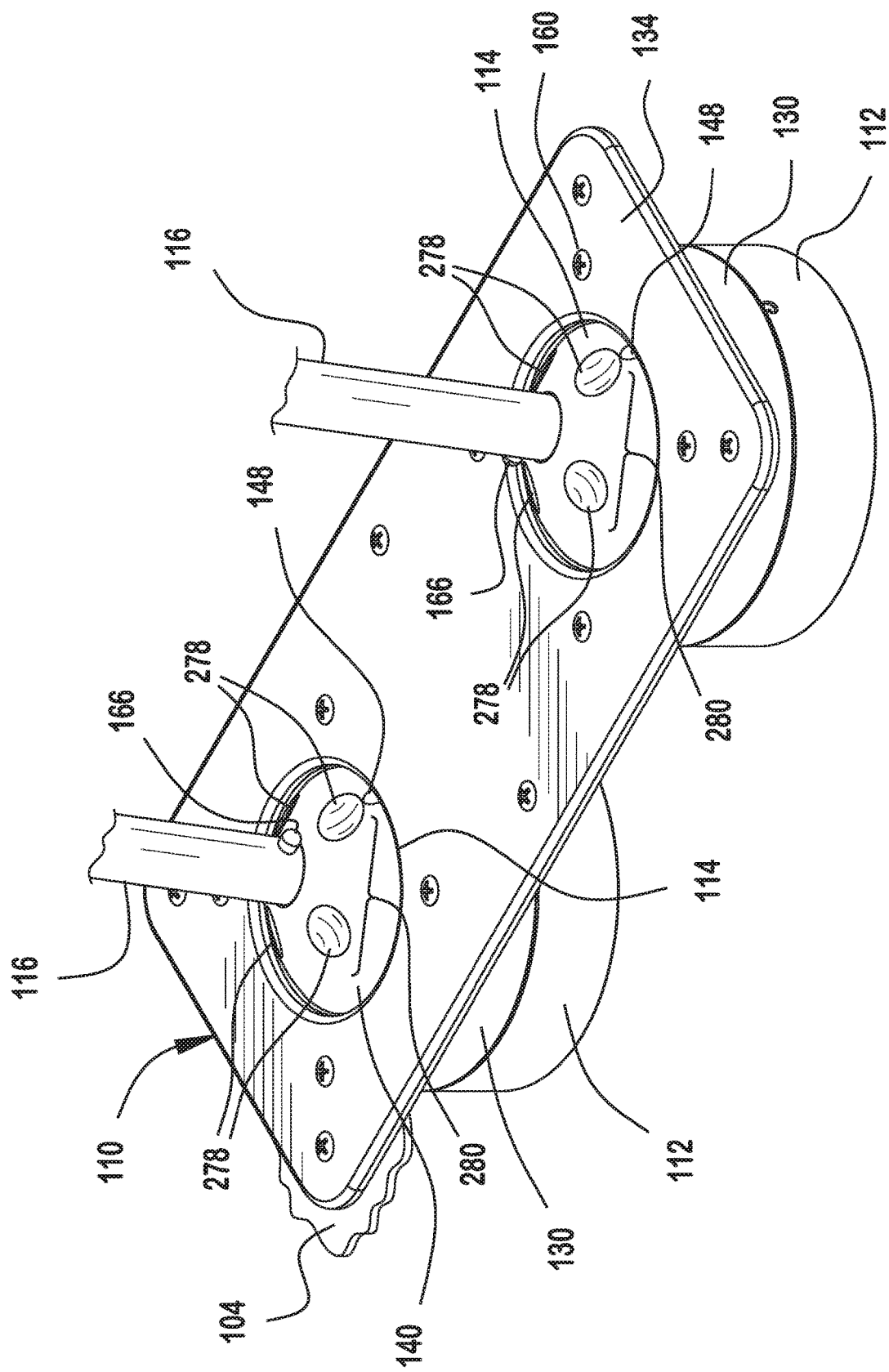

ADJUSTABLE FRAME FOR ALLOWING A BACKREST TO RECLINE, A COMBINATION ADJUSTABLE FRAME AND VEHICLE AND/OR SEAT FRAME, AND/OR A METHOD OF USE THEREOF

BACKGROUND

The present invention is generally directed to furniture, and reclining mechanisms relating thereto. More specifically, the invention is directed toward chairs and seats with backrests which may be converted between multiple reclined and/or upright positions. Preferably this includes some positions which may be more reclined than others to offer customized comfort to users. The invention is also directed to detachable backrests and removable and/or aftermarket reclining mechanisms which may allow for customized usage on, and/or in combination with, vehicles.

Recliner mechanisms, hinged connections which may allow the backrests of chairs and seats to pivot in a reclining direction, may support a user with his or her back at an angle greater than 90 degrees relative to a horizontal plane. Such connections generally include mechanical aspects which may decrease the portability and practicality of such furniture. Gears and springs may increase the weight and cost of chairs and seats, and any handles or levers for operating the reclining mechanism may increase elements of seats which protrude at odd angles and may get caught on other objects.

Additionally, mechanical components can make furniture more susceptible to damage and weathering. On boats and other vehicles, seats may be kept exposed to the elements for long periods of time, including highly corrosive salt water and rust-inducing rain water. Dirt, dust, and sand may further cause damage, especially to rotating parts, which may decrease the lifespan of reclining furniture used on vehicles.

Portable seats which may be specifically designed for use on vehicles, such as boats, are generally designed to maintain a single shape and/or a single use position. Manufacturers may limit the number of components which can be easily damaged, but this generally limits the range of motion and functionality of these seats. Many such seats do not allow for additional reclination, and reclining or leaning back in seats not configured to be reclined may result in injuries or damage to the seat or other objects. Such damage or injuries may result from placing pressure on elements of seat not configured to receive pressure or changing the center of gravity to unintended locations on the seat.

It may be advantageous to provide a recliner mechanism for furniture that at least one of: may be converted between multiple use configurations; may support a backrest at more than one angle of reclination; is resistant to corrosion and weathering damage; has a limited number of mechanical parts; can be efficiently assembled and disassemble; and/or that is efficient to manufacture.

SUMMARY

Briefly speaking, one aspect of the present invention is directed to an adjustable frame configured to support a backrest having a base socket which defines an engagement surface. When viewed in cross section, the engagement surface is angled relative to a horizontal plane. The adjustable frame further includes a turret having a flat section, with the turret being configured such that, when it is positioned on the base socket the flat section abuts the engagement surface. The adjustable frame may also include a post disposed on and/or in the turret, with the post being configured to engage the backrest. The turret may be rotatable on the base socket between a first position, in which the post forms a first angle with the horizontal plane, and a second position, in which the post forms a second angle with the horizontal plane. The first angle is preferably different from the second angle.

In some aspects, the turret can be rotated one hundred and eighty degrees about the central turret axis to move from the first position to the second position. The post may have a central post axis, with the central post axis being positioned on a same side of a vertical plane intersecting therewith such that the adjustable frame is configured to support the backrest at any one of the first angle and the second angle. A person using the backrest would face in a same direction while sitting and using the backrest when the back rest is in both the first and second positions.

In some aspects, the backrest may have a forward directed surface configured such that, when the turret is rotated one hundred and eighty degrees about a vertical axis to move from the first position to the second position. The adjustable frame is configured to support the backrest at any one of the first angle and the second angle. The forward directed surface faces in a same viewing direction regardless of whether the turret is in the first position or the second position.

In a separate aspect, when the turret is rotated one hundred and eighty degrees about the central turret axis to move from the first position to the second position. The adjustable frame is configured to support the backrest at any one of the first angle and the second angle. A person using the backrest would face in a same direction regardless of whether the turret is in the first position or the second position. When viewed in cross-section, the turret has a central turret axis which is inclined at a third angle relative to the horizontal plane. The post and the central post axis may rotate about the central turret axis when the turret is moved from the first position to the second position. When viewed in cross-section, the central post axis is aligned at a fourth angle relative to the vertical axis, and the central turret axis is aligned at a fifth angle relative to the central post axis in a direction away from the vertical axis. In such a configuration, the backrest is inclined at the fourth angle when the turret is in the first position such that the backrest is inclined at a more reclined angle equal to the sum of twice the fifth angle and the fourth angle.

In one aspect, the fourth angle is preferably between three (3) degrees and twenty (20) degrees and the fifth angle is between five (5) degrees and twenty-five (25) degrees. In a separate aspect, the fourth angle is ten (10) degrees and the fifth angle is twelve and a half (12.5) degrees.

In some aspects, the turret further defines a groove therein which provides a guide track which is engageable by the base socket. The guide track may control the rotation of the turret relative to the base socket and allow for rotation of the turret between the first position and the second position along one side of the base socket but not the other such that the turret is not rotated past the first position or the second position when being moved therein. The base socket may define a rotation surface which is parallel to the engagement surface and connected thereto by a sidewall surface, the sidewall surface and the engagement surface combining to form a turret seat.

In some aspects, the turret may further comprise a main turret body and a turret base which defines the flat section. The turret base is configured to project from the main turret body and is configured to nest within the turret seat of the base socket such that the flat section of the turret base abuts the engagement surface of the base socket. A portion of the main turret body preferably abuts the rotation surface of the base socket. The main turret body has a generally hemispherical shape.

The adjustable frame may further comprise a collar defining a channel therethrough. The collar may be disposed on the base socket and about the turret such that a portion of the turret extends from the channel to project outwardly from the collar in a direction away from the base socket. The collar and the base socket may thus combine to secure the turret to the base socket such that the flat section of the turret is maintained in abutment with the engagement surface of the base socket. Such a configuration preferably ensures that the turret is generally only capable of rotational movement about the central turret axis. A plate may be disposed on an opposite side of the collar from the base socket, with the plate defining a porthole through which at least some of the portion of the turret may extend.

In some aspects, the adjustable frame may include a bumper disposed on the turret, with the bumper being located on the at least some of the portion of the turret which extends through the porthole. When the turret is in the first position the bumper is preferably adjacent to the plate and configured to contact the plate when a pressure is applied in a reclining direction on the backrest. When the turret is in the second position the post may be positioned adjacent to the plate to support the turret against torque resulting from a pressure applied in a reclining direction onto the backrest due to contact between the post and the plate. In some aspects, the adjustable frame may include two of each of: (1) the base socket; (2) the turret; (3) the collar; and (4) the post, the two posts being configured to engage the backrest.

In a separate aspect, the adjustable frame may be included in combination with a boat, wherein the adjustable frame and the boat combine to form a combination of a boat and an adjustable frame. The boat preferably has boat decking and the adjustable frame may be engaged with the boat decking such that the boat decking and the backrest combine to form a seat.

In a separate aspect, the adjustable frame may be included in combination with a boat, wherein the adjustable frame and the boat form a combination of a boat and an adjustable frame. The boat preferable has boat decking and the adjustable frame may be engaged with the boat decking such that the boat decking and the backrest combine to form a seat.

In a separate aspect the adjustable frame may be included in combination with a seat frame, wherein the seat frame and the adjustable frame form a combination of a seat frame and an adjustable frame. The seat frame preferably includes a seat bottom having an upper seat surface and a lower surface, and at least one leg connected to the lower surface. The at least one leg may be connectible to a support connection. The upper seat surface of the seat frame and backrest of the adjustable frame preferably combine to form a seat.

BRIEF DESCRIPTION OF THE DRAWINGS

The foregoing summary, as well as the following detailed description of the preferred embodiments of the present invention will be better understood when read in conjunction with the appended drawings. For the purpose of illustrating the invention, there are shown in the drawings embodiments which are presently preferred. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. It is understood, however, that the invention is not limited to the precise arrangements and instrumentalities shown. In the drawings:

FIG. 1 is a rear right-side perspective view of a combination vehicle and adjustable frame 100 of a preferred embodiment. The vehicle, shown in the figure as a boat 102, may include one or more adjustable frames 110 which are preferably configured such that a person 106 can sit on a portion of the boat 102 and lean against the backrest 118. Adjustment of the adjustable frames 110 may change the angular position of each backrest 118 relative to the boat decking 104 to allow a person 106 to recline or to sit more upright, depending on the preference of a user.

FIG. 2 is a partial cutaway perspective view of the front section of the combination vehicle and adjustable frame 100 of FIG. 1, showing that the boat 102 preferably includes boat decking 104. The boat decking 104 is preferably the portion of the boat 102 configured for persons 106 to stand or sit thereon that is preferably positioned on the hull and/or sidewalls of the boat 102. Preferably, the adjustable frame 110 may be partially positioned within the boat decking 102, such as being placed in an opening cut in the boat decking 104. The base socket 112 may be placed into a hole in boat decking 102, and the turret 114 may be positioned on the base socket 112 and secured thereto by a collar 130. A plate 134 may be positioned against the boat decking 102 and connected by fasteners 160, with a portion of the turret 114 extending upward and projecting through the porthole 136 in the plate 134. A post 116 may be inserted into the post opening 146 in the turret 114, the post 116 connecting on its top side to a backrest 118. In the preferred embodiment, each adjustable frame 110 preferably includes two base sockets 112, two turrets 114, two collars 130, two posts 116, one plate 134, and one backrest 118.

FIG. 17 shows that the turret 114 has opposite points defining a shortest side 206 and a longest side 208, with the distance between the flat surface 152 and the top surface 252 gradually increasing between shortest side 206 and the longest side 208. This distance preferably gradually increases evenly on both sides. Thus, as can be seen in the figures, both points taken exactly halfway between the longest side 208 and shortest side 206 on each side (in other words, along a line perpendicular to the line between the longest side 208 and shortest side 206) may define the same distance between the top surface 252 and flat surface 152. These points are the first intermediate side 205 and second intermediate side 207, respectively, and may define a middle distance 203 between the top surface 252 and flat surface 152. The first bumper 128 and the second bumper 198 are preferably positioned proximate to the first intermediate side 205 and the second intermediate side 207, respectively, and are thus also positioned roughly perpendicular to the longest side 208 and shortest side 206.

FIG. 46 is a front left-side perspective view of the adjustable frame 110 of an alternate preferred embodiment, showing a preferred configuration of the turret 114. In this preferred embodiment, the main turret body 140, and the hemispherical bulb 144 formed by the main turret body 140, may include at least one finger hold 278. The finger hold 278 is preferably an indentation in the portion of the turret 114 which projects through the porthole 136 in the plate 134. Preferably, four finger holds 276 are provided which are configured to engage with one or more of a user's fingers to allow him or her to more easily rotate the turret 114. Taken in tandem, the finger holds 278 may form a grip 280, a portion of the turret 114 specifically configured to allow it to be grasped and rotated by a user. Those of ordinary skill in the art will appreciate from this disclosure that the grip 280 may include additional or alternate elements to the finger holds 276 to maximize the ability of a user to engage the turret 114, such as additional ridges, grip tape, or any other suitable element. Finger holds 278 and the grip 280 may be provided in addition to, or in the place of the first bumper 128 and/or the second bumper 198.

DETAILED DESCRIPTION OF THE PREFERRED EMBODIMENT

Figure 3:
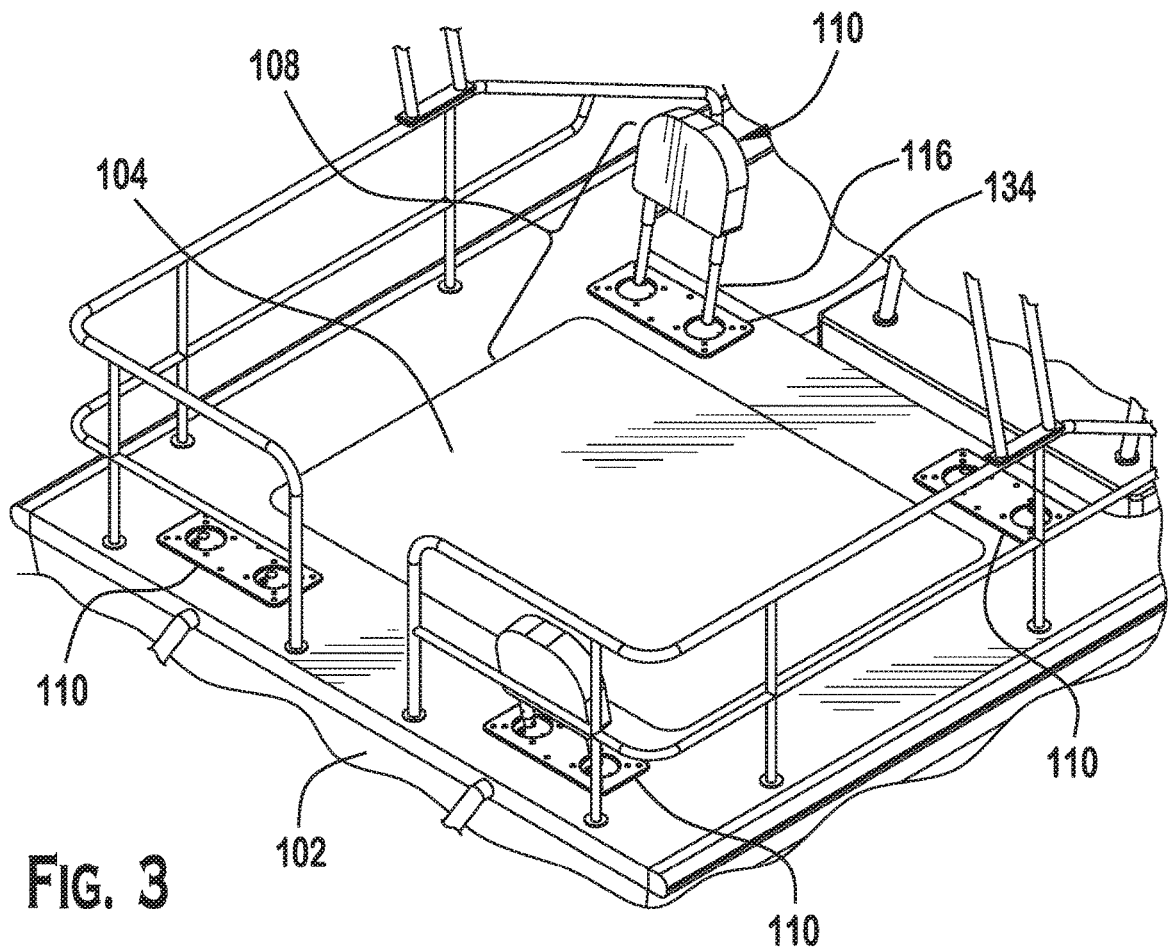
FIG. 3 is a partial cutaway perspective view of the rear section of the combination vehicle and adjustable frame 100 of FIG. 1, showing that the adjustable frame 110 may combine with the boat decking 102 to form a seat 108 for use by a person 106 on the boat 102. The person 106 may be seated on the boat decking 102 and may lean his or her back against the backrest 118. The backrest 118 and posts 116 may be removed from the remainder of the adjustable frame 110 to provide a roughly flat surface for users to walk on along with the boat decking 104. Combined with FIG. 2, the figure shows how the adjustable frames 110 may add numerous seats 108 to a boat 102, with seven additional seats 108 shown.
Figure 4:
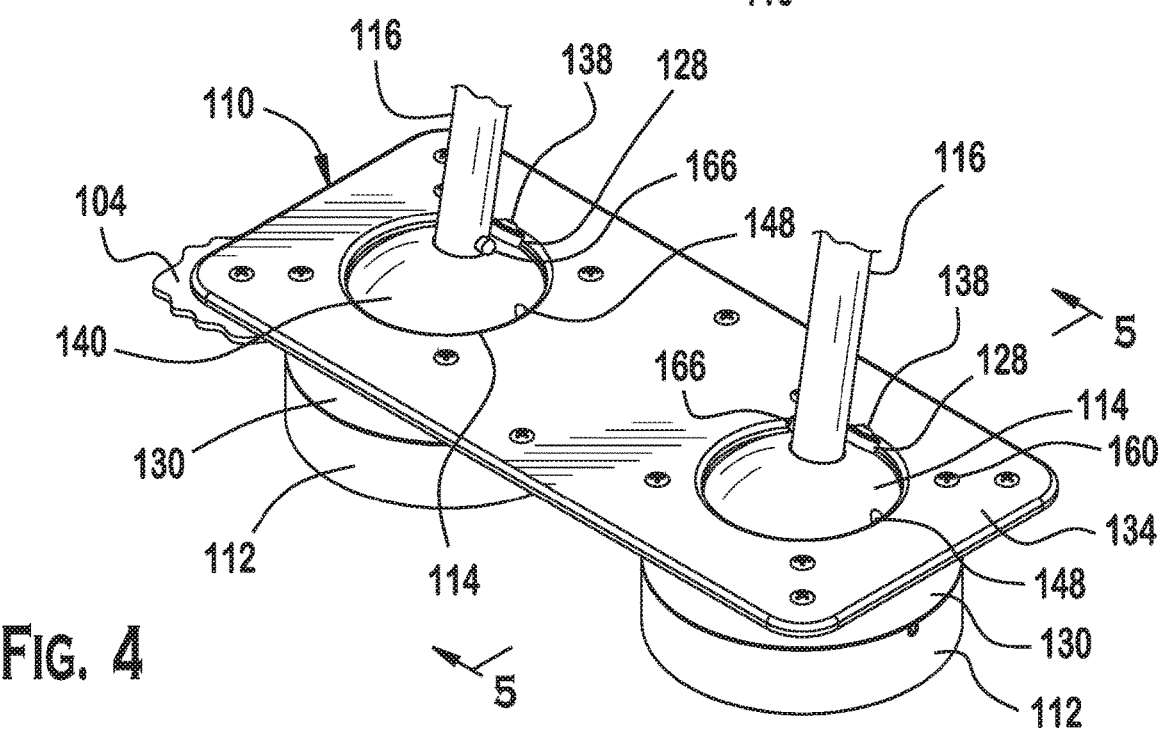
FIG. 4 is a front left-side perspective view of the adjustable frame 110 of the preferred embodiment, showing the preferred configuration of the adjustable frame 110 relative to boat decking 104 when the adjustable frame 110 is combined with the boat 102 to form a combination vehicle and adjustable frame 100. In the preferred embodiment, the base socket 112 and collar 130 are positioned below the boat decking 104, and the plate 134 is positioned on the boat decking 104. The turret 114 is preferably positioned on the base socket 112, with the main turret body 140 extending through both the channel 132 defined by the collar 130 and the porthole 136 defined by the plate 134. The post 116 may be inserted into the post opening 146 of the turret 114 and may be detachably secured therein via a locking pin 166. The main turret body 140 may also have a include a bumper 128 positioned proximate to the post opening 146 and configured to be positioned between the post 116 and the porthole 136 of the plate 134 to receive weight that might otherwise be placed on the post 116 if the user reclines. The bumper 128 is preferably formed of deformable, durable materials, such as rubber, and may be connected to the turret 114 by a bumper fastener 138 such as a screw or a rivet. Those of ordinary skill in the art will appreciate from this disclosure that the bumper 128, bumper fastener 138, and/or second bumper 198 may be wholly or partially omitted without exceeding the scope of this disclosure.
Figure 5:
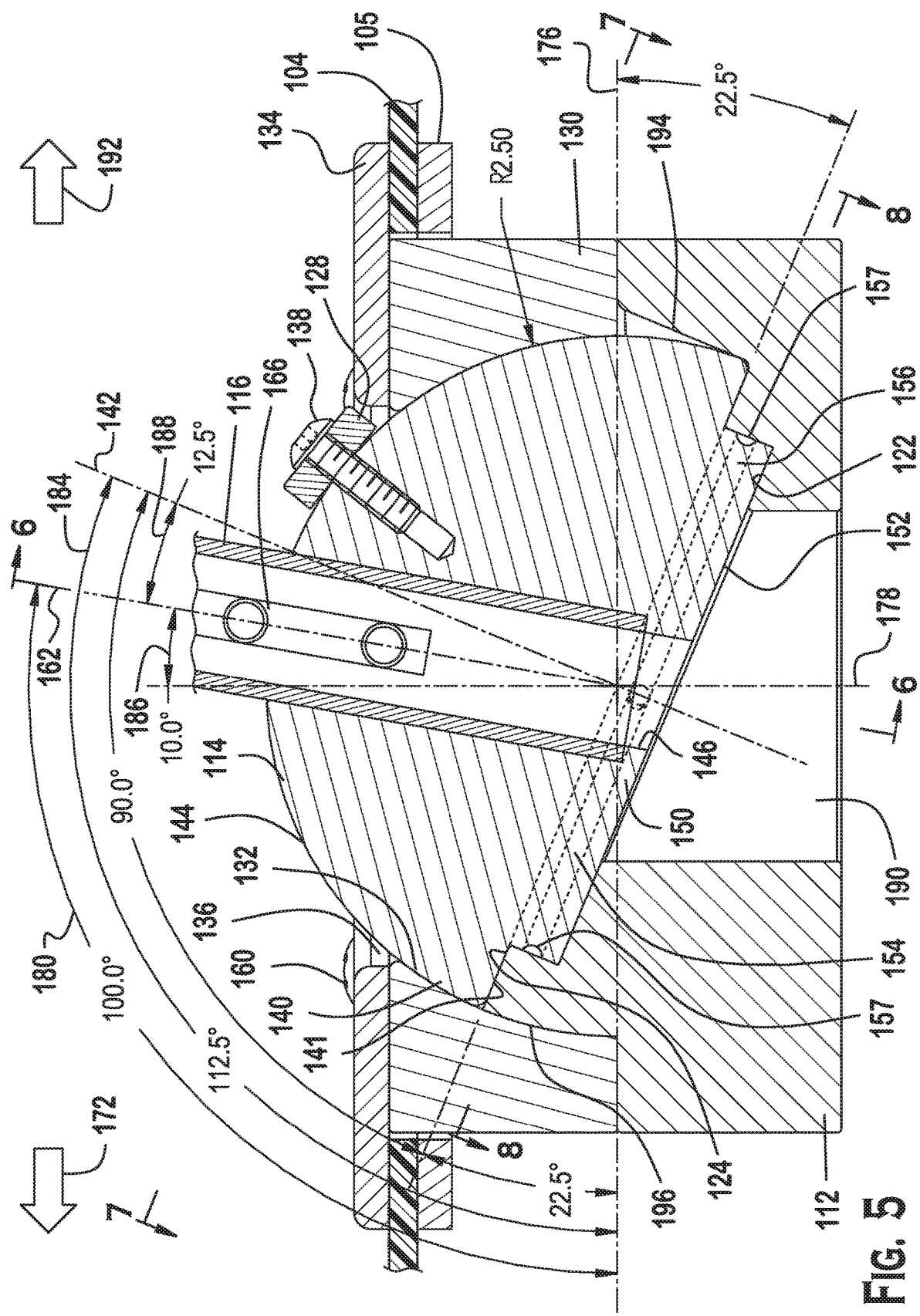
FIG. 5 is a cross-sectional view of the adjustable frame 110 of the preferred embodiment, as taken along lines 5-5 in FIG. 4. When taken along with FIG. 12, the figure better demonstrates the first and second positions at which the backrest 118 can be supported. Both positions are preferably each set at more than a 90-degree angle relative to the horizontal plane 176, but the second position is preferably more reclined than the first position. Generally speaking, the vertical axis 178 refers to a geometrically vertical axis through the adjustable frame 110, and a horizontal plane 176 refers to a geometrically horizontal axis through the adjustable frame 110 that is perpendicular to the vertical axis 178. To the front of the vertical axis 178 (or to the left side of the vertical axis 178, as shown in the figure) is a viewing direction 172 because a person 106 using the adjustable frame 110 would face in said direction. To the rear of the vertical axis 178 (or to the right side of the vertical axis 178, as shown in the figure) is the reclining direction 192 because the backrest 118 preferably pivots in that direction when moving from the first position to the second position. The turret 114 preferably defines a central turret axis 142, a vertical axis through the geometric center of the turret 114. The central turret axis 142 is preferably positioned at an angle relative to the vertical axis 142, with this angle being determined by the angular position of the engagement surface 122 of the base socket 112. In some preferred embodiments, the central turret axis 142 is preferably positioned at an angle of twenty-two and a half degrees (22.5 degrees) relative to the vertical axis 178 and, similarly, the engagement surface 122 is also positioned at an angle of twenty-two and a half degrees (22.5 degrees) relative to the horizontal plane 176. When the post 116 is positioned in the post opening 146, the post 116 preferably defines a central post axis 162 along the geometric center of the post 116. Preferably, when the adjustable frame 110 is in the first position, the central post axis 162 is held at an angle of one hundred degrees (100 degrees) relative to the horizontal plane 176 (referred to herein as the first angle 180); ten degrees (10 degrees) in relation to the vertical axis 178 (referred to herein as the fourth angle 186); and twelve and a half degrees (12.5 degrees) relative to the central turret axis 142 (referred to herein as the fifth angle 188). Those of ordinary skill in the art will appreciate from this disclosure that the angles specified herein are not limited to the preferred angular measurements described herein, which are included
Figure 6:
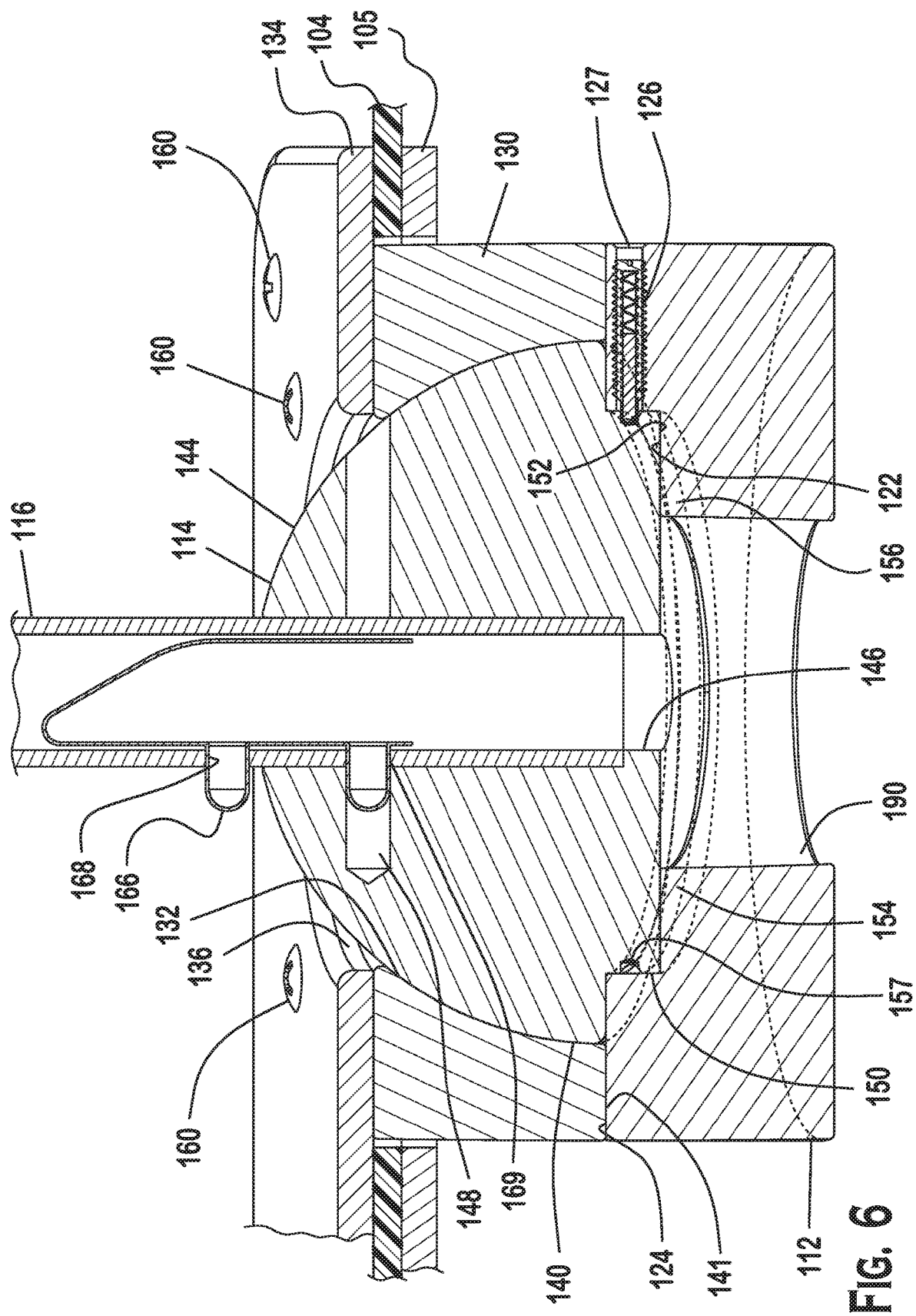
FIG. 6 is partial cross-sectional view of the adjustable frame 110 of FIG. 5 as taken along lines 6-6 of FIG. 5, showing a preferred configuration allowing for the rotation of the turret 114 relative to the base socket 112. The turret 114 preferably includes a turret main body 140 and a turret base 150. The turret base 150 preferably has a groove 154 formed along a portion of its perimeter, which may include one or more rotation stops 157. The groove 154 and the rotation stops 157 may form a guide track 156 to create a path for the rotation of the turret 114, keeping its movement within a predetermined range. The base socket 112 preferably includes a rotation guide opening 127, a generally horizontal bore which passes fully therethrough to open to the turret base 150. Once the turret 114 is positioned in the turret seat 120, a rotation guide pin 126 may be inserted into the rotation guide opening 127 until the rotation guide pin 126 enters at least a portion of the guide track 156. In this preferred configuration, the rotation guide pin 126 may prevent both over-rotation of the turret 112 (via contact with the rotation stop(s) 157) and the turret 114 from tilting upward or downward (via contact with the groove 154). The figure further shows that the post 116 may include openings proximate to its lower end, with the lower opening being a post channel opening 169 allowing one end of the locking pin 166 to engage with the manufacturing channel 148 and the higher opening being a post stop opening 168 allowing a user to disengage the locking pin 166 when the locking pin 166 is engaged with the manufacturing channel 148, which might otherwise be inaccessible.
Figure 7:
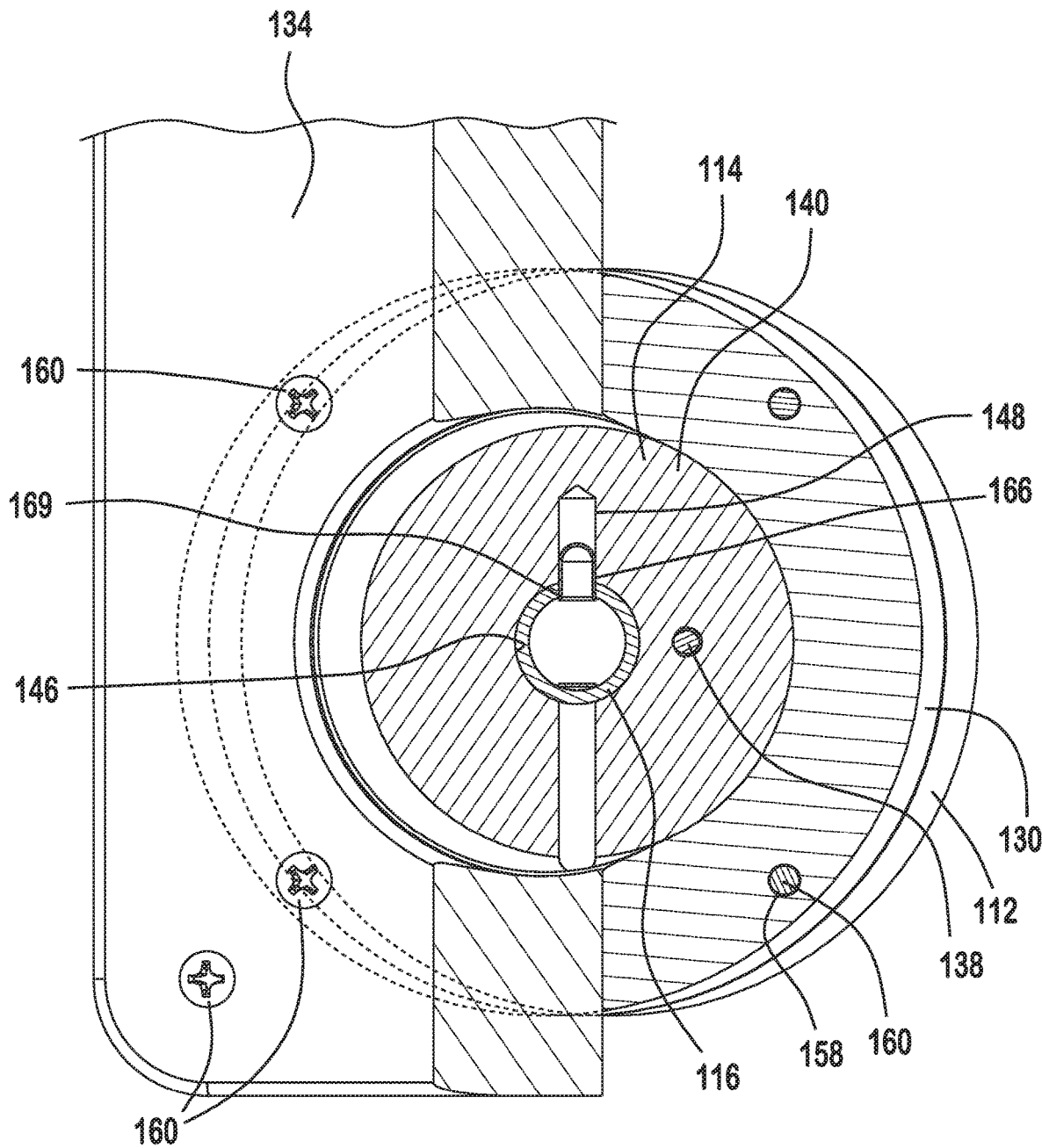
FIG. 7 is partial cross-sectional view of the adjustable frame 110 of FIG. 5 as taken along lines 7-7 of FIG. 5, demonstrating the preferred positioning of the turret 114 between the collar 130 and the base socket 112.
Figure 8:
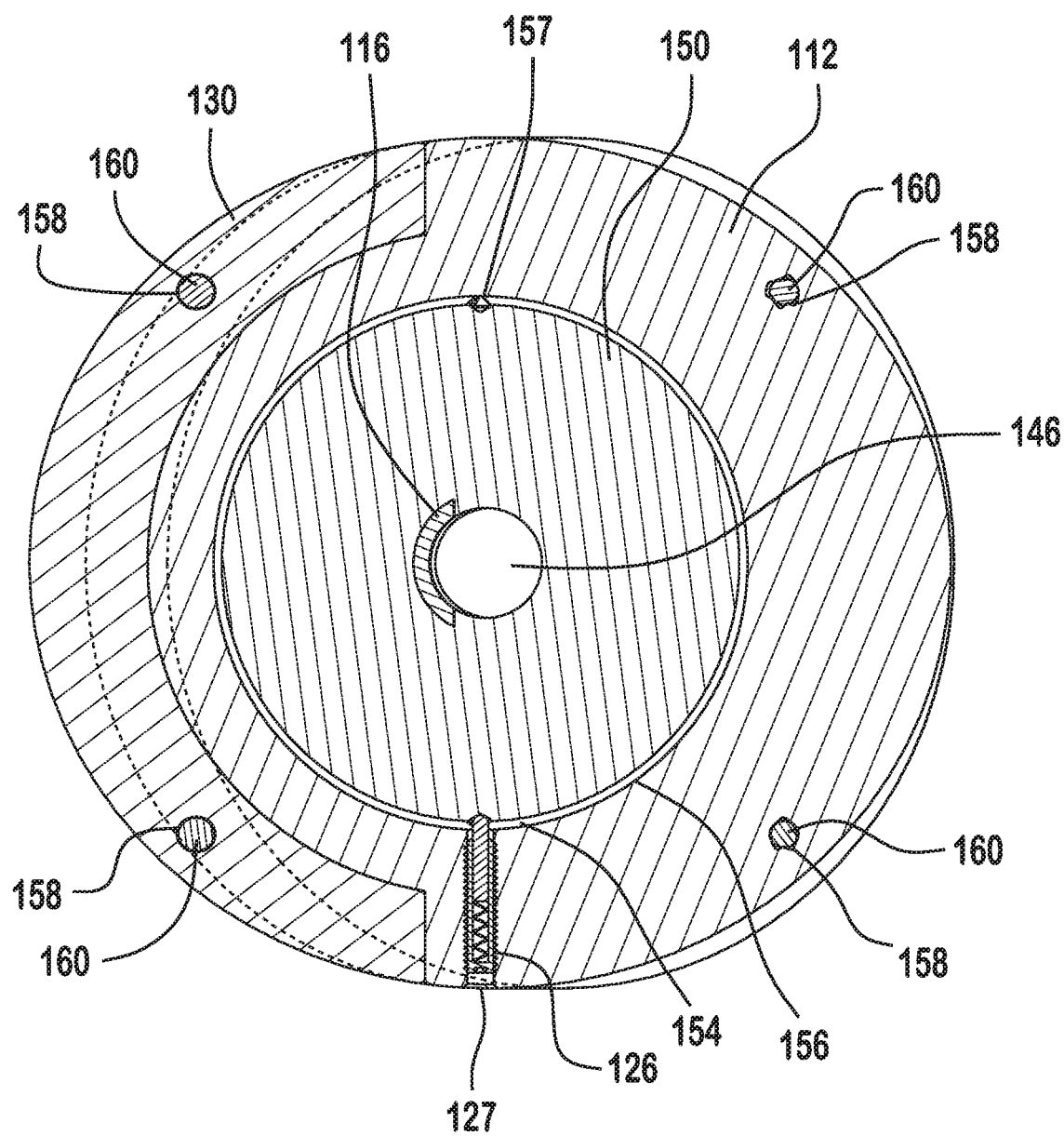
FIG. 8 is partial cross-sectional view of the adjustable frame 110 of FIG. 5 as taken along lines 8-8 of FIG. 5, better demonstrating the preferred configuration of the guide track 156 and the rotation guide pin 126. Preferably, the rotation guide pin 126 is positioned fully within the base socket 112, rather than extending outward past the periphery of the base socket 112. The end of the rotation guide pin 126 preferably protrudes significantly into the guide track 156 formed by the groove in the turret base 150 to allow it to contact one or more rotation stops 157 in the groove 154, to make it so the user can easily transition between the first and second positions. Preferably, two rotation stops 157 are positioned on roughly opposite points of the circular groove 154 to ensure that the turret 114 cannot be rotated more than 180 degrees. This may also eliminate an inefficiency in the use of the adjustable frame 110, particularly in embodiments in which two turrets 114 are provided. As the turrets 114 (and, in turn, the posts 116) must be moved between two matching positions, the rotation stops 157 allow a user to know when each turret 114 has reached the preferred position, rather than forcing the user to approximate the location of one or both of the preferred positions. In some preferred embodiments, the base socket 112 may include two rotation guide openings 127 with two rotation guide pins 126, each on roughly opposite points of the circular perimeter of the base socket 112. This may keep the rotation guide pins 126 on opposite ends of the guide track 156, providing further stability for the rotation of the turret 114 and allowing each rotation guide pin 126 to contact a separate rotation stop 157 when the adjustable frame 110 is in either position.
Figure 9:
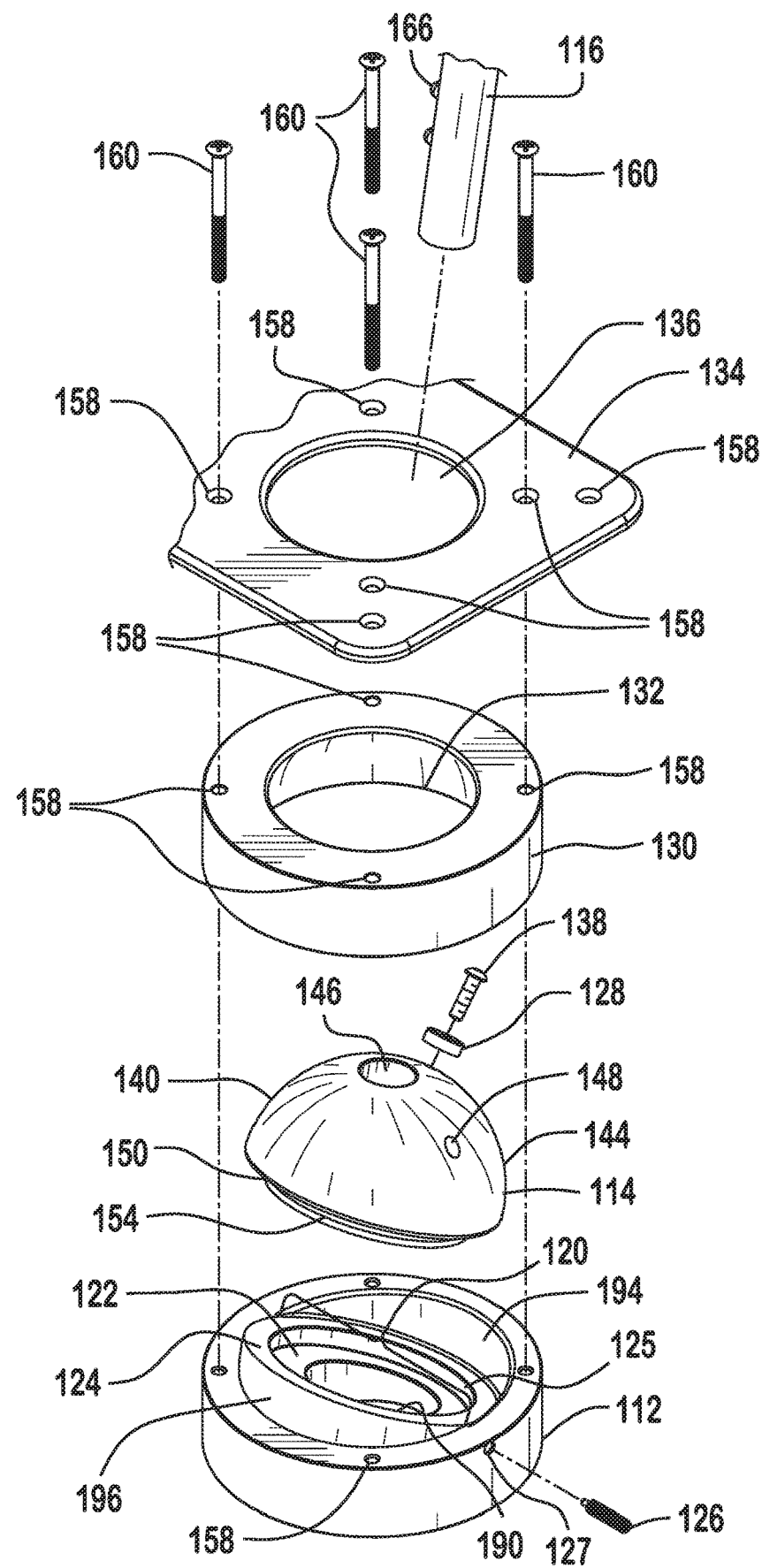
FIG. 9 is a partial perspective exploded view of the adjustable frame 110 of the preferred embodiment, showing the preferred assembly of a portion of the adjustable frame 110. Preferably, the base socket 112 is positioned first, then the turret 114 is positioned thereon, with the collar 130 next be positioned over a portion of the turret 114 and the base socket 122, and finally a plate 134 is positioned over the collar 130 with all of these elements being connected by fasteners 160 inserted through fastener openings 158. To be more specific, the base socket 112 is preferably roughly cylindrical in shape, with a roughly circular opening therethrough defining a base hollow 190. The base socket 112 may have an engagement surface 122 for the flat section 152 to abut, and a rotation surface 124 for the main turret body 140 to rest on and rotate along. The engagement surface 122 and the rotation surface 124 are preferably separated by a sidewall surface 125 such that any portion of the rotation surface 124 along the circumference of the base socket 112 is held higher than a corresponding portion of the engagement surface 122 taken at the same point along the circumference of the base socket 112. The engagement surface 122, sidewall surface 125, and rotation surface 124 may combine to form a turret seat 120, a cylinder within the cylinder of the base socket 112 configured to receive the turret base 150. The turret seat 120 is preferably a cylinder with an angled configuration relative to the cylinder of the rest of the base socket 122. Thus, a raised seat wall 196 links the highest side of the turret seat 120 to the rest of the base socket 112, and a raised perimeter wall 194 links the lowest side of the turret seat 120 to the rest of the base socket 112. The turret 114 may have two major elements—a main turret body 140, preferably a hemispherical bulb 144; and a turret base 150, a section having a smaller diameter than the main turret body 140 and defining the flat section 150. The turret main body 140 may define a post opening 146 configured to receive a post 116 inserted from above, with a manufacturing channel 148 bored therethrough for a locking pin 166 in the post 116 to engage with. The main turret body 140 may also include a bumper 128 which may be defined by the main turret body 140 or may be a separate piece connected thereto by a bumper fastener 138. The collar 130 may be positioned over the turret 114 and base socket 112, with a portion of the main turret body 140 projecting through the channel 132. The plate 134 may then be positioned above the collar 130, with the fastener openings 158 aligned and the porthole 136 in the plate 134 generally aligning with at least a portion of the channel 132. Fasteners may be inserted through the fastener openings 158 to connect the plate 134, collar 130, and base socket 112. A portion of the main turret body 140 preferably projects upward through the porthole 136, with the plate 134 and/or the collar 130 holding the turret 114 in place.
Figure 10:
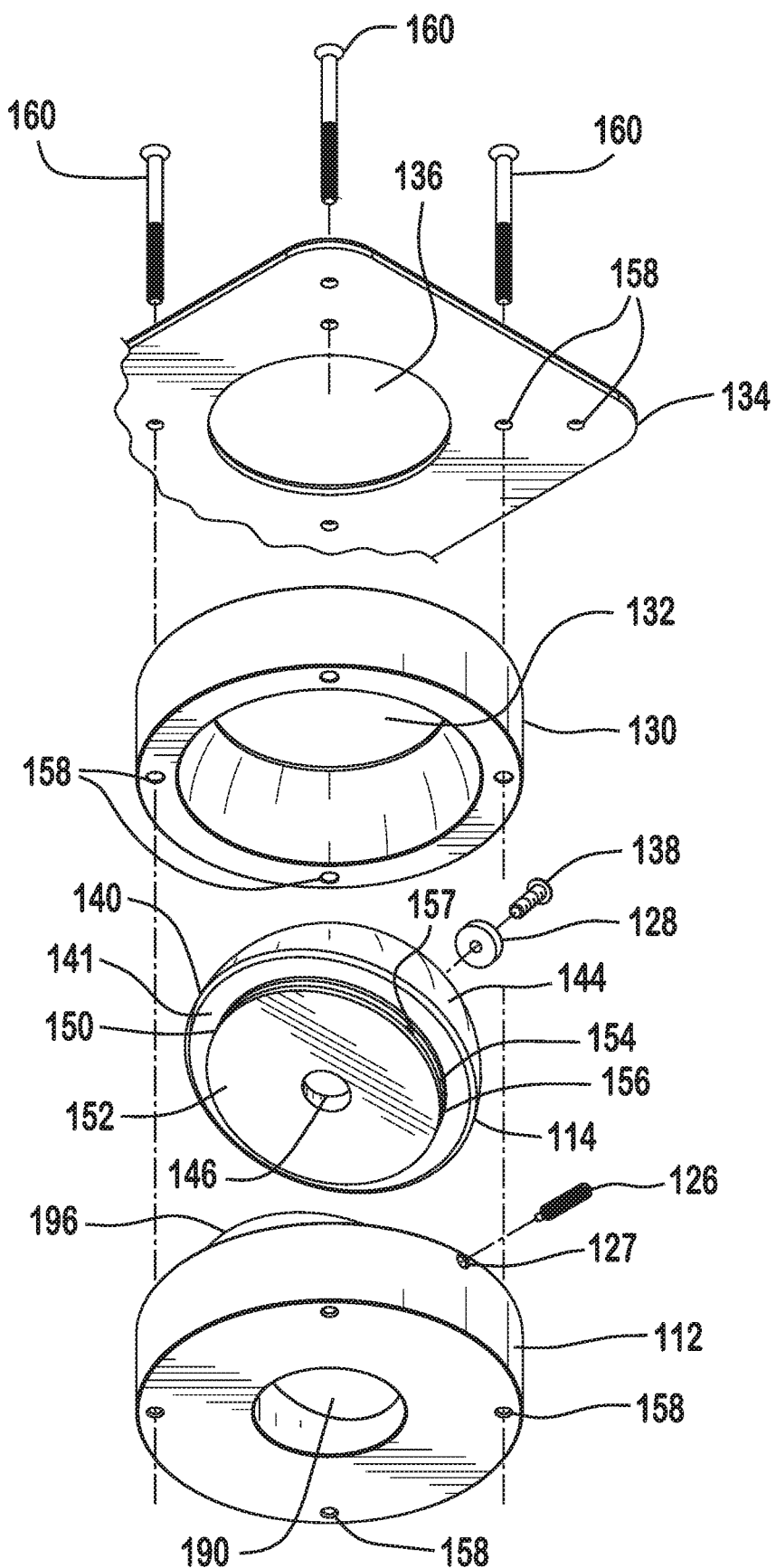
FIG. 10 is a partial upward exploded view of the adjustable frame 110 of FIG. 9, further demonstrating the preferred configuration of some of the preferred elements of the adjustable frame 110. The figure better shows the preferred configuration of the turret 112, with the turret base 150 preferably having a smaller diameter than the turret main body 140. A turret ledge 141 preferably connects the perimeter of the main turret body 140 to the turret base 150. The turret base 150 preferably includes a guide track 156 formed by a groove 154 in the portion of the turret base 150 separating the turret ledge 141 from the flat section 152. The guide track 156 may include one or more rotation stops 157, projections which may block continuous connection of the groove 154. When the turret 114 is placed on the base socket 112 such that the turret base 150 is positioned within the turret seat 120, the flat section 152 may contact the engagement surface 122 and the turret ledge 141 may contact the rotation surface 124. A rotation guide pin 126 may be inserted into the rotation guide opening 127 of the base socket 112 such that it projects into the groove 154 of the guide track 156. This configuration ensures that the rotation guide pin 126 may contact the rotation stop 157 to stop the rotation of the turret 114 at a desired point, preferably the second position. The post opening 146 may extend fully through the turret 114 such that a portion of the post 116 may extend downward past the end of the turret 114. For these reasons, it is preferred that the base hollow 190 of the base socket 112 is at least twice as large in diameter as the post opening 146, to allow for the conical rotation of the post 116 as the turret 114 is rotated. The main turret body 140 preferably forms a hemispherical bulb 144, as this preferred shape may allow the turret 114 to rotate without contacting the collar 130 to induce movement restricting friction.
Figure 11:
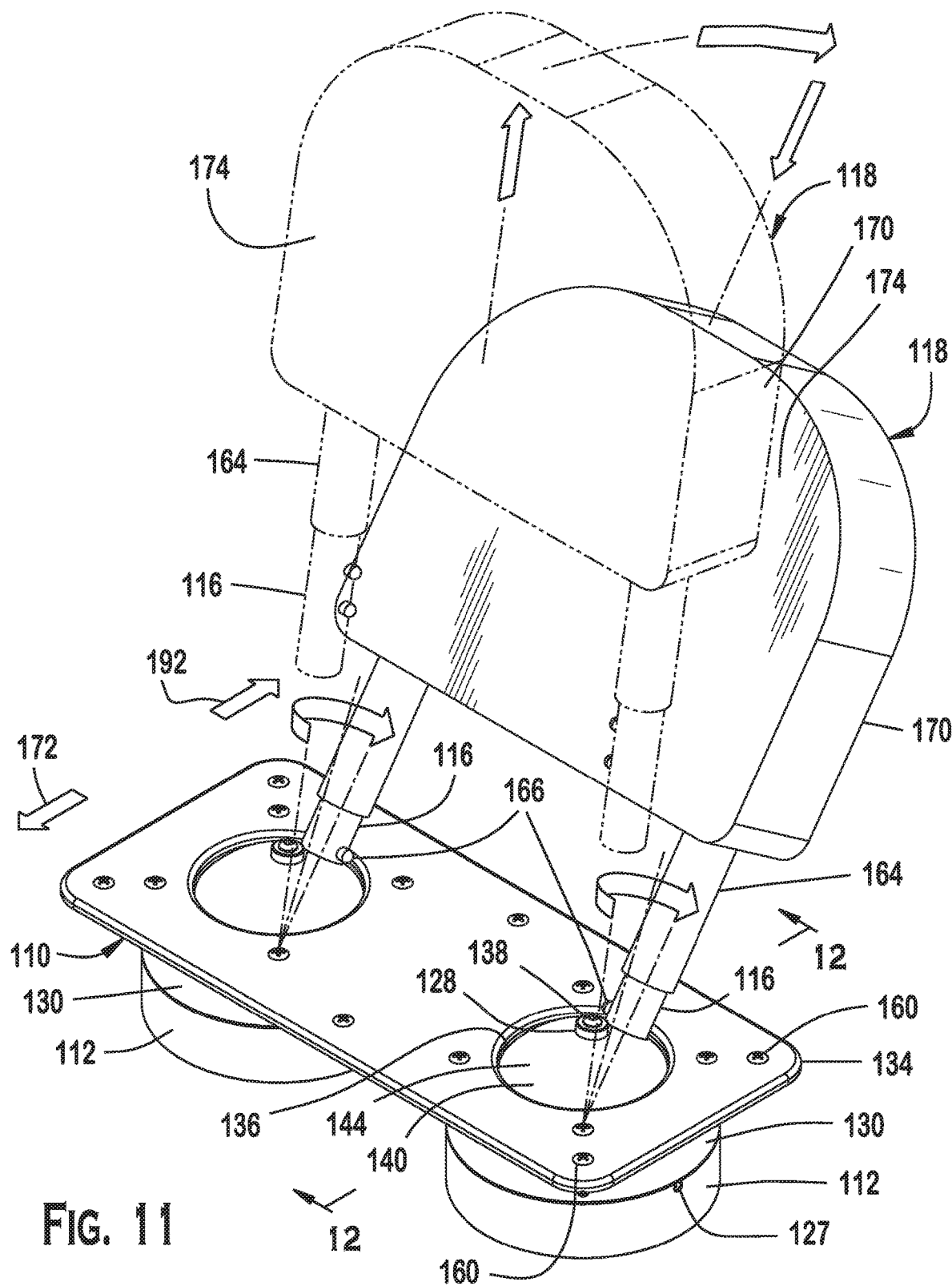
FIG. 11 is a front perspective view of the adjustable frame 110 of a preferred embodiment showing how the adjustable frame 110 may be converted from the first position to the second position. The adjustable frame 110 in the figure includes two posts 116 ending on their upper sides in a single back rest 118 and on their lower sides in separate post openings 146 in separate turrets 114. In the first position, each bumper 128 of each turret 114 is preferably positioned proximate to the rear side of each porthole 136 in the plate 134, with the back rest 118 being held in a more upright position. To transition the adjustable frame 110 to the second position, a user preferably depresses the locking pins 166 in each post 118 and removes the posts 118 from their respective turrets 114. Each turret 114 may then be rotated clockwise about their respective central turret axis 142 until the rotation stop 157 in each groove 154 contacts the rotation guide pin 126 in each base socket 112, halting circular motion. The posts 118 may then be inserted back into the post openings 146, with the posts 118 being positioned proximate to the rear side of the portholes 136 rather than the bumpers 128. While the back rest 118 is reclined when in the second position, leaning back in the reclining direction 192, the forward directed surface 174 preferably remains facing in the same direction when in the first and second positions, namely the viewing direction 172.
Figure 12:
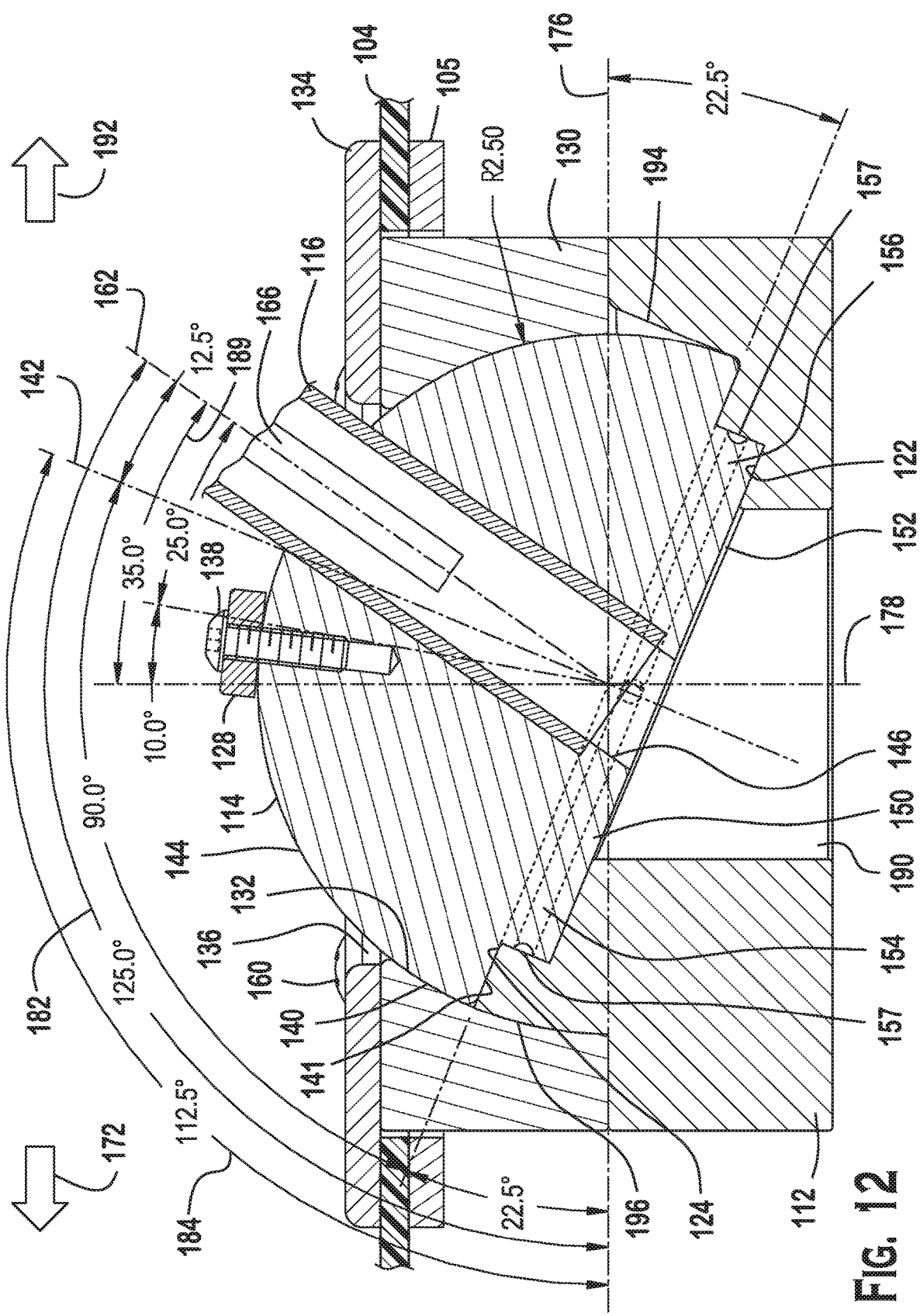
FIG. 12 is a partial cross-sectional view of the adjustable frame 110 of FIG. 11 taken along lines 12-12 of FIG. 11, better showing the adjustable frame 110 in the second position, with the post 116 and backrest 118 having been reclined in the reclining direction 192. To transition the adjustable frame 110 into the second position, the turret 114 (and, in turn, the central post axis 162) is preferably rotated one hundred and eighty degrees about the central turret axis 142. This transition changes the angular position of the backrest 118 relative to the horizontal plane 176 (when measured in the viewing direction 172) to change. When in the second position, the central post axis 162 and the backrest 118 are held at the second angle 182 relative to horizontal plane 176. Preferably, the second angle 182 may be measured at one hundred and twenty-five degrees (125 degrees). As the turret 114 is only rotated, the central turret axis 142 remains in the same orientation in both the first and second positions. Thus, the third angle 184 remains the same at one hundred and twelve and a half degrees (112.5 degrees). Similarly, the fifth angle 188 (the angular position of the central post axis 162 relative to the central turret axis 142) preferably also remains the same at twelve and a half degrees (12.5 degrees). However, the angular position of the central post axis 162 relative to the vertical axis 178 changes when in the second position, with the central post axis 162 no longer being held at the fourth angle 186. The central post axis 162 is instead preferably held an angle of thirty-five degrees (35 degrees) relative to the vertical axis 178 when in the second position, which may be referred to as the sixth angle 189. Preferably, due to the central turret axis 142 being held at an angle relative to the vertical axis 178, the sixth angle 189 is the equivalent of the fourth angle 186 plus two times the fifth angle 188. This is because the central post axis 162, which is originally held at the fourth angle 186 relative to the vertical axis 178, rotates about the central turret axis 142, which it is held at the fifth angle 188 relative to and positioned between the vertical axis 178 and central turret axis 142 when in the first position. Thus, by rotating about the central turret axis 142, the central post axis 142 becomes spaced away from the vertical axis 178 by an angle equal to the fourth angle 186 (the 10 degrees it was already spaced away from the vertical axis 178) and two times the fifth angle 188 (by rotating about the central turret axis 142, such that the central turret axis is now between the vertical axis 178 and central post axis 162, the angle has also increased by double the 12.5 degrees of the fifth angle 188) for a total angle of thirty-five degrees (35 degrees) (the sixth angle 189). Those of ordinary skill in the art will appreciate from this disclosure that the angles specified herein are not limited to the preferred angular measurements described herein, which are included for illustrative purposes and only describe the preferred orientation and movement of the elements.
Figure 13:
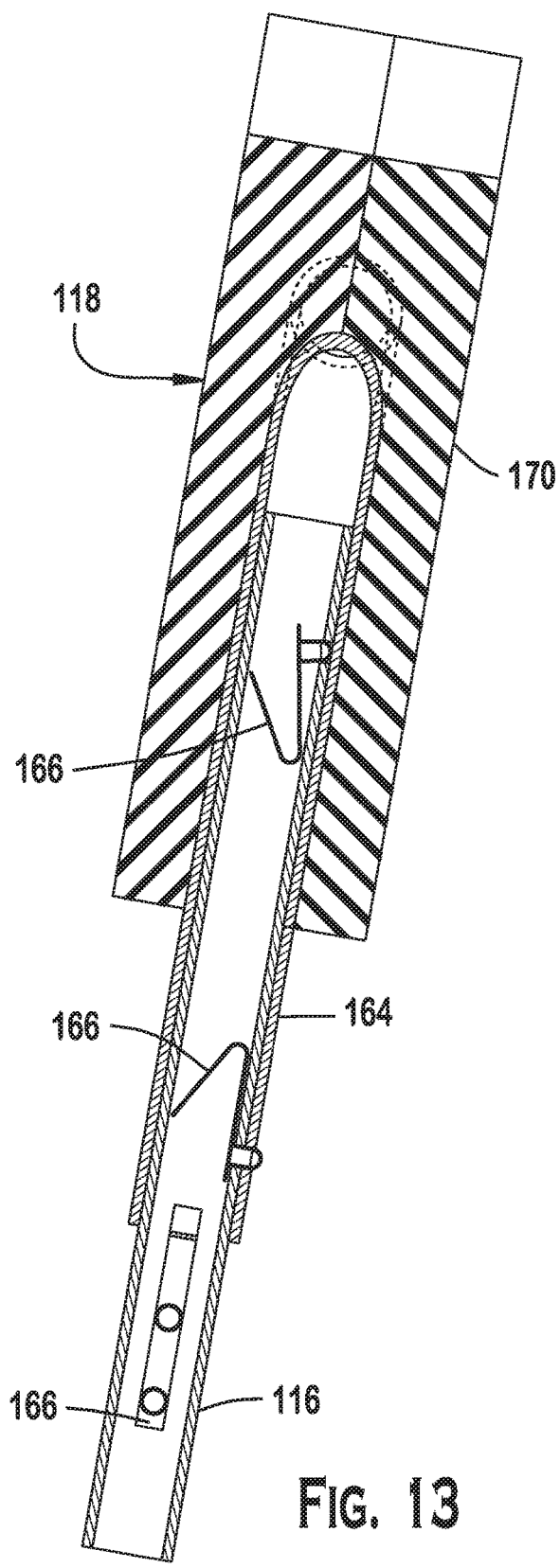
FIG. 13 is a partial cutaway of the backrest 118 of a preferred embodiment as taken perpendicular to the forward directed surface 174. The figure shows that the post 116 preferably includes two locking pins 116 contained therein, one near the top of the post 116 and one near the bottom of the post 116. The post is preferably inserted into a backrest sleeve 164 positioned within the backrest body 170. The diameter of the backrest sleeve 164 is preferably wider than the diameter of the post 116 and preferably has an opening configured to receive the locking pin 166 positioned proximate to the lower end of the backrest sleeve 164. This configuration may allow the height of the backrest 118 relative to the plate 134 to be adjustable. In this figure, the lowest of the locking pins 166 is engaged with the opening in the backrest sleeve 164, thus holding the backrest 118 close to the plate 134 by housing more of the post 116 within the backrest sleeve 164.
Figure 14:
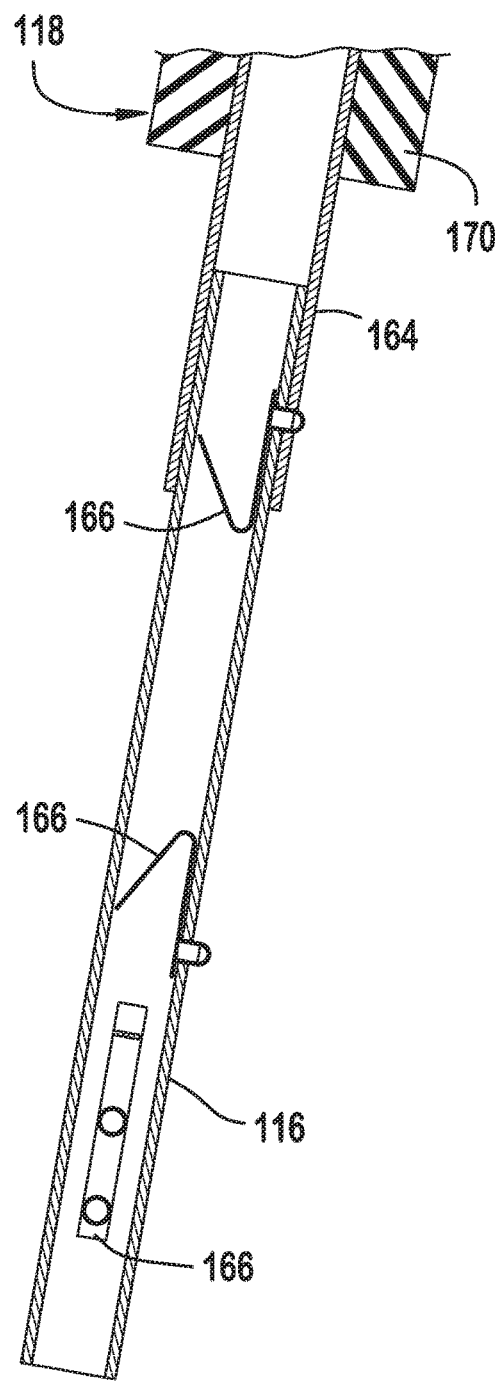
FIG. 14 is an alternate view of backrest 118 of FIG. 13, with the upper most of the locking pins 166 of the post 116 preferably being engaged with the opening in the backrest sleeve 164. The backrest 118 is thus held at a higher position above the plate 134, as only a small portion of the post 116 is housed within the backrest sleeve 164. Taking in combination with FIG. 13, the figure shows a preferred embodiment for how the height of the backrest 118 relative to the plate 134 may be adjusted. Those of ordinary skill in the art will appreciate from this disclosure that in some preferred embodiments, the height of the backrest 118 relative to the plate 134 may not be adjustable, and in other preferred embodiments other means for adjusting the height may be provided, including height extending gears, removable additional sections of post 116, and more.
Figure 15:
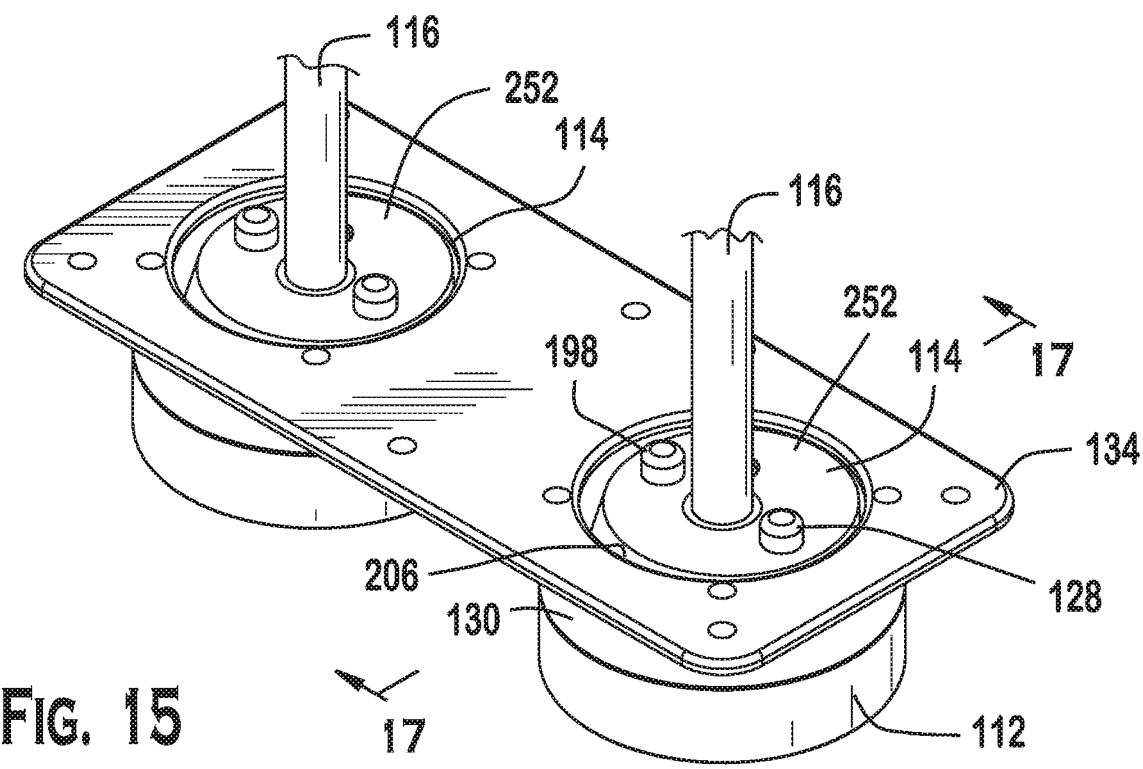
FIG. 15 is a partial front left perspective view of the adjustable frame 110 of an alternate preferred embodiment, showing that in some preferred embodiments, the main turret body 140 is frustoconical or angular cylindric in shape rather than having a hemispherical bulb 144. The main turret body 140 is preferably narrower proximate to the post opening 146 and wider proximate to the base socket 112. The turret preferably defines a top surface 252, a generally flat section on the top of the turret 114 opposite the flat surface 152 which is preferably parallel to the horizontal plane 176. The turrets 114 preferably include two bumpers, a first bumper 128 and a second bumper 198. The first bumper 128 and second bumper 198 may be formed by a portion of the main turret body 140 or may be formed of a separate piece of rubber or some other material and affixed the turret 114 by bumper fasteners 138. The first bumper 128 and second bumper 198 may allow a user to more easily spin the turret 114 by providing easily grasped points for leverage, and simultaneously may prevent excess pressure from being exerted onto the posts 118 if the user leans too far to the lateral sides of the plate 134. The post opening 146 may include a receiving tube 200 configured to receive the post 116, a metal tube housed in the turret 114 to provide extra stability to the post 116 when in the second position.
Figure 16:
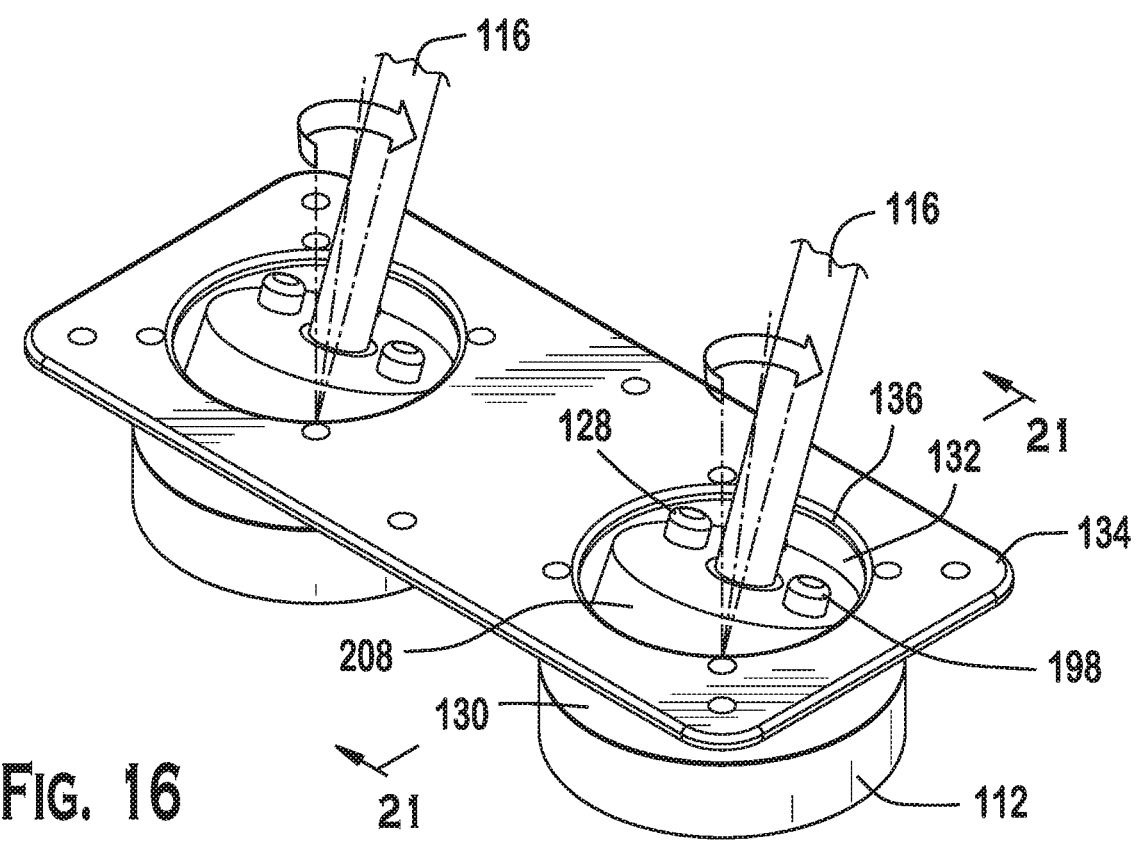
FIG. 16 is an alternate front perspective view of the adjustable frame 110 of FIG. 15, showing how the adjustable frame 110 of this preferred embodiment may be converted from the first position to the second position. Specifically, after removing the posts 116 from the turrets 114, a user can put pressure on the first and second bumpers 128, 198 to cause the turrets 114 to rotate about their respective central turret axis 142 until the turrets 116 have been rotated 180-degrees. The posts 116 may then be inserted back into the post openings 146, with the posts 116 now being positioned proximate to the rear side of the portholes 136 rather than the bumpers 128. While the back rest 118 is reclined when in the second position, leaning back in the reclining direction 192, the forward directed surface 174 preferably remains facing in the same direction when in the first and second positions, namely the viewing direction 172.
Figure 17:
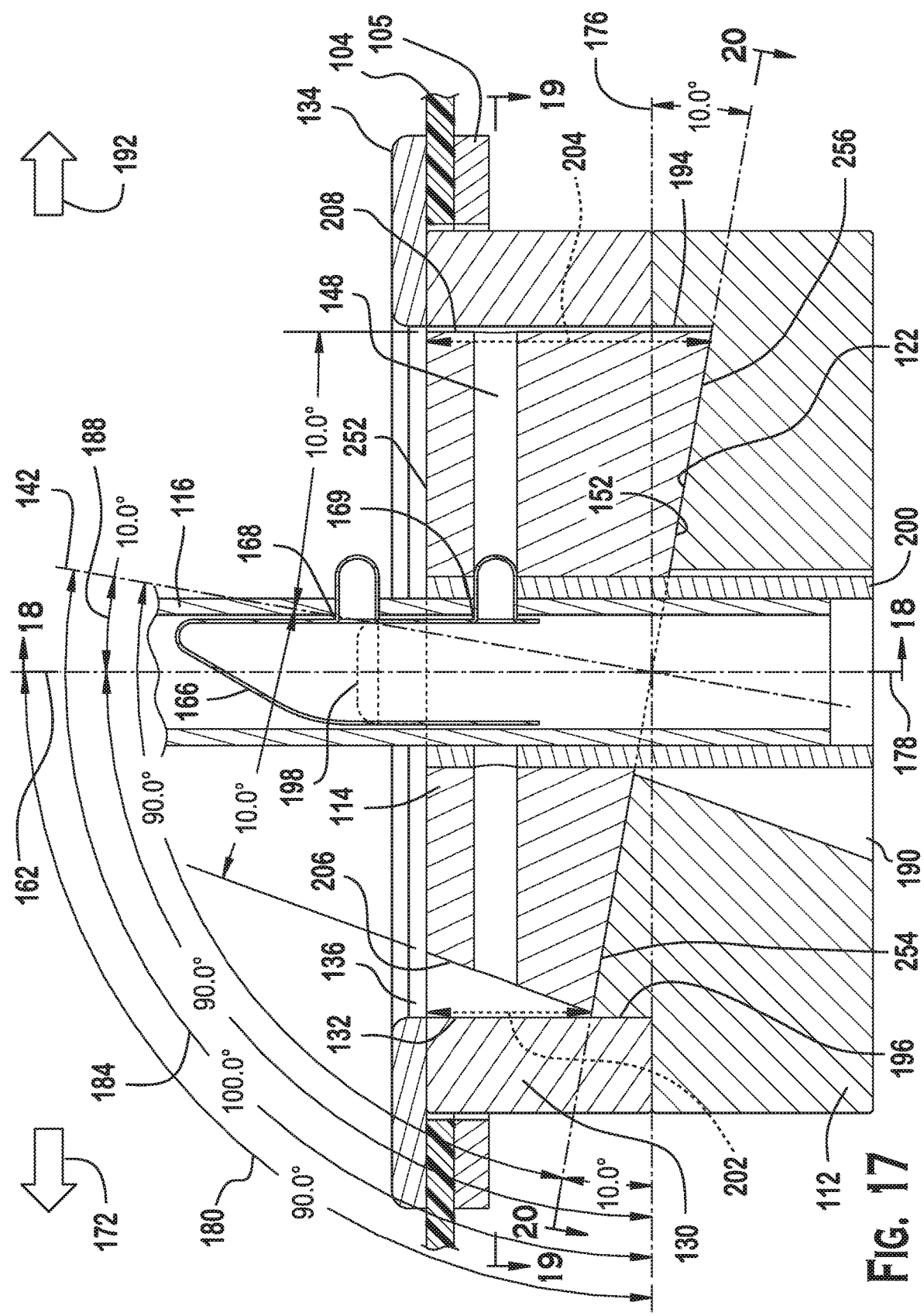
FIG. 17 is partial cross-sectional view of the adjustable frame 110 in the first position as show in FIG. 15 and taken along lines 17-17 of FIG. 15. The figure shows a preferred shape of the turret 114. While the turret 114 is preferably generally frustoconical or cylindric, the figure shows that the turret 114 may have different heights at different points along its circumference. At one point along the circumference of the turret 114, the turret 114 has a longest side 208 defining a longest distance 204 between the flat section 152 and the top surface 252 of the turret 114. Positioned directly opposite the longest side 208 of the turret 114 may be the shortest side 206 of the turret 112 which defines the shortest distance 202 between the flat section 152 and the top surface 252 of the turret 114. Both the longest side 208 and shortest side 206 preferably run generally between the top surface 252 and the flat surface 152. When moving in either a clockwise or counterclockwise from the shortest side 206 toward the longest side 208, the height of the turret (that is, the distance between the flat surface 152 and the top surface 252) gradually increases until the longest side 208 defines the longest distance 204 between the flat surface 152 and the top surface 252. The flat surface 152 preferably is positioned at an angle relative to the top surface 252 and, accordingly, the horizontal plane 176. The figure also shows an alternate preferred embodiment of the angles of the adjustable frame 110 in the first position. In this preferred embodiment, the first angle 180, measured between the horizontal plane 176 and the central post axis 162, is preferably ninety degrees (90 degrees). Thus, in this preferred embodiment, the fourth angle 186, drawn between the vertical axis 178 and the central post axis 162, is zero degrees (0 degrees). The third angle 184, drawn between the horizontal plane 176, is preferably one hundred degrees (100 degrees), thus making the fifth angle 188, drawn between the central post axis 162 and central turret axis 142, is ten degrees (10 degrees). Those of ordinary skill in the art will appreciate from this disclosure that these measurements are only preferred angles and that other angular measurements may be provided without exceeding the scope of this disclosure.
Figure 18:
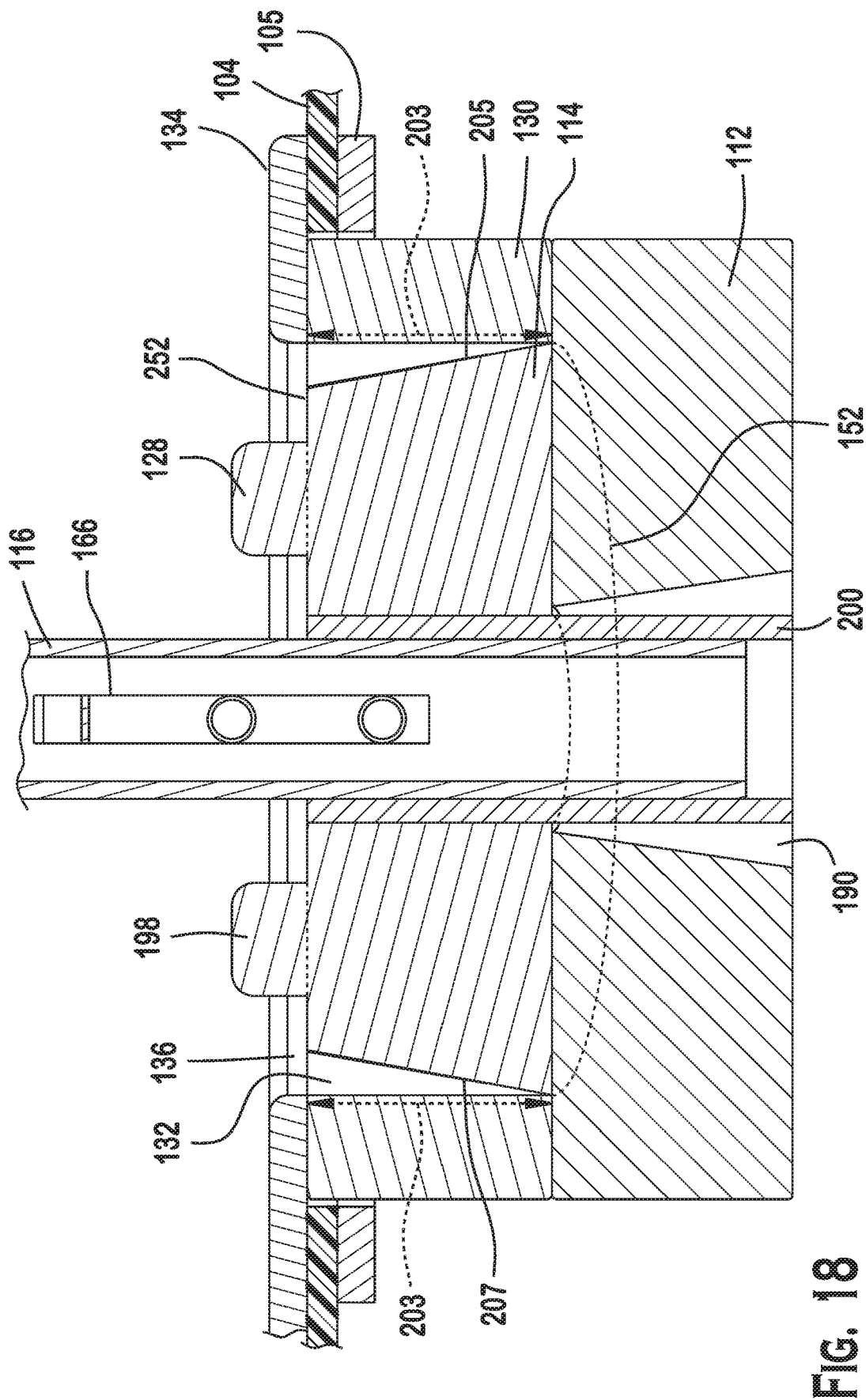
FIG. 18 is a cross-sectional view of the adjustable frame 110 of FIG. 17 as taken along lines 18-18 of FIG. 15, showing a cross-section of the adjustable frame 110 taken perpendicular to FIG. 17. Where
Figure 19:
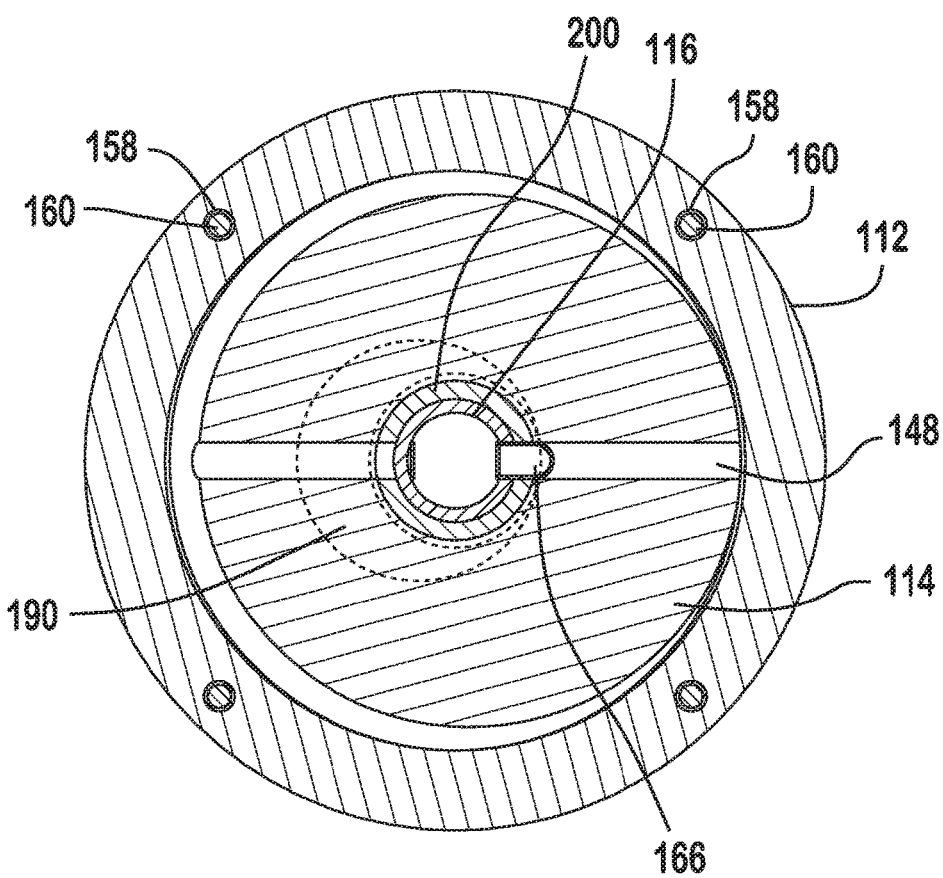
FIG. 19 is a cross-sectional view of the adjustable frame 110 of a preferred embodiment as taken along lines 19-19 of FIG. 19, showing how the manufacturing channel 148 is preferably positioned in the turret 114 on opposite sides of the post opening 146, to allow the locking pin 166 engage therewith when the turret 114 faces forward (as in the first position) or backwards (as in the second position). Those of ordinary skill in the art will appreciate from this disclosure that while the turret 114 may face forward or backwards, the adjustable frame 110 is preferably configured such that the forward directed surface 174 of the backrest 118 is always generally facing in the viewing direction 172 when engaged with the turret 114. The figure also shows that the base hollow 190 is preferably roughly conical in shape, but is offset from the central post axis 162, to allow the post 118 to move forward or otherwise shift without contacting the base socket 112 as the backrest 118 tilts in the reclining direction 192.
Figure 20:
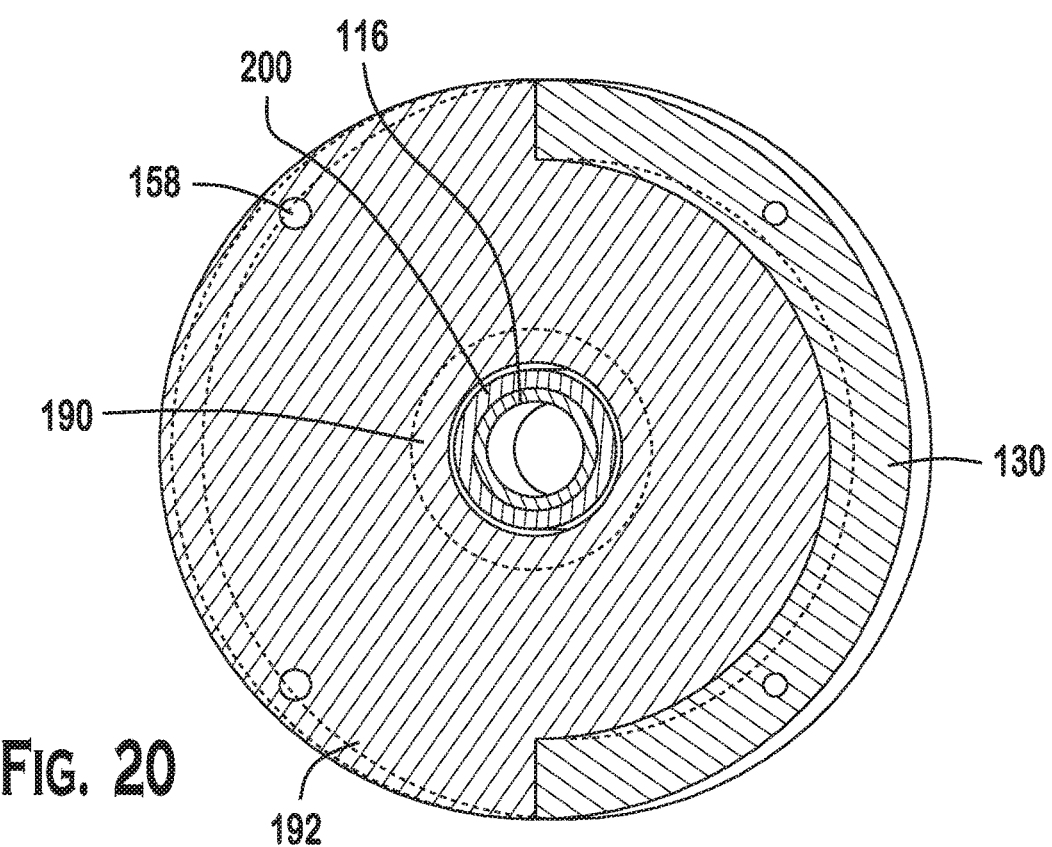
FIG. 20 is a cross-sectional view of the adjustable frame 110 of a preferred embodiment as taken along lines 19-19 of FIG. 19, showing that in some preferred embodiments, the post opening 146 in the turret 114 may further include a receiving tube 200 for the post 118 to be inserted into. The receiving tube 200 may add additional stability to the post 118, stability which may be necessary to avoid damaging the turret 114 through use of the adjustable frame 110.
Figure 21:
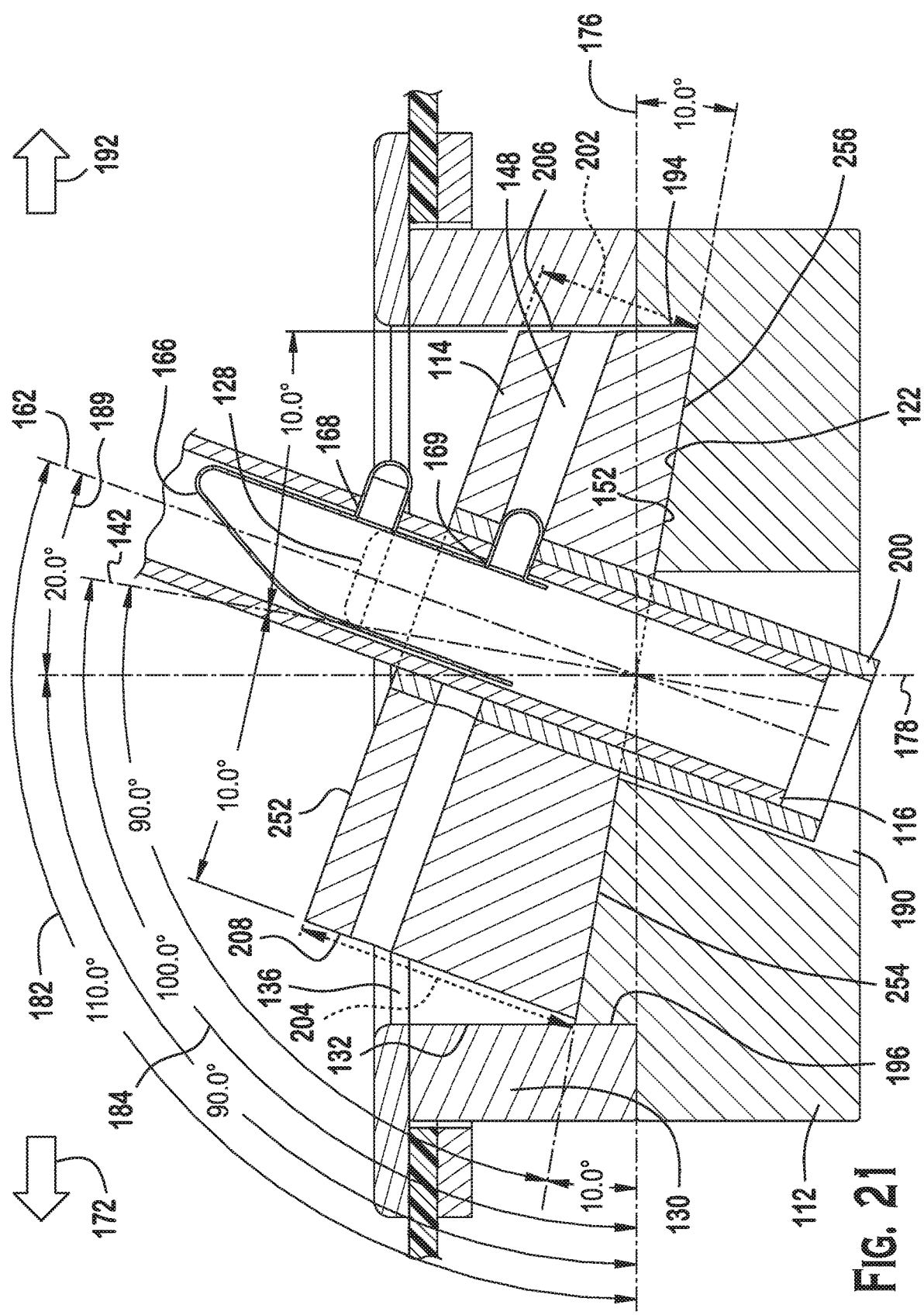
FIG. 21 is an alternate cross-sectional view of the adjustable frame 110 of FIG. 17, with the adjustable frame 110 transitioned into the second position. The figure shows that, when the adjustable frame 110 of this preferred embodiment is transitioned into the second position, the longest side 208 of the turret would be positioned on the elevated side 254 of the base socket 112 and the shortest side 206 would be positioned on the sunken side 256. This configuration may cause the top surface 252 to no longer be parallel to the horizontal plane 176. Instead, the top surface 252 would be held in an angular position relative to the horizontal plane 176, with the longest side 208 projecting upwards through the porthole 136 but leaving a portion of the collar 130 uncovered by the turret 114. In some preferred embodiments the posts 116, and in some embodiments the receiving tube 200 as well, may rotate forward such that the post 116 and/or receiving tube 200 contacts a portion of the base hollow 190 to halt the rotation of the post 116 in the reclining direction 192. In such a configuration, the base socket 112 may partially brace the backrest 118 from reclining backward farther than a desired point. The figure also shows an alternate preferred embodiment of the angles of the adjustable frame 110 in the second position. In this preferred embodiment, the second angle 182, measured between the horizontal plane 176 and the central post axis 162, is preferably one hundred and ten degrees (110 degrees). The measurement of the sixth angle 189, the angular position of the central post axis 162 relative to the vertical axis 178, is preferably the sum of the measurement of the fourth angle 186 plus two times the measurement of the fifth angle 188, with the fourth angle 186 and fifth angle 188 of this preferred embodiment shown in FIG. 17. Thus, the sixth angle 189 of this preferred embodiment is preferably twenty degrees (20 degrees), as this is the fourth angle 186 (0 degrees) plus two times the fifth angle 188 (2×10 degrees) for a sum total of 20 degrees. Those of ordinary skill in the art will appreciate from this disclosure that these measurements are only preferred angles and that other angular measurements may be provided without exceeding the scope of this disclosure.
Figure 22:
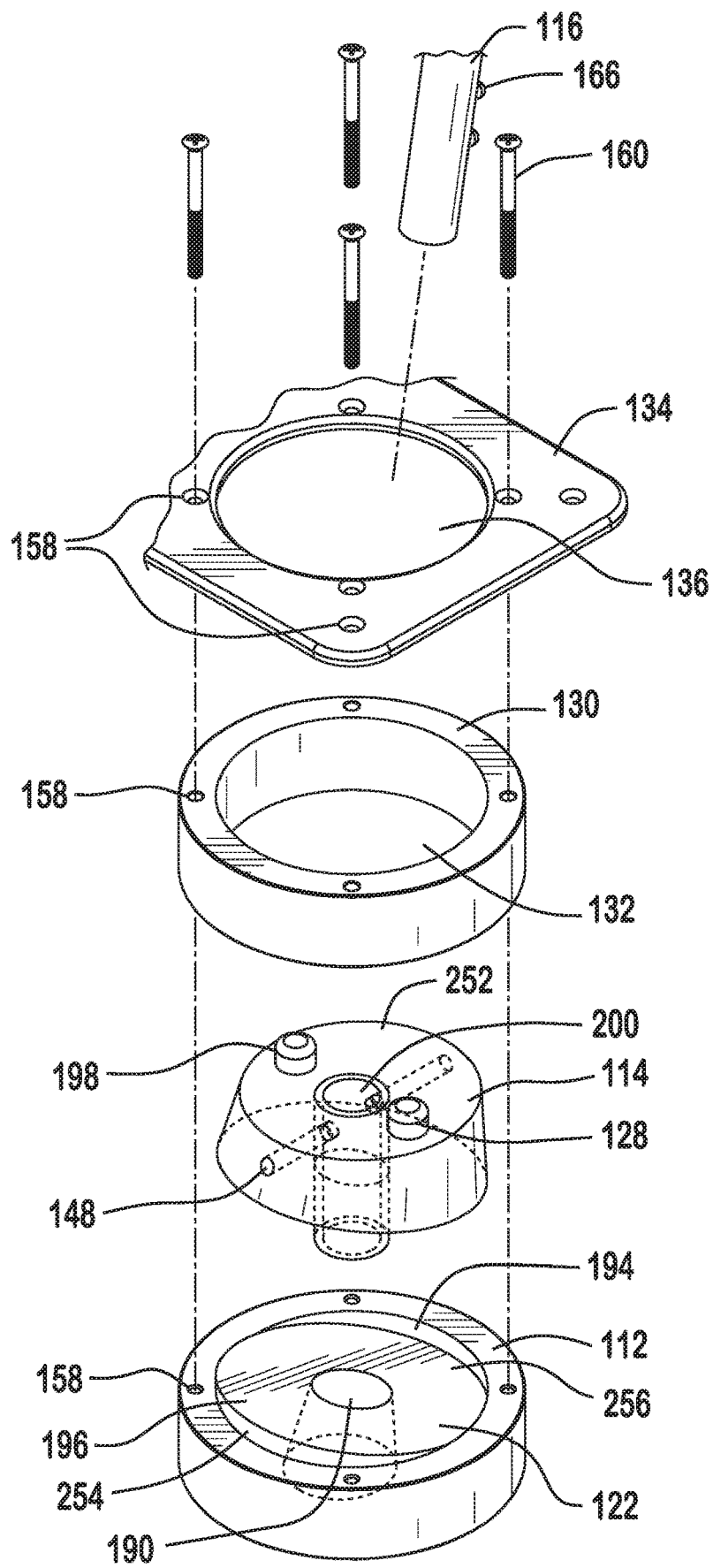
FIG. 22 is an exploded view of the adjustable frame 110 of FIG. 17, showing the preferred assembly of the adjustable frame 110. As in FIG. 9, the adjustable frame 110 is preferably assembled in the first position. Preferably, the turret 144 would be placed on the base socket 112, with the flat surface 152 being positioned on the engagement surface 122 and the receiving tube 200 being inserted into the post opening 190. Preferably, the turret 114 would be positioned onto the base socket 112 with the shortest side 206 positioned on the raised seat wall 196 and the longest side 208 being positioned proximate to the raised perimeter wall 194. The collar 130 may be positioned over the base socket 112 and turret 112, with the turret 114 being positioned within the channel 132 of the collar 130. A plate 134 would then be positioned over the collar 130 with the porthole 136 being positioned roughly above the turret 114. Fasteners 160 could then be inserted through fastener openings 158 in the plate 134, collar 130, and base socket 112, holding this portion of the adjustable frame 110 together. A user could then insert the post 116 into the receiving tube 200, with the post 116 having already been connected to the backrest 118, connecting said portion of the adjustable frame 110 to the backrest 118.
Figure 23:
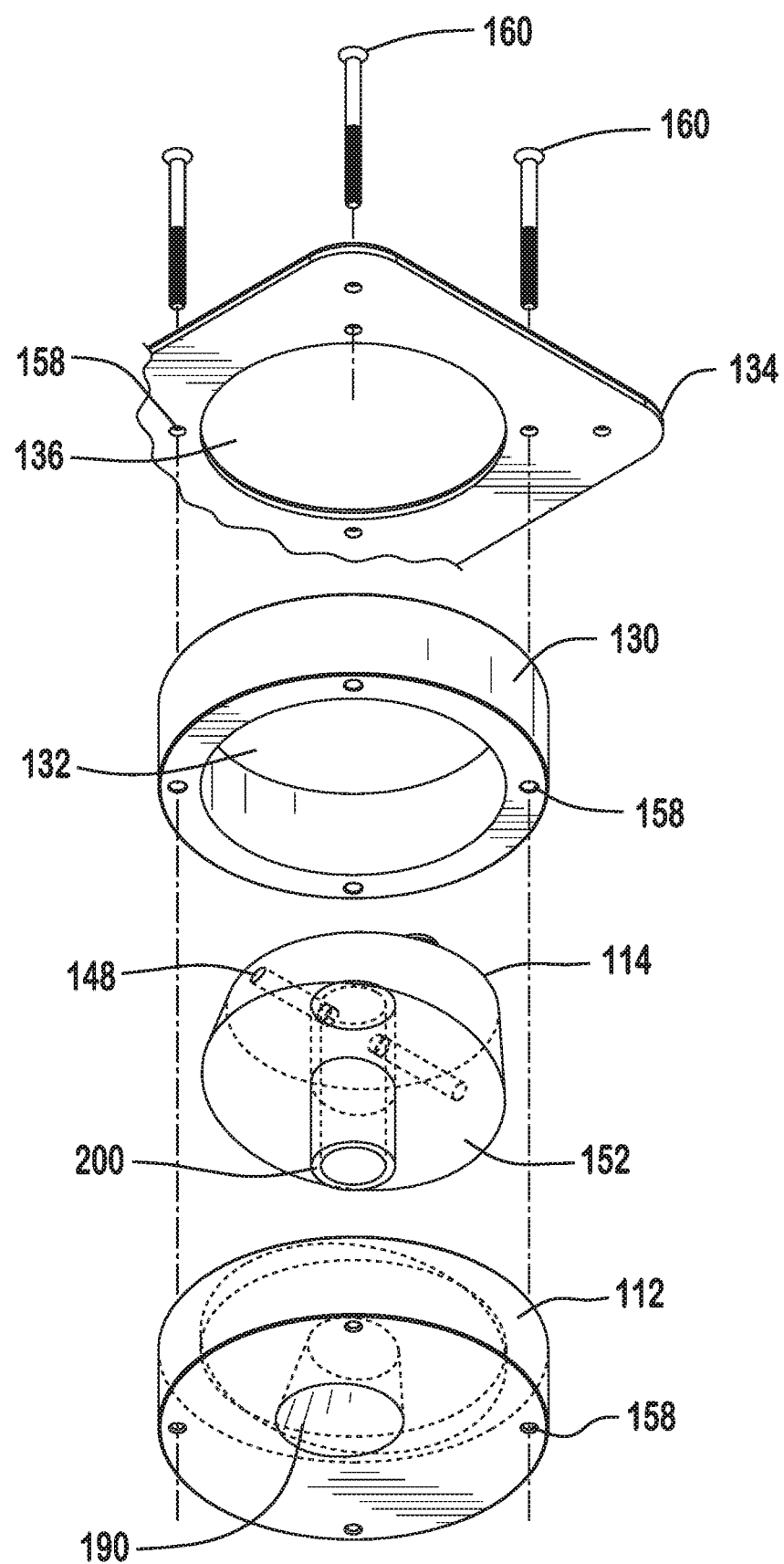
FIG. 23 is a partial upward exploded view of the adjustable frame 110 of FIG. 55, further demonstrating the preferred configuration of some of the preferred elements of the adjustable frame 110. The figure provides a better view of the preferred conical shape of the base hollow 190, and its alignment off center of the central post axis 162. It is instead oriented forward and away from the central post axis 162.
Figure 24:
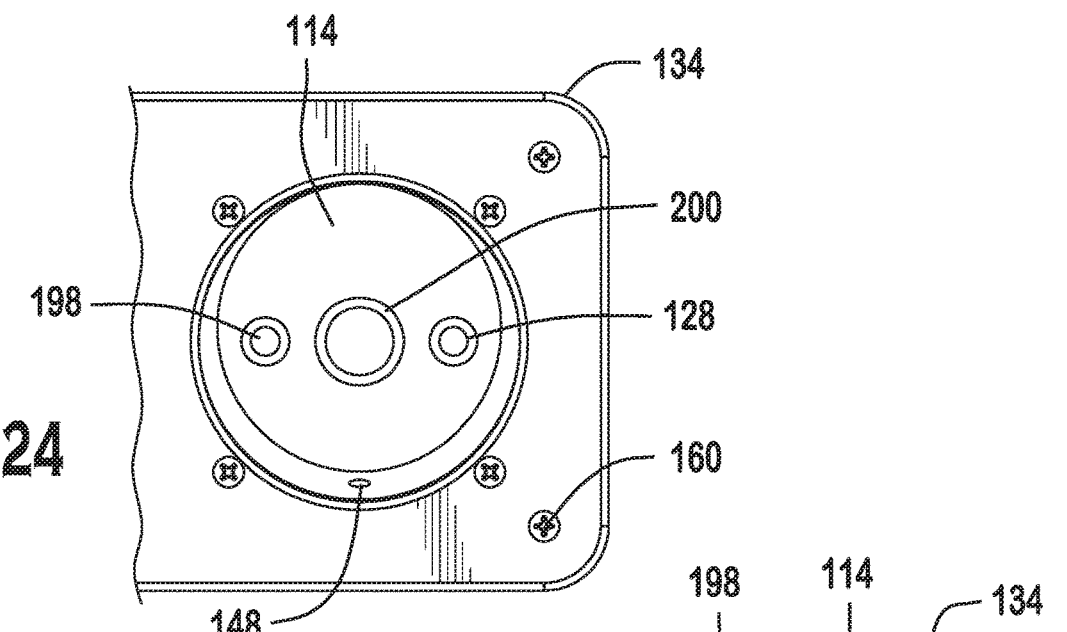
FIG. 24 is a top plan view of the adjustable frame 110 of FIG. 23, with the adjustable frame 110 in the first position. The figure shows that, when the adjustable frame 110 is in the first position, the second bumper 198 (and the second intermediate side 207 of the turret 114 positioned proximate thereto) is preferably positioned to the inner side of the receiving tube 200, the longest side 208 of the turret 114 is positioned to the rear of the receiving tube 200, the first bumper 196 (and the first intermediate side 205 of the turret 114 positioned proximate thereto) is positioned to the outer side of the receiving tube 200, and the shortest side 206 of the turret 114 is positioned in front of the receiving tube 200.
Figure 25:
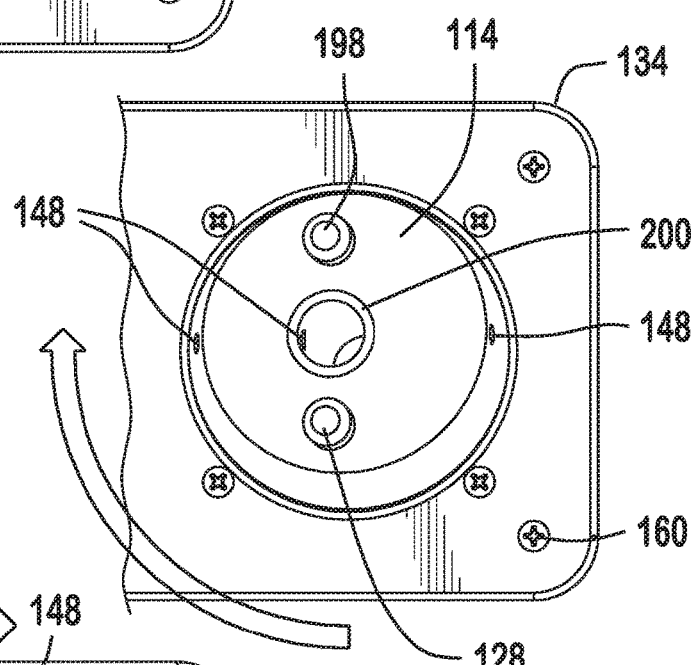
FIG. 25 is a top plan view of the adjustable frame 110 of FIG. 24, with the adjustable frame 110 having been partially moved out of the first position. Specifically, the figure shows the adjustable frame 110 with the turret 114 having been rotated roughly 90 degrees in a clockwise direction, preferably moved by a user applying direction pressure onto the first bumper 128 and/or second bumper 198. In such a configuration, the second bumper 198 (and the second intermediate side 207 of the turret 114 positioned proximate thereto) is preferably positioned to the rear of the receiving tube 200, the longest side 208 of the turret 114 is positioned on the outer side of the receiving tube 200, the first bumper 196 (and the first intermediate side 205 of the turret 114 positioned proximate thereto) being positioned in front of the receiving tube 200, and the shortest side 206 of the turret 114 being positioned to the inner side of the receiving tube 200.
Figure 26:
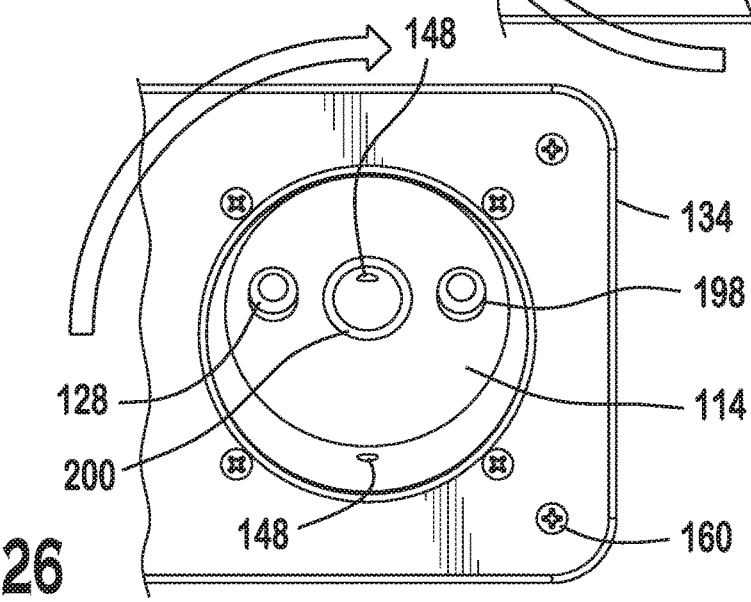
FIG. 26 is a top plan view of the adjustable frame 110 of FIG. 23, with the adjustable frame 110 in the second position. Preferably, the turret 114 has been rotated roughly 180 degrees in a clockwise direction form FIG. 24 and ninety degrees from FIG. 25, preferably by a user applying pressure onto the first bumper 128 and/or second bumper 198. In such a configuration, the second bumper 198 (and the second intermediate side 207 of the turret 114 positioned proximate thereto) is preferably positioned to the outer side of the receiving tube 200, the longest side 208 of the turret 114 is positioned in front of the receiving tube 200, the first bumper 196 (and the first intermediate side 205 of the turret 114 positioned proximate thereto) is positioned to the inner side of the receiving tube 200, and the shortest side 206 of the turret 114 is positioned to the rear of the receiving tube 200.
Figure 27:
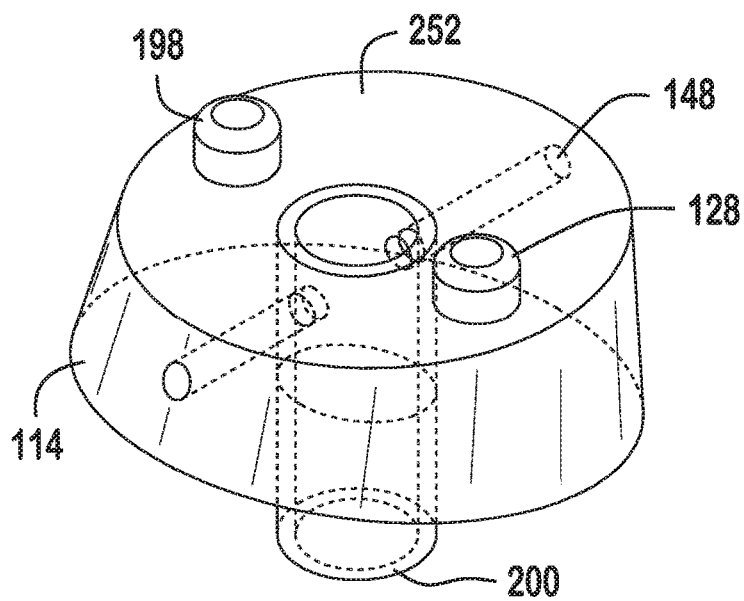
FIG. 27 is a top left-side perspective view of the turret 114 of the adjustable frame 110 of FIG. 23. The figure better shows the generally even and uniformly flat top surface 252, the angled flat surface 152, and the progressive increase in the distance therebetween from the shortest side 206 to the longest side 208.
Figure 28:
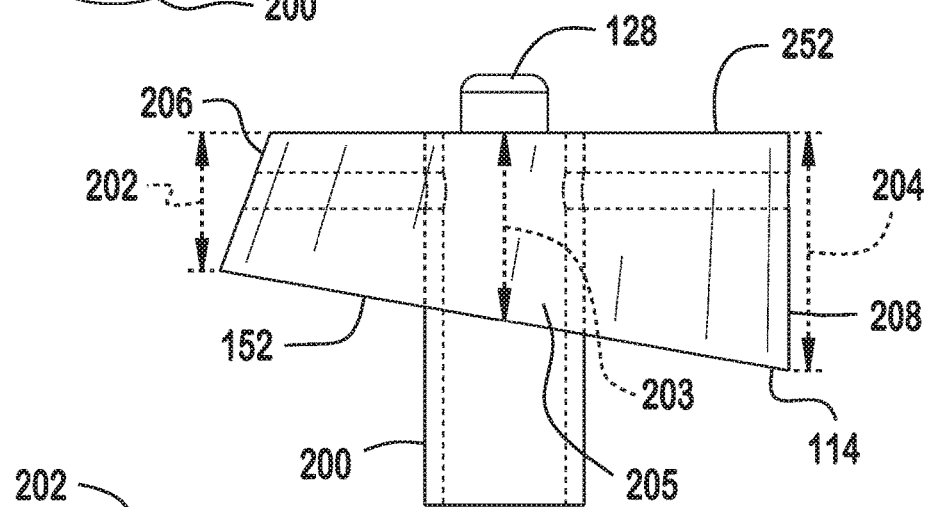
FIG. 28 is a left side elevation view of the turret 114 of FIG. 27. The figure better illustrates how the shortest side 206 defines the shortest distance 202 between top surface 252 and the flat surface 152, and how the longest side 208 defines the longest distance 204 between the top surface 252 and the flat surface 152.
Figure 29:
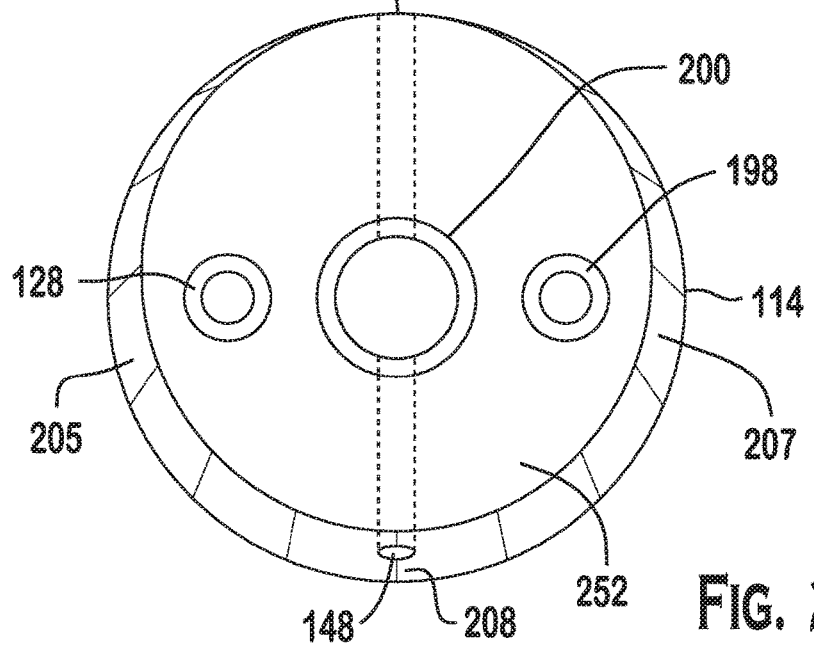
FIG. 29 is a top plan view of the turret 144 of FIG. 28, showing how the manufacturing channel 148 preferably runs fully through the maximum diameter of the main turret body 140. The figure further shows that the first and second bumper 128, 198 are preferably positioned roughly perpendicular to the manufacturing channel 148.
Figure 30:
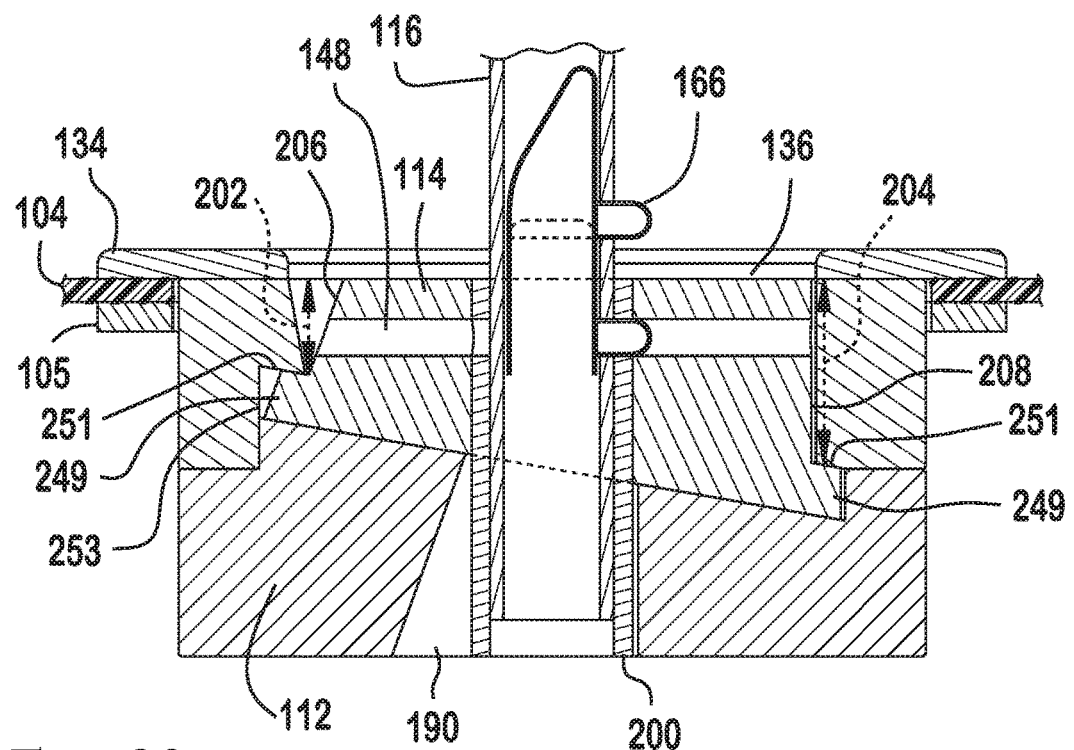
FIG. 30 is an alternate cross-section view of the adjustable frame 110 of FIG. 17, with the adjustable frame 110 in the first position. The figure demonstrates that in some preferred embodiments the turret 114 may include a turret base 150 which is wider than the main turret body 140. In such embodiments, the turret base 150 may thus form a base step 249, a ledge about the lower side of the main turret body 140 that forms a turret rotation surface 248 along its upper side. The turret rotation surface 150 is preferably configured to contact a collar ledge 251, a projection from the collar 130 into the channel 132. In order to facilitate rotation of the turret 114 between the collar ledge 251 and the raised seat wall 196, the collar 130 preferably also defines a collar recess 253, a cut-away portion of the collar 130 configured to provide space for the base step 249. The combination of the collar ledge 251 and base step 249 preferably allows the collar 130 to better secure the turret 114 against the base socket 112.
Figure 31:
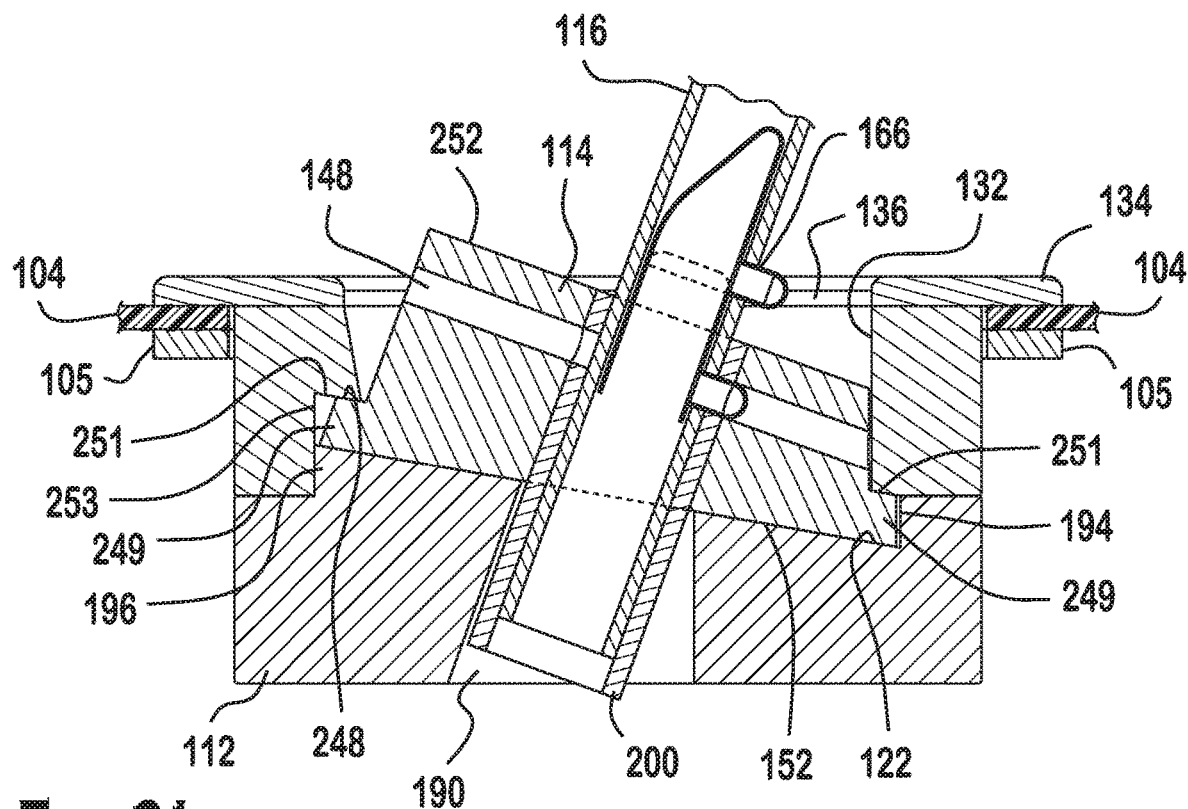
FIG. 31 is a corresponding cross-sectional view to FIG. 30, with the adjustable frame 110 in the second position. The figure demonstrates that the collar ledge 251 and base step 249 run the entire perimeters of the collar 130 and turret base 150, respectively. The figure also shows that the collar ledge 251 may provide additional support to the backrest 118 from additional, unwanted reclination. Pressure is preferably distributed between the post 116, turret 114, collar 130, and base socket 112. Specifically, downward pressure may be distributed from the post 116 onto the rear side of the turret 114 and the top of the base socket 112. Upward pressure may be exerted onto the post 116 and distributed onto the front side of the base hollow 119, as well as onto the turret 114, passing through the base step 249 and onto the collar ledge 251 of the collar.
Figure 32:
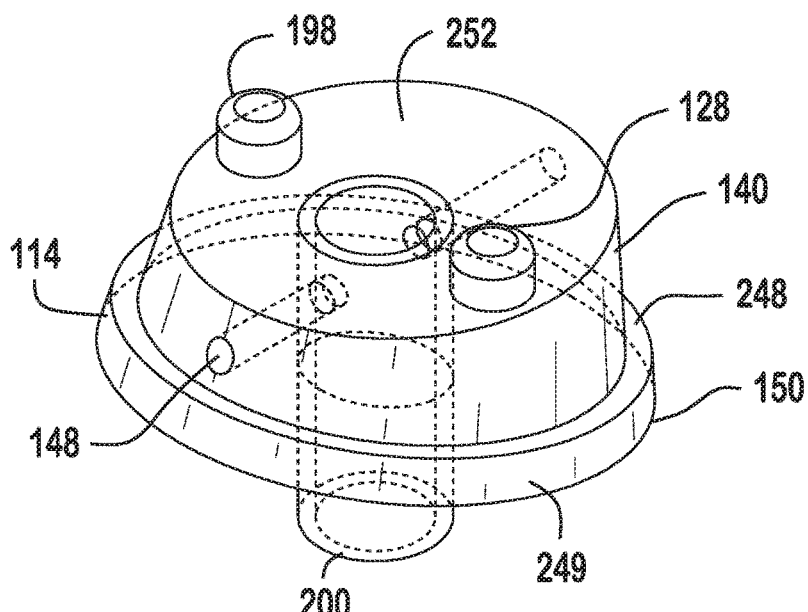
FIG. 32 is front left-side perspective view of the turret 114 of the adjustable frame 110 of FIG. 31, demonstrating that the base step 249 and turret rotation surface 248 run the entire perimeter of the turret base 150.
Figure 33:
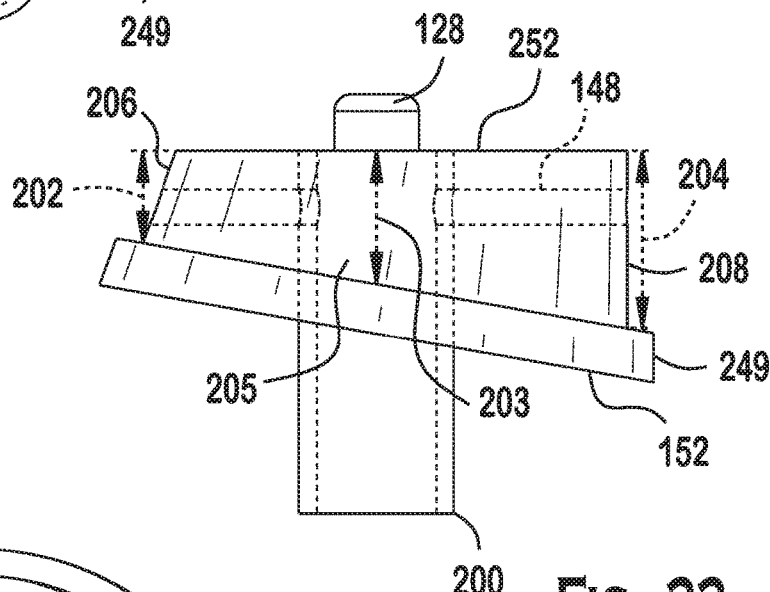
FIG. 33 is a left side elevational view of the turret 114 of FIG. 32. The figure shows that the base step 249 is preferably has an angled side wall parallel to the shortest side 206 of the turret 114, the flat section 152 on its lower side which is preferably angled, and the turret rotation surface 248 on its upper side that is preferably roughly parallel to the rotation surface 248.
Figure 34:
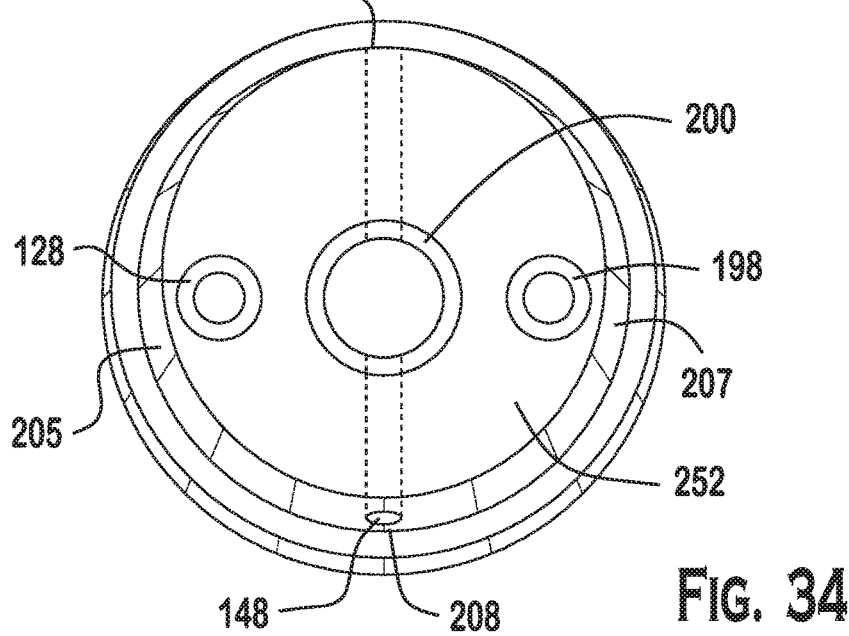
FIG. 34 is a top plan view of the turret 114 of FIG. 33, demonstrating that in this preferred embodiment the turret base 150 is wider than the main turret body 140. This forms the base step 249 which defines the turret rotation surface 248.

Certain terminology is used in the following description for convenience only and is not limiting. At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. The words "right," "left," "up," and "down" designate the directions as they would be understood by a person facing in the viewing direction unless specified otherwise. The words "outer" and "inner" refer to directions away from and toward, respectively, the geometric center of the specified element, or, if no part is specified, the geometric center of the plate 134. The terms "downward" and "upward" refers to directions above and below the base hollow 190, respectively, unless specified otherwise. The terms "forward" and "front" refer to a direction in front of the backrest 118 (or in the viewing direction 172) and the term "rear" refers to a direction behind the backrest 118 (or in the reclining direction 192). The terms "axial" and "radial" refer to directions toward the front and rear and right and left of the plate 134, respectively. The terms "touching," "abutting," "against," and "contacting" when used in connection with two surfaces is defined as meaning "being positioned anywhere between actual touching of two surfaces to being in facing orientation and within 1 inch (or 2.54 centimeters) apart." Additionally, the words "a" and "one" are defined as including one or more of the referenced items unless specifically stated otherwise. The terminology includes the words specifically mentioned above, derivatives thereof, and words of similar import. Those of ordinary skill in the art will appreciate from this disclosure that when a range is provided, such as (for example) an angle, distance, weight, or volume being between one (1 of the appropriate unit) and ten (10 of the appropriate units) that specific support is provided by the specification to identify any number within the range as being disclosed for use with a preferred embodiment. For example, the recitation of an angle between fifteen (15) degrees and forty-five (45) degrees provides specific support for a preferred embodiment having an angle of thirty (30) degrees even if not separately listed herein and thus provides support for claiming a preferred embodiment having an angle of thirty (30) degrees.

Referring to FIGS. 1-44, wherein like numerals indicate like elements throughout, there are shown preferred embodiments of an adjustable frame 110. The term "adjustable frame" may be understood from this disclosure by those of ordinary skill in the art to refer to any assembly that is configured for conjoining two or more elements which may be held at an angular position relative to one another.

Preferably, the two or more connected elements may include those elements which form a seat 108. Most generally speaking, a seat 108 refers to a device which provides both a surface for a person 106 to position his or her posterior on and a surface for a person 106 to simultaneously position his or her back against. It is preferred that the seat 108 preferably comprises two or more use positions, with the angle of the back support in relation to the posterior support being different in each position. In some preferred embodiments, the posterior support may be formed of a seat frame 160, and in other preferred embodiments, the posterior support may be formed by a portion of a vehicle, such as boat decking 104. In the preferred embodiments, the back support is formed by a backrest 118, with the backrest 118 being connected to the posterior support by the adjustable frame 110. Preferably, the adjustable frame 110 changes the position of the backrest 118 while the position of the posterior support, be it the seat frame 260 or the boat decking 104, remains constant. In the first configuration, the backrest 118 is preferably held at the first angle 180 relative to the boat decking 104 or seat frame 260. In the second configuration, the backrest 118 is preferably held at the second angle 182 relative to the boat decking 104 or seat frame 260.

Referring to FIGS. 1-3 and 43-44, the combination vehicle and adjustable frame 100 may include any vehicle, defined herein as any machine or device for transporting persons and/or cargo, such as cars, trucks, wagons, carriages, tanks, motorcycles, train cars, trailers, and more. In some preferred embodiments, such as those shown in the figures, the vehicle is preferably a boat 102. The boat 102 preferably has boat decking 104, portions of the boat 102 configured for standing or sitting by a person 106, distinguishable from the hull and sidewalls of the boat 102, among other boat structures of the boat 102. Preferably, the boat decking 104 may form the preferred base position for the seat 108, with the backrest 118 being held in an angular position in relation to the boat decking 104. This may mean that a portion of the adjustable frame 110 is positioned through or within the boat decking 104.

Referring to FIGS. 1-3 the combination vehicle and adjustable frame 100 preferably includes a boat 102 as the vehicle. A portion of the boat 102 and the adjustable frame 100 may combine to form a seat 108. Preferably, a portion of the adjustable frame 110 may be positioned within an opening or hole cut in the boat decking 104. A plate 134 may be positioned on the boat decking 102 above and/or adjacent to the opening or openings. The turret(s) 114 of the adjustable frame 110 preferably partially projects through the porthole(s) 136 in the plate 134. When post(s) 116 are inserted into the post opening(s) 146 of the turret(s) 114 to connect the backrest 118 to the rest of the adjustable frame 110, the adjustable frame 110 and boat decking 104 may combine to form a seat 108. Conversely, when the posts 116 have been removed, the plate 134 and turret(s) 114 preferably do not project sufficiently upward above the boat decking 104. This preferred configuration may prevent posing a tripping hazard to persons 106 walking on the boat decking 102. Preferably, the combination vehicle and adjustable frame 100 may include several adjustable frames 110 positioned at various points along the boat decking 104. This may allow the boat owner to adjust the number of seats 108 on the boat 102—connecting posts 116 to turrets 114 to add seats 108, or removing posts 116 and backrests 118 and storing them in lockers to reduce the number of seats 108 on the boat 102.

In other words, the combination vehicle and adjustable frame 100 of a preferred embodiment preferably includes a boat 102 having boat decking 102, and the adjustable frame 110 being engaged with the boat decking 104. The boat decking 104 and the backrest 118 preferably combine to form a seat 108. In other preferred embodiments, the combination vehicle and adjustable frame 100 may include a vehicle of any kind which defines a generally flat surface. The adjustable frame 110 is preferably engaged with the surface in some way, such that the surface and backrest 118 combine to form a seat 108 by supporting both the posterior and back of a person 106. Preferably, this includes the adjustable frame 110 being positioned on or in a portion of the vehicle.

Referring to FIGS. 4-12, the adjustable frame 110 is preferably configured to support a backrest 118 at an angular position relative to a horizontal plane 176. In preferred embodiments of the combination vehicle and adjustable frame 100, the horizontal plane 176 is preferably parallel to the boat decking 104. Generally speaking, the adjustable frame 110 preferably comprises the following major elements—a base socket 112, a turret 114, a collar 130, a plate 134, a post 116, and a backrest 118. More preferably, the adjustable frame 110 may include two of each of: (1) the base socket 112; (2) the turret 114; (3) the collar 130; and (4) the post 116, with the two posts 116 being configured to engage separate turrets 114 but a single backrest 118.

The base socket 112 is preferably roughly formed in the shape of a hollow cylinder, and preferably sits at the lowest level below and/or within the boat decking 104. The opening in the bottom of the base socket 112 preferably forms the base hollow 190, which provides room for a post 116 therein to pivot, as will be described in more detail below. Preferably, the perimeter of the top of the base socket 112 forms a flat surface roughly parallel to the horizontal place 176 for the collar 130 to be positioned on. Moving inward toward the geometric center of the base socket 112, the base socket 112 preferable has a rotation surface 124, a circular portion positioned at an angle relative to the horizontal plane 176 for the turret 114 to rotate along. Being at an angle, a portion of the rotation surface 124 rises above the perimeter and thus forms a raised seat wall 196. Conversely, a portion of the base socket 112 is sunken below the perimeter with the perimeter forming a raised perimeter wall 196. The base socket 112 preferably further defines an engagement surface 122, a circular portion position on the inner side of the rotation surface 124 having a parallel orientation to the rotation surface 124 but being lower that the rotation surface 124. When viewed in cross section, the engagement surface 122 is preferably also angled relative to a horizontal plane 176. Thus, the engagement surface 122 is a step below the rotation surface 124, and a sidewall surface 125 separates these surfaces. In other words, the rotation surface 124, which is parallel to the engagement surface 122 and connected thereto by a sidewall surface 125, and the sidewall surface 122 and the engagement surface 122 combine to form the turret seat. At the inner most portion of the base socket 112 is the base hollow 190, preferably a circular hole therethrough. The engagement surface 122, sidewall surface 125, engagement surface 122, and raised perimeter wall 194 form a cylindrical turret seat 120 for a portion of the turret 114 to be positioned within. The base socket 112 may further include fastener openings 158 for fasteners 157 to be inserted through, and a rotation guide opening 127 for a rotation guide pin 126 to be inserted into.

The base socket 112 is preferably formed of a suitable strong and lightweight material to allow it to be durable without decreasing its ability to be assembled modularly or affecting its functionality. Preferably, the base socket 112 is formed of molded plastic. However, those of ordinary skill in the art will appreciate from this disclosure that the base socket 112 may be formed of any other suitable material, such as fiber glass, hard rubber, wood, PVC, or metal.

The turret 114 is preferably positionable on the base socket 112 such that a portion of the turret 114 is positioned in, or on, the turret seat 120. The turret 114 preferably has a flat section 152 that is preferably formed by the underside of the turret 114. The flat section 152 is preferably a uniform flat surface, configured to be positioned on (and thus to abut) the engagement surface 122 when the turret 114 engages the turret seat 120. The flat section 152 preferably allows the turret 114 to rotate, with the flat section 152 sliding along the engagement surface 122.

In some preferred embodiments, the adjustable frame 110 includes a turret 114 having a main turret body 140, which is preferably generally hemispherical in shape (forming the hemispherical bulb 144), and a turret base 150 which defines the flat section 152. The turret base 150 is preferably configured to project downward from the main turret body 140 and is configured to nest within the turret seat 120 of the base socket 112 such that the flat section 152 of the turret base 150 abuts the engagement surface 122 of the base socket 112. In some preferred embodiments, a portion of the main turret body 140 may also abut the rotation surface 124 of the base socket 112. Both the main turret body 140 and the turret base 150 preferably have roughly circular perimeters when viewed from below. The turret base 150 preferably has a smaller diameter than the main turret body 140 and is preferably centered such that a turret ledge 141 joins the main turret body 140 to the turret base 150. The turret ledge 141 is preferably a smooth surface parallel to the flat surface 152, and is configured to abut the rotation surface 124 and to slide smoothly thereon when the turret 114 is rotated. The flat section 152 is preferably lower than the turret ledge 141, and is preferably separate therefrom by a groove 154. The groove 154 may provide a guide track 156 which is engageable by the base socket 112 and controls the rotation of the turret 114 relative to the base socket 112. The groove 154 is preferably configured such that the rotation guide pin 126 can be inserted through the rotation guide opening 127 in the base socket 112 and partially extend into the groove 154 when the turret 114 is positioned in the turret seat 120.

Figure 45:
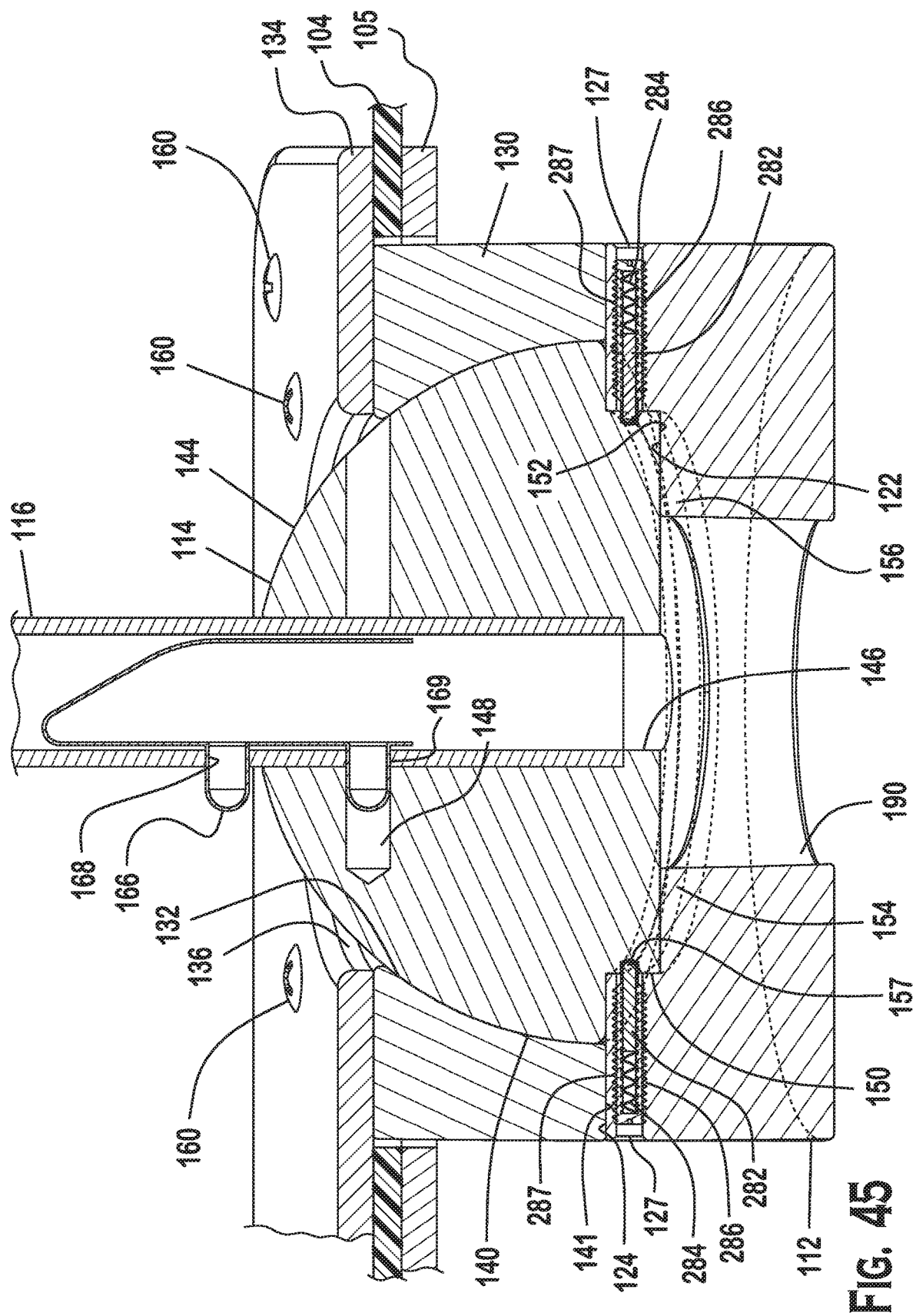
FIG. 45 is an alternate partial cross-sectional view of the adjustable frame 110 of FIG. 5 as taken along lines 6-6 of FIG. 5, showing an alternate preferred embodiment in which a guide pin mechanism 286 may be inserted into the rotation guide opening 127 in the place of the rotation guide pin 126. The guide pin mechanism 286 preferably has an opening therein which may contain a biasing spring 284 and a projecting rod 282, with the biasing spring 184 being preferably positioned between the projecting rod 282 and the rear side of the guide pin mechanism 286. This configuration may encourage the projecting rod 282 to push outward from the inside of the guide pin mechanism 286. The guide pin mechanism 286 may further have a threaded surface 286 on its outer surface, with the threaded surface 286 preferably configured to engage with the rotation guide opening 127 to allow the guide pin mechanism 286 to be screwed into the rotation guide opening 127. The guide track 156 may include rotation stops 157 which are inward indentations in the turret base 150 rather than outward protrusions into the groove 154. The rotation stops 157 of this preferred embodiment preferably have curved inward slopes leading thereto. With the biasing spring 284 pushing the projecting rod 282 out of the guide pin mechanism 286 and inward against the turret base 150 in the groove 154, the curved inward slopes may allow the rotation stops 157 to slow the rotation of the turret 114 at the desired position while still allow the projecting rod 282 to be rotated out of the rotation stops 157 by the rotation of the turret 114.

Referring to FIG. 45, in some preferred embodiments of the adjustable frame 110, a guide pin mechanism 286 may be inserted into the rotation guide opening 127 in the place of the rotation guide pin 126. The guide pin mechanism 286 preferably has an opening therein which may contain a biasing spring 284 and a projecting rod 282. The biasing spring 184 is preferably positioned between the projecting rod 282 and the rear side of the guide pin mechanism 286 to encourage the projecting rod 282 to push outward from the inside of the guide pin mechanism 286. The guide pin mechanism 286 may further have a threaded surface 286 on its outer surface, with the threaded surface 286 preferably configured to engage with the rotation guide opening 127 to allow the guide pin mechanism 286 to be screwed into the rotation guide opening 127. The guide track 156 may include rotation stops 157, with the rotation stops 157 being formed as inward indentations in the turret base 150 rather than outward protrusions into the groove 154. The rotation stops 157 of this preferred embodiment preferably have curved inward slopes leading thereto. With the biasing spring 284 pushing the projecting rod 282 out of the guide pin mechanism 286 and inward against the turret base 150 in the groove 154, the curved inward slopes may allow the rotation stops 157 to slow the rotation of the turret 114 at the desired position while still allow the projecting rod 282 to be rotated out of the rotation stops 157 by the rotation of the turret 114.

In some preferred embodiments, the turret 114 may include two guide pin mechanisms 286 in two rotation guide openings 127 in the base socket 112. Those of ordinary skill in the art will appreciate from this disclosure that any number of rotation guide pins 126, rotation guide openings 127, biasing springs 284, and guide pin mechanisms 286 may be provided, and in any combination, without exceeding the scope of this disclosure.

Referring again to FIGS. 4-12, portions of the turret 114 may extend into a portion of the groove 154 to stop the turret 114 from rotating past a predetermined point. These may be referred to herein as rotation stops 157. The rotation stops 157 and the groove 154 combine to form a guide track 156, a path for the rotation guide pin 126 to travel as the turret 114 rotates. Stated another way, it is preferred that the turret 114 defines a groove 154 therein, with this groove 154 providing a guide track 156 which is engageable by the rotation guide pin 126. The guide track 156 allows for the rotation of the turret 114 between the first position and the second position along one side of the base socket 112 but not the other such that the turret 114 is not rotated past the first position or the second position when being moved therein. Specifically the rotation stops 157 may control the rotation of the turret 114 relative to the base socket 112, with the guide track 156 allowing the turret 114 to rotate only to transition the adjustable frame 110 between the first position and the second position along one side of the base socket 112 but not the other. The turret 114 therefore preferably cannot be rotated past the first position or the second position when being moved.

While the turret base 150 is preferably roughly cylindrical in shape, the main turret body 140 preferably forms a hemispherical bulb 144, a half globe shaped body which extends upward from the flat section 152. The curved shape may allow the main turret body 140 to extend upwards such that a portion of the hemispherical bulb 144 may pass through the channel 132 of the collar 130 and the porthole 136 of the plate 134 without contacting these elements as the turret 112 is rotated. The turret 112, including the main turret body 140, is preferably a solid or hollow polymer or hard rubber structure, with a post opening 146 passing therethrough. In some embodiments, a receiving tube 200 may also be positioned in the channel opening 146. The receiving tube 200 is preferably formed of metal so that the stability of the angular position of the post 116 does not rely only on the turret 114 alone. This may be necessary if the hemispherical bulb 144 is hollow or latticed.

The turret 114 may define a central turret axis 142, an imaginary line extending vertically through the geometric center of the turret 114. Preferably, the post opening 146 passes through the turret 114 but is not aligned with the central turret axis 142. Instead, the post opening 146 is preferably positioned closer to one lateral side of the turret 114 than the other. The post opening 146 preferably further passes through the turret 114 at an angle of between 75 and 89 degrees relative to the flat section 152, rather than perpendicularly to the flat section 152 at 90 degrees. Thus, a post 116 inserted into the post opening 146 would define a central post axis 162 that is preferable not aligned with the central turret axis 142.

The main turret body 140 preferably further defines a manufacturing channel 148, a bore through a radius of the hemispherical bulb 144 that connects to the post opening 146. The manufacturing channel 148 is preferably configured to allow a locking pin 166 to engage thereto to secure a post 116 within the manufacturing channel 148. The manufacturing channel 148 may be formed by an injection device when the turret 114 is formed in a mold, thus facilitating efficient manufacturing but allowing a portion of the manufacturing process to define the structure of the manufacturing channel 148.

The turret 114, including the main turret body 140 and turret base 150, is preferably formed of a suitable strong and lightweight material to allow it to be durable without decreasing its ability to be assembled modularly or affecting its functionality. Preferably, the turret 114 is formed of molded plastic. However, those of ordinary skill in the art will appreciate from this disclosure that the turret 114 may be formed of any other suitable material, such as fiber glass, hard rubber, wood, PVC, or metal. Portion of the turret 114 may be solid, hollow, or partially hollow with a latticed or honeycomb structure, provided that the turret 114 is configured to withstand weight being placed on the post 116 without deforming the turret 114.

The main turret body 140 may also have a bumper 128 disposed on the turret 114, with the bumper 128 being located on the at least some of the portion of the turret 114 that projects through the channel 132 and porthole 136. The bumper 128 is preferably positioned thereon proximate to the upper opening of the post opening 146, preferably on the same side of the central turret axis 142 as the central post axis 162. A bumper fastener 138, such as a screw or rivet, preferably connects the bumper 128 to the main turret body 140. The bumper 128 is preferably a rubber ring configured to be positioned between the post 116 and the porthole 136 of the plate 134 when the adjustable frame 110 is in the first position. This is to ensure that the weight of a person 106 exerted on the backrest 118 is not forced onto a single point of the post 116, but rather distributed by the bumper 128. When the turret 114 is in the first position, the bumper 128 is therefore preferably adjacent to the plate 134 and configured to contact the plate 134 when a pressure is applied in a reclining direction 192 on the backrest 118. When the turret 114 is in the second position, the post 116 is preferably adjacent to the plate 134 to support the turret 114 against torque resulting from a pressure applied in a reclining direction 192 onto the backrest 118 due to contact between the post 116 and the plate 134. Those of ordinary skill in the art will appreciate from this disclosure that the bumper 128, bumper fastener 138, and/or second bumper 198 may be wholly or partially omitted without exceeding the scope of this disclosure.

Preferably, the turret 114 is held against the base socket 112 by a collar 130, a ring-shaped body that is preferably slightly shorter than the hemispherical bulb 144 of the turret 114. The collar 130 preferably defines a channel 132, a circular opening therethrough preferably wide enough for the hemispherical bulb 144 to be positioned therein. Rather than having a vertical inner surface, the inner face of the channel 132 may be curved to roughly correspond to the curvature of the hemispherical bulb 144. The collar 130 preferably includes fastener openings 158 configured to correspond to the fastener openings 158 in the base socket 112 to allow fasteners 160 to connect the plate 134 to the collar 130 and to the base socket 112. In other words, the adjustable frame 110 preferably includes a collar 130 disposed on the base socket 112 and about the turret 114. The collar 130 preferably defines a channel 132 therethrough, with the channel 132 being configured such that a portion of the turret 114, and specifically a portion of the hemispherical bulb 144, extends from the channel 132 to project through the collar 130 in a direction away from the base socket 112. The collar 130 and the base socket 112 therefore may combine to secure the turret 114 to the base socket 112 such that the flat section 152 of the turret 114 is held in abutment with the engagement surface 122 of the base socket 112. This configuration ensures that the turret 114 is generally only capable of rotational movement about the central turret axis 142, and not upwards and downwards.

A portion of the turret 114, and specifically a portion of the hemispherical bulb 144, preferably also passes through the porthole 136, a circular opening in the plate 134 which overlays a portion of the boat decking 104 and covers the collar 130. The plate 134 is preferably metal or hard plastic configured to permanently connect the adjustable frame 110 to the boat 102 and to function as a temporary floor. The plate 134 may define a porthole 136 through which at least some of a portion of the turret 114 extends. The plate 134 preferably includes fastener openings 158 to correspond with those in the collar 130 and base socket 112, as well as fastener openings 158 for fasteners 160 to pass through before further passing into the boat decking 104. The plate 134 is preferably disposed on an opposite side of the collar 130 from the base socket 112.

Like the base socket 112 and the turret 114, the collar 130 is preferably formed of a suitable strong and lightweight material to allow it to be durable without decreasing its ability to be assembled modularly or affecting its functionality. Preferably, the collar 130 is formed of molded plastic. However, those of ordinary skill in the art will appreciate from this disclosure that the base socket 112 may be formed of any other suitable material, such as fiber glass, hard rubber, wood, PVC, or metal. In some preferred embodiments, the collar 130 may need to be stronger that the base socket 112 and/or turret 114 (as the collar 130 may need to support the turret 114 from lifting away from the base socket 112) and thus it is preferred that the collar 130 is solid or only partially solid, and formed of a strong material.

In some preferred embodiments, a mounting frame 105 such as one or more metal plates or brackets, are included below the boat decking 104 to sandwich the boat decking 104 between the plate 134 and the mounting frame 105. Fasteners 160 preferably connect the boat decking 104 to the plate 134 and the mounting frame 105. In some preferred embodiments, the mounting frame 105 is preferably a rectangular or square frame with an opening in the center to house the base socket 112 and collar 130. In other preferred embodiments, the mounting frame 105 is formed by one or more separate metal bars, washers, or brackets positioned along the lateral sides of the plate 134 on the inner side of the boat decking 104 to provide additional support to the connection between the adjustable frame 110 and the boat decking 104. Some preferred embodiments also include gaskets positioned between either or both of the plate 134 and the boat decking 104 and the boat decking 104 and the mounting frame 105. Preferably, these gaskets fully surround the perimeter of the base socket 112 and the collar 130, to create an airtight seal to prevent water from leaking into the hull of the boat 102.

Referring to FIG. 46, in some preferred embodiments the main turret body 140, and preferably the hemispherical bulb 144 formed by the main turret body 140, may include inward indentations thereof. These indentations may form at least one finger hold 278, configured to allow a user to more easily apply lateral pressure to rotate the turret 114. Preferably, between two and five finger holds 278 are preferably include to provide ergonomic holds which may be easily grasped no matter what position the turret 114 is in. The finger holds 278 are preferably formed in the portion of the turret 114 which projects through the porthole 136 in the plate 134, to ensure that the plate 134 does not obstruct the ability of a user to grasp one or more of the finger holds 278. Taken in tandem, the finger holds 278 preferably form a grip 280, a portion of the turret 114 specifically configured to allow the turret 114 to be grasped and rotated by a user. Those of ordinary skill in the art will appreciate from this disclosure that the grip 280 may include additional or alternate elements to the finger holds 276 to maximize the ability of a user to engage the turret 114, such as additional ridges, grip tape, or any other suitable element. Finger holds 278 and the grip 280 may be provided in addition to, or in the place of the first bumper 128 and/or the second bumper 198. However, it is preferred that the bumpers 128, 198 not be position on the turret 114 such that they may impede the user's ability to grasp any of the finger holds 278.

Referring to FIGS. 11-14, the turret 114 is preferably configured to have a post 116 disposed on and/or in the turret 114 (that is, positioned within the post opening 146), with the post 116 being configured to engage the backrest 118. The post 116 preferably includes a locking pin 166 in its lower end, with the locking pin 166 preferably including two nubs, extensions, or outward extending projections. The post 116 preferably defines two openings for each of the projection of the locking pin 166 to pass through. The lower opening defines the post channel opening 169, allowing the locking pin 166 to engage the manufacturing opening 148 when the post 118 is inserted into the turret 114. The upper opening defines the post stop opening 168, allowing a portion of the locking pin 166 (namely the upper projection of the locking pin 166) to be positioned above the highest portion of the turret 114 such that it can be accessed when the post 116 is in the turret 114. The user can push the locking pin 166 inward, causing both projections to retreat inward into the post 1116 simultaneously. This may allow the locking pin 166 to disengage the manufacturing channel 148 and to allow the post 116 to be removed from the turret 114. The locking pin 166 is preferably a roughly V-shaped piece of metal positioned within the post 116, with the bend providing a spring element to bias the projections to extend outward through the respective openings when not depressed by a user. The locking pin 166 is preferably welded or riveted to the inside of the post 116 (preferably opposite the post stop opening 168 and post channel opening 169). In some preferred embodiments, the post 116 may include an additional locking pin 166 within the post 116 proximate to the post upper end, with a single projection configured to project through the upper post pin opening. In some preferred embodiments, the post 116 may further include a third locking pin 166 roughly positioned in the middle of the post 116 with a single projection configured to extend though a middle post opening. The additional locking pin 166 and third locking pin 166 are preferably positioned perpendicular to the locking pin 166 in the lower portion of the post 116. The additional locking pin 166 and third locking pin 166 are each configured to project through a backrest sleeve opening when the other does not project therethrough, as this can allow the backrest 118 to be locked at one of two desired heights (a first back rest height, when the third locking pin 166 is engaged with the backrest sleeve opening, and a second back rest height, when the fourth locking pin 166 is engaged with the backrest sleeve opening).

In some preferred embodiments, the post 116 is positioned in the center of the backrest 118 to provide vertical support to the backrest 118. In other preferred embodiments, the adjustable frame 110 includes two posts 116, with each post 116 being positionable within a separate turret 114. The posts 116 preferably each connect to a backrest sleeve 164, a tube positioned within the backrest body 170 which is preferably slightly wider than the posts 116 and configured to receive the posts 116 therein. The backrest sleeve 164 may be a single, U-shaped tube, or may be formed of two straight tubes proximate to opposite lateral ends of the backrest body 170. The backrest sleeve 164, as discussed above, may define one or more backrest sleeve openings for engagement with a locking pin 166 within the post 116, to allow the height of the backrest 118 relative to the plate 134 to be adjusted and secured.

The backrest 118 may include a backrest sleeve 164 contained within a backrest body 170. The backrest body 164 is any structure provided to support a person's back when the seat 108 is in use. This may include rigid metal, plastic, fiber glass, or any other suitable support structure, cushioning, netting, fabric, fiber fill or sponge material, or any other material provided for comfort or aesthetic purposes. While the figures depict the backrest sleeve 164 being sandwiched between portions of the backrest body 170, those of ordinary skill in the art will appreciate from this disclosure that the backrest body 170 need only be on one side of the backrest sleeve 164, or may form the backrest sleeve 164 (as the backrest sleeve 164 is defined herein only as a connection between the post 116 and the backrest 118) without exceeding the scope of this disclosure. The front side of the backrest 118 preferably defines a forward directed surface 174 which is preferably directed in the viewing direction 172 when the post 116 or posts 116 are inserted into the turret(s) 114. The forward directed surface 174 preferably faces in the same direction, the viewing direction 172, when the adjustable frame 110 is in both the first position and in the second position. Those of ordinary skill in the art will appreciate from this disclosure that the backrest 118 may also be reversible (which may require that the manufacturing channel 148 runs fully through the turret 114) to increase customizability, without exceeding the scope of this disclosure.

The post 116, backrest sleeve 164, and receiving tube 200 are preferably hollow tubes formed of stainless steel, thus being strong enough to support the weight of a user without greatly increasing the weight of the adjustable frame 110. However, those of ordinary skill in the art will appreciate from this disclosure that theses elements may be formed of hollow or fully or partially solid materials, or some combinations thereof, such as hard rubber, wood, PVC, or various metals. In some preferred embodiments, the post 116 and backrest sleeve 164 may be formed of a single member, thus allowing the post 116 and backrest sleeve 164 to all be solid elements rather than being engaged by the post 116 being inserted into a portion of the backrest sleeve 164, or vice versa.

Referring to FIGS. 4-12, the adjustable frame 110 is preferably convertible between a first position and a second position, such that it can support that the backrest 118 at a first angle 180 (as in the first position) and at a second angle 182 (as in the second position) relative to a horizontal plane 176. Specifically, the turret 114 is preferably rotatable on the base socket 112 between a first position, in which the turret 114 holds the post 116 such that the central post axis 162 forms a first angle 182 with the horizontal plane 176, and a second position, in which the turret 114 holds the post 116 such that the central turret axis 142 forms a second angle 182 with the horizontal plane 176. Necessarily, the first angle 180 is preferably different from the second angle 182.

Preferably, to transition the adjustable frame 110 between the first and second positions, a user may rotate the turret 114 one hundred and eighty degrees about the central turret axis 142 to move from the first position to the second position. While the turret is rotated 180 degrees, the central post axis 162 (that is, a central vertical axis of the post 116 when positioned in the post opening 146) preferably remains positioned on a same side of the vertical axis 178 (in the reclining direction 192). This ensures that the adjustable frame 110 is configured to support the backrest 118 at any one of the first angle 180 and the second angle 182 with a person 106 facing in a same direction while sitting and using the backrest 118. The central post axis 162 tilts further in the reclining direction 192 when in the second position than when in the first position, but preferably the forward directed surface 174 of the backrest 118 remains facing in the viewing direction 172.

The movement of the adjustable frame 110 as it is transitioned between the first position and the second position and back may be best understood in reference to a vertical axis 178 and a horizontal plane 176. The vertical axis 178 preferably refers to an imaginary vertically oriented line through the geometric center of the adjustable frame 110. The horizontal plane 176 preferably refers to an imaginary horizontal line bisecting the vertical axis 178 at the geometric center of the adjustable frame. To the front of the vertical axis 178 (or to the left side of the vertical axis 178, as shown in the figure) may be said to be a viewing direction 172, as a person 106 using the adjustable frame 110 would face in said direction and thus his or her "view" would be aligned thusly. To the rear of the vertical axis 178 (or to the right side of the vertical axis 178, as shown in the figure) may be said to be the reclining direction 192, as the backrest 118 preferably pivots in that direction when moving from the first position to the second position, allowing a person to "recline" in said direction.

The turret 114 preferably defines a central turret axis 142, an imaginary line through the geometric center of the turret 114, which would establish a vertical axis for the turret 114 if it were placed on a flat surface rather than on the base socket 112. The turret 114 is shown as positioned on the base socket 112 in the turret seat 120, as in the preferred configuration of the adjustable frame 110. Thus, in the preferred embodiment of the adjustable frame 110, it can be seen that the central turret axis 142 is preferably positioned at an angle relative to the vertical axis 142, with this angle being determined by the angular position of the engagement surface 122 of the base socket 112. In some preferred embodiments, the central turret axis 142 is preferably positioned at an angle of twenty-two and a half degrees (22.5 degrees) relative to the vertical axis 178 and, similarly, the engagement surface 122 is also positioned at an angle of twenty-two and a half degrees (22.5 degrees) relative to the horizontal plane 176. This angle, of the central turret axis 142 relative to the horizontal plane 176, may be referred to as the third angle 184. The post 116 and the central post axis 162 preferably rotate about the central turret axis 142 when the turret 114 is moved from the first position to the second position.

The post 116 preferably defines a central post axis 142, an imaginary line extending vertically through the geometric center of the post 116 when it is placed with its lower side down on a flat surface. In some preferred embodiments, this central post axis 142 preferably does not directly align with either of the vertical axis 178 or the central turret axis 142. Rather, it is preferred that the when the post 116 is positioned in the post opening 146, the central post axis 142 defines either the first angle 180 or the second angle 182, relative to the horizontal plane 176.

Preferably, when the adjustable frame 110 is in the first position, the central post axis 162 is held at an angle of one hundred degrees (100 degrees) relative to the horizontal plane 176 (referred to herein as the first angle 180); ten degrees (10 degrees) in relation to the vertical axis 178 (referred to herein as the fourth angle 186); and twelve and a half degrees (12.5 degrees) relative to the central turret axis 142 (referred to herein as the fifth angle 188). Those of ordinary skill in the art will appreciate from this disclosure that the angles specified herein are not limited to the preferred angular measurements described herein, which are included To transition the adjustable frame 110 into the second position, the turret 114 (and, in turn, the central post axis 162) is preferably rotated one hundred and eighty degrees about the central turret axis 142. This transition changes the angular position of the backrest 118 relative to the horizontal plane 176 (when measured in the viewing direction 172) to change. When in the second position, the central post axis 162 and the backrest 118 are held at the second angle 182 relative to horizontal plane 176. Preferably, the second angle 182 may be measured at one hundred and twenty-five degrees (125 degrees). As the turret 114 is only rotated, the central turret axis 142 remains in the same orientation in both the first and second positions. Thus, the third angle 184 remains the same at one hundred and twelve and a half degrees (112.5 degrees). Similarly, the fifth angle 188 (the angular position of the central post axis 162 relative to the central turret axis 142) preferably also remains the same at twelve and a half degrees (12.5 degrees). However, the angular position of the central post axis 162 relative to the vertical axis 178 changes when in the second position, with the central post axis 162 no longer being held at the fourth angle 186. The central post axis 162 is instead preferably held an angle of thirty-five degrees (35 degrees) relative to the vertical axis 178 when in the second position, which may be referred to as the sixth angle 189. Preferably, due to the central turret axis 142 being held at an angle relative to the vertical axis 178, the sixth angle 189 is the equivalent of the fourth angle 186 plus two times the fifth angle 188. This is because the central post axis 162, which is originally held at the fourth angle 186 relative to the vertical axis 178, rotates about the central turret axis 142, which it is held at the fifth angle 188 relative to and positioned between the vertical axis 178 and central turret axis 142 when in the first position. Thus, by rotating about the central turret axis 142, the central post axis 142 becomes spaced away from the vertical axis 178 by an angle equal to the fourth angle 186 (the 10 degrees it was already spaced away from the vertical axis 178) and two times the fifth angle 188 (by rotating about the central turret axis 142, such that the central turret axis is now between the vertical axis 178 and central post axis 162, the angle has also increased by double the 12.5 degrees of the fifth angle 188) for a total angle of thirty-five degrees (35 degrees) (the sixth angle 189). Those of ordinary skill in the art will appreciate from this disclosure that the angles specified herein are not limited to the preferred angular measurements described herein, which are included for illustrative purposes and only describe the preferred orientation and movement of the elements.

Referring to FIGS. 15-29, in some preferred embodiments the main turret body 140 may be frustoconical or angular cylindric in shape rather than having a hemispherical bulb 144. The main turret body 140 preferably has a narrower diameter proximate to the post opening 146 and wider proximate to the base socket 112, thus providing the preferred shape. The turret preferably defines a top surface 252, a generally flat section on the top of the turret 114 opposite the flat surface 152 which is preferably parallel to the horizontal plane 176 when the turret is in the first position. The top surface 252 preferably has a smaller area than the flat section 152. The turret 114 may include at least one, and preferably two bumpers, a first bumper 138 and a second bumper 198. The first bumper 128 and second bumper 198 may be formed by a portion of the main turret body 140 or may be formed of a separate piece of rubber or some other material and affixed the turret 114 by bumper fasteners 138. The first bumper 128 and second bumper 198 may allow a user to more easily spin the turret 114 by providing easily grasped points for leverage. The first bumper 128 and second bumper 198 may also prevent excess pressure from being exerted onto the posts 118 by contact with the plate 134. In some preferred embodiments, the first and second bumpers 128, 198 are preferably positioned to the lateral sides of the post 116 when the turret 114 is in both the first and second positions. In such a configuration, the bumpers 128, 198 are adjacent to the plate 134 and configured to contact the plate 134 when a pressure is applied in either lateral direction to the backrest 118, supporting the turret 114 against a torque resulting from such pressure. In other preferred embodiments, the bumpers 128, 198 are preferably positioned on the axial sides of the post 116 when the turret 114 is in either of the first or second positions. In such a configuration, the bumpers 128, 198 are configured to be positioned adjacent to the plate 134 when a pressure is applied in a reclining direction 192 on the backrest 118 (or, in some embodiments, in a viewing direction 172). This may protect the turret 114 and/or post 116 from damage resulting from a pressure applied in said directions due to contact between the post 116 and the plate 134.

The turret 114 may also include a receiving tube 200 positioned between the two bumpers 128, 198 and proximate to the center of the turret 114. The receiving tube 200 is preferably configured to receive the post 116 therein and to provide greater stability to the post opening 148. This may help avoid damaging the turret 114 through over use of the adjustable frame 110 and any torque or angular pressure resulting therefrom.

In some preferred embodiments, the turret 114 is generally frustoconical or cylindric and the flat surface 152 is preferably positioned at an angle relative to the top surface 252 and the horizontal plane 176. The turret 114 may thus have different heights at different points along its circumference. At one point, the turret 114 has a longest side 208 defining a longest distance 204 between the flat section 152 and the top surface 252 of the turret 114. Positioned directly opposite the longest side 208 of the turret 114 may be the shortest side 206 of the turret 112 which defines the shortest distance 202 between the flat section 152 and the top surface 252 of the turret 114. Both the longest side 208 and shortest side 206 preferably run between the top surface 252 and the flat surface 152. When moving in either a clockwise or counterclockwise from the shortest side 206 toward the longest side 208, the height of the turret (that is, the distance between the flat surface 152 and the top surface 252) gradually increases until the longest side 208 defines the longest distance 204 between the flat surface 152 and the top surface 252. This distance preferably gradually increases uniformly on both sides. Thus, as can be seen in the figures, points taken exactly halfway between the longest side 208 and shortest side 206 in either direction (in other words, along a line perpendicular to the line between the longest side 208 and shortest side 206) would define the same distance between the top surface 252 and flat surface 152. These points are the first intermediate side 205 and second intermediate side 207, respectively, and may define a middle distance 203 between the top surface 252 and flat surface 152. The first bumper 128 and second bumper 198 are preferably positioned proximate to either the first intermediate side 205 or second intermediate side 207, and are thus also positioned roughly perpendicular to the longest side 208 and shortest side 206.

When the adjustable frame 110 is in the first position, the second bumper 198 and the second intermediate side 207 of the turret 114 are preferably positioned on the left lateral side of the receiving tube 200. In this same position, the first bumper 196 and the first intermediate side 205 of the turret 114 are preferably positioned to the right side of the receiving tube 200. These positions are preferably reversed when the turret is transitioned to the second position by rotating 180 degrees. In the second position, the second bumper 198 and the second intermediate side 207 of the turret 114 are preferably positioned on the right lateral side of the receiving tube 200. In this same position, the first bumper 196 and the first intermediate side 205 of the turret 114 are preferably positioned to the left lateral side of the receiving tube 200.

Preferably, the turret 114 may be positioned on the base socket 112 with the flat section 152 abutting the engagement surface 122. Preferably, the engagement surface 122 is preferably oriented diagonally relative to the horizontal plane 176 at the same angle as the flat section 152.

When the adjustable frame 110 is in the first position, the shortest side 206 of the turret 114 is preferably positioned proximate to the raised seat wall 196 and the longest side 208 is preferably positioned proximate to the raised perimeter wall 194. The angles of the engagement surface 122 and flat section 152 being reciprocal, the top section 252 is preferably parallel to the horizontal plane 176 when the turret 114 is in the first position.

When the turret 114 is in the second position, the longest side 208 is preferably positioned proximate to the raised seat wall 196 and the shortest side 206 is preferably positioned proximate to the raised perimeter wall 194. With the longest side 208 positioned on the elevated side 254 of the base socket 112, the top surface 252 rotates to an angular position relative to the horizontal plane 176 and a portion of the turret 114 is raised above the upper surface of the plate 134. This transition also tilts the receiving tube 200, and any post 116 inserted therein, in the reclining direction 192 such that the central post axis 162 is held at the second angle 182.

The base socket 112 preferably defines a base hollow 190 which is conical in shape. This preferred shape is preferably configured to allow the post 190 to lean back in the reclining direction 192, and to provide additional support to the turret 112 against over-reclination.

In this preferred embodiment, the first angle 180, measured between the horizontal plane 176 and the central post axis 162, is preferably ninety degrees (90 degrees). Thus, in this preferred embodiment, the fourth angle 186, drawn between the vertical axis 178 and the central post axis 162, is zero degrees (0 degrees). The third angle 184, drawn between the horizontal plane 176, is preferably one hundred degrees (100 degrees), thus making the fifth angle 188, drawn between the central post axis 162 and central turret axis 142, ten degrees (10 degrees). Those of ordinary skill in the art will appreciate from this disclosure that these measurements are only preferred angles and that other angular measurements may be provided without exceeding the scope of this disclosure.

The angles of the adjustable frame 110 when in the second position are preferably measured as follows. The second angle 182, measured between the horizontal plane 176 and the central post axis 162, is preferably one hundred and ten degrees (90 degrees). The measurement of the sixth angle 189, the angular position of the central post axis 162 relative to the vertical axis 178, is preferably the sum of the measurement of the fourth angle 186 plus two times the measurement of the fifth angle 18 Thus, the sixth angle 189 of this preferred embodiment is preferably twenty degrees (20 degrees), as this is the fourth angle 186 (0 degrees) plus two times the fifth angle 188 (2×10 degrees) for a sum total of 20 degrees. Those of ordinary skill in the art will appreciate from this disclosure that these measurements are only preferred angles and that other angular measurements may be provided without exceeding the scope of this disclosure.

Referring to FIGS. 30-34, in some preferred embodiments the turret 114 may include a base step 249, an extension of its circular perimeter that projects outward with a larger circumference than the main turret body 140, rather than having a turret base 150 with a smaller circumference. The base step 249 is preferably wider than the main turret body 140, and is preferably shorter than the raised perimeter wall 194. The base step preferably defines a turret rotation surface 250 on its upper side and the flat section 152 of the turret 114 on its lower side. The turret rotation surface 150 is preferably configured to contact a collar ledge 251, a projection from the collar 132 into the channel 132. The collar ledge 251 and base step 249 run the entire perimeters of the collar 130 and turret base 150, respectively. The base step 249 preferably rotates between the collar ledge 251 and the raised seat wall 196, with the collar 130 defining a collar recess 253 to allow for unimpeded rotation of the turret 114. The base step 249 preferably comprises an angled side wall parallel to the shortest side 206 of the turret 114, the flat section 152 on its lower side which is preferably angled, and the turret rotation surface 248 on its upper side that is preferably roughly parallel to the rotation surface 248.

The turret 114, including the main turret body 140, is preferably of molded plastic. In some preferred embodiments, the base step 249 may also be formed of molded plastic, and formed as a single uniform member along with the rest of the turret 114. However, in other preferred embodiments, the base step 249 may be formed of a separate material, such as metal, which may provide additional strength to the base step 249 so it is not snapped off during strenuous use. In such embodiments, the base step 249 may be affixed to the main turret body 140 or the rest of the turret 114 may be formed in a mold about a portion of the metal that forms the base step 249. Those of ordinary skill in the art will appreciate from this disclosure that the base step 249 may be formed of any other suitable material, such as fiber glass, hard rubber, wood, PVC, or metal.

The combination of the collar ledge 251 and base step 249 preferably allows the collar 130 to better secure the turret 114 against the base socket 112. The collar ledge 251 may further provide additional support to the backrest 118 from additional, unwanted reclination. Pressure is preferably distributed between the post 116, turret 114, collar 130, and base socket 112. Specifically, downward pressure may be distributed from the post 116 onto the rear side of the turret 114 and the top of the base socket 112. Upward pressure may be exerted onto the post 116 and distributed onto the front side of the base hollow 119, as well as onto the turret 114, passing through the base step 249 and onto the collar ledge 251 of the collar.

Figure 35:
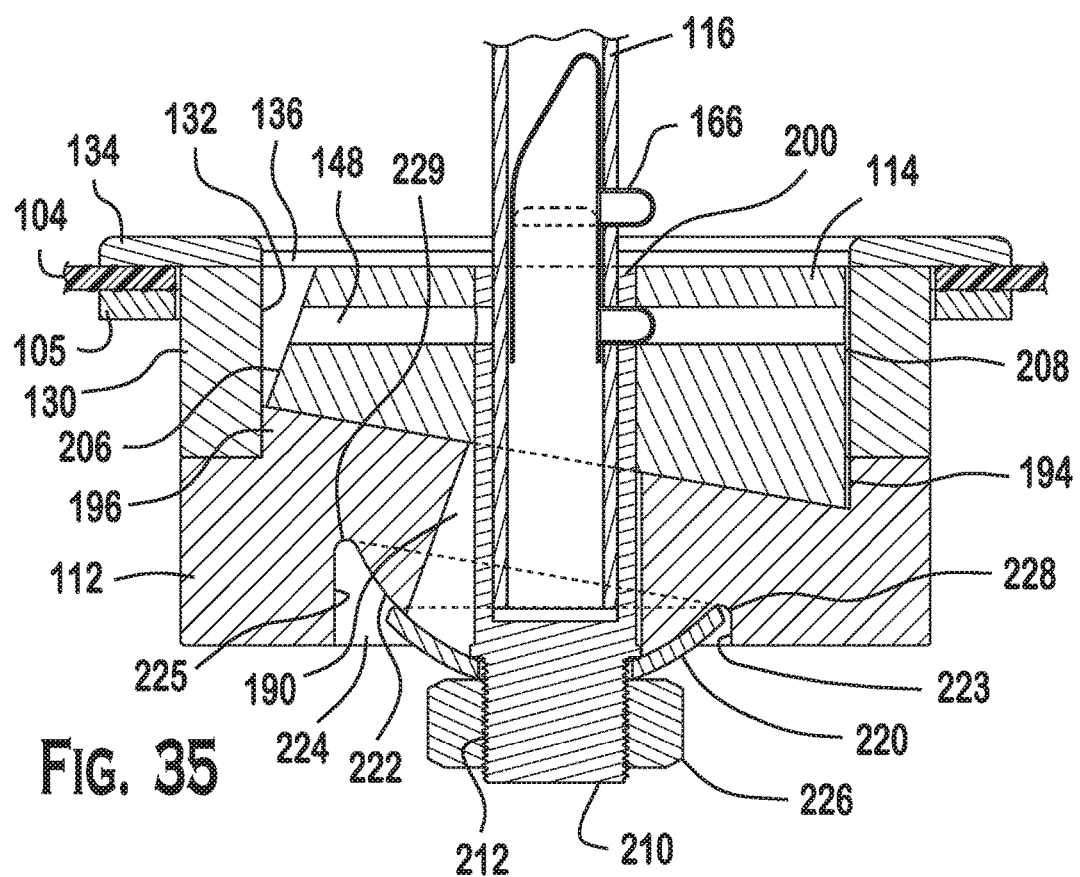
FIG. 35 is an alternate cross-section view of the adjustable frame 110 of FIG. 17, with the adjustable frame 110 in the first position. The figure demonstrates that in some preferred embodiments the receiving tube 200 may include a tube end 210 which extends through the base hollow 190. The tube end 210 preferably has a threaded section 212 that may allow a nut 226 to be fastened thereon, and a thread stop 214, an outwardly extending protrusion wider than the threaded section 212 that is configured to prevent the nut 226 from being fastened high enough to impeded movement of the post 118 within the base hollow 190. A hemispherical washer 220 is preferably positionable about the threaded section 212 between the thread stop 214 and the nut 226, with its curved faced positioned proximate to the base hollow 212. The base hollow 212 preferably includes a hemispherical cutaway 222 roughly corresponding to the shape of the hemispherical washer 226, allowing the hemispherical washer 226 and hemispherical cutaway to guide the oscillation of the receiving tube 200 and post 119 within the base hollow 190. The base hollow 190 is preferably offset from the central post axis 182, as the receiving tube 200 and post 118 are meant to recline only in one direction, the reclining direction 192. Thus, the hemispherical cutaway 222 is preferably offset from the central post axis 182, having a deep end 225 on one side and a shallow end 223 on the opposite side, ensuring reclination in only one direction. In the first position, the hemispherical washer 222 is biased toward the shallow end 223, preferably contacting a portion of the shallow end shoulder 228.
Figure 36:
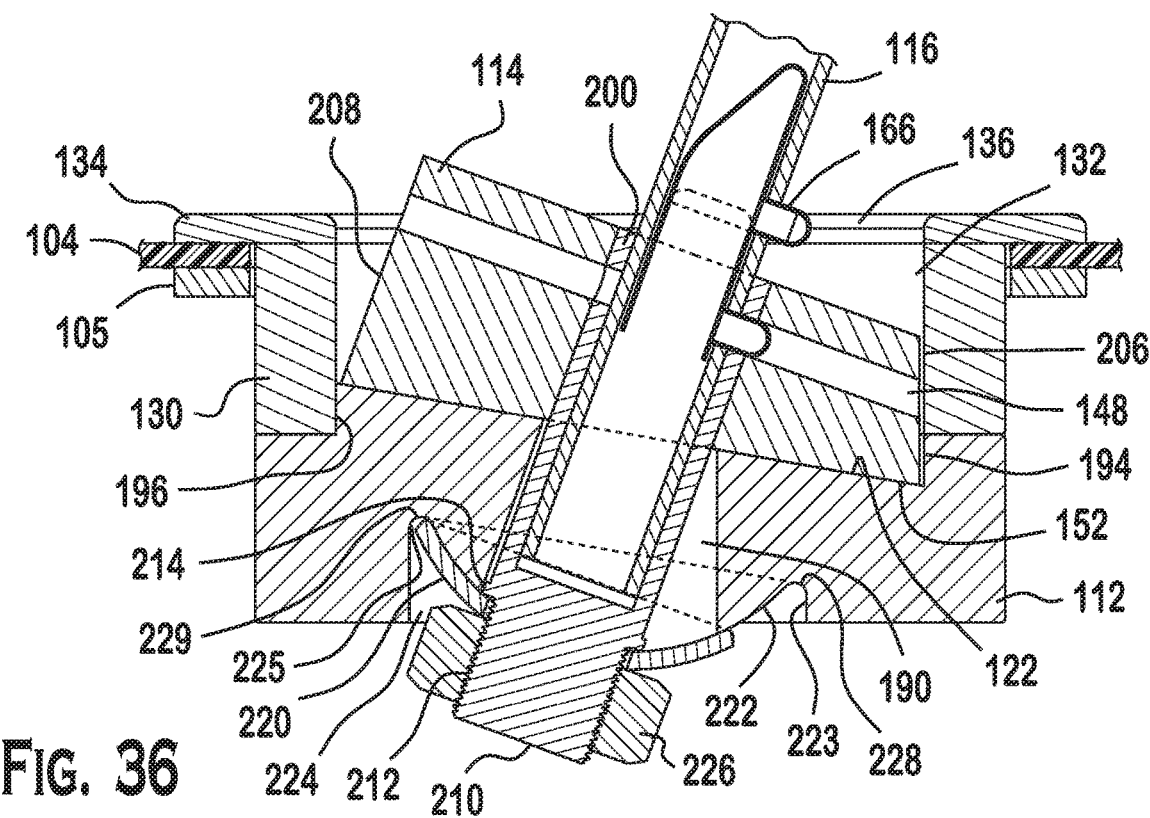
FIG. 36 is a corresponding partial cross-sectional view of the adjustable frame 110 of FIG. 35, with the adjustable frame 110 in the second position. The post 118 and receiving tube 200 have reclined in the reclining direction 192, causing the hemispherical washer 220 to pivot toward the deep end 225. Preferably, the hemispherical washer 220 contacts a portion of the deep end shoulder 229 to halt this rotation and provide additional support to the backrest 118.
Figure 37:
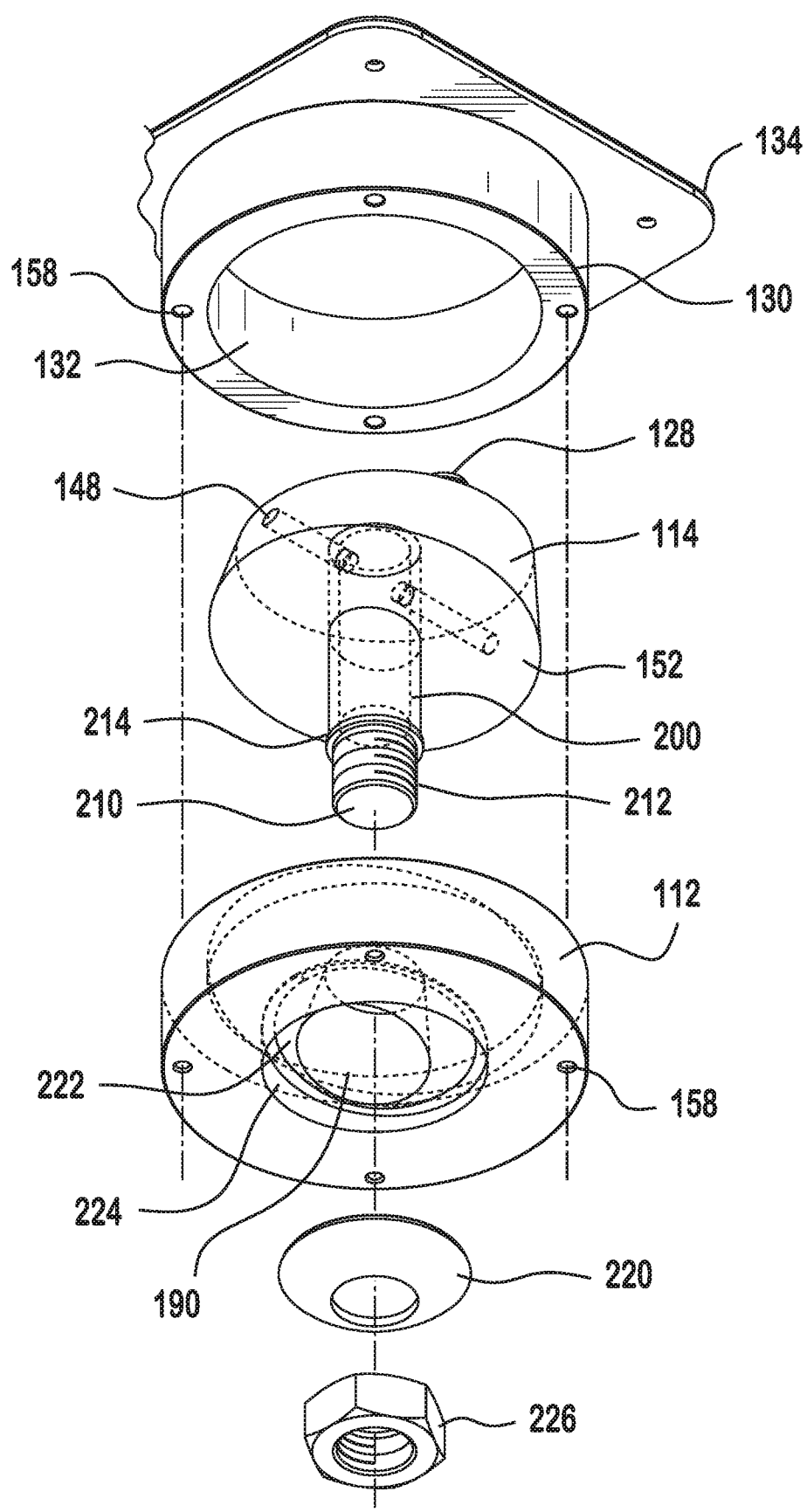
FIG. 37 is a bottom side exploded view of the adjustable frame of FIG. 35, showing the preferred assembly of some of the elements of the adjustable frame 200 of this preferred embodiment. The figure further demonstrates the preferred offset position of the hemispherical cutaway 222 in the base hollow 190.
Figure 38:
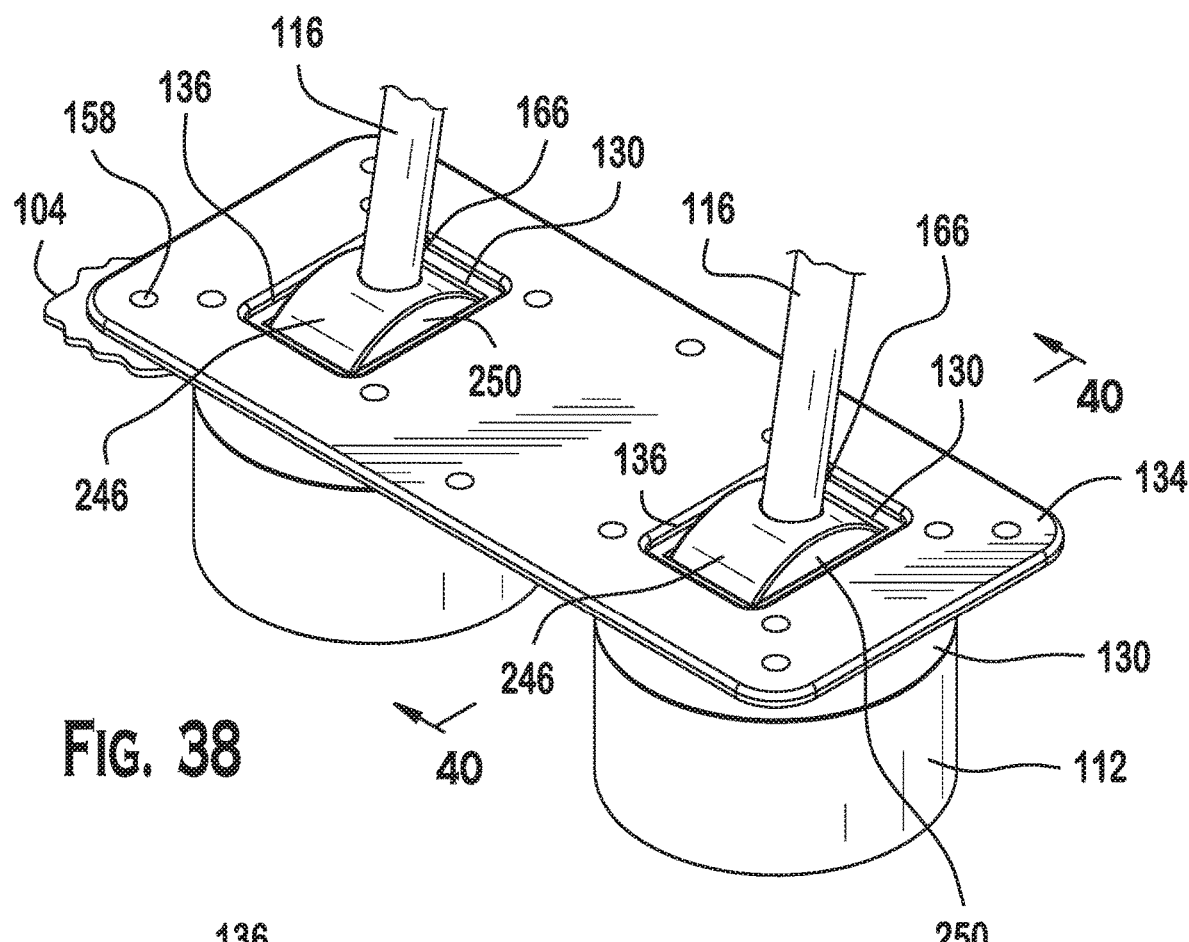
FIG. 38 is a partial front left-side perspective view of the adjustable frame 110 of another preferred embodiment, with the adjustable frame 110 in the first position. In this preferred embodiment, the turret 114 is in the shape of a squat cylinder, with this cylinder having been turned on its curved side. Thus, the turret 114 is positioned on its curved outer surface 246, through which the post 116 is inserted and which defines the post opening 146. The first flat sidewall 230 and second flat sidewall 250 face laterally. The figure shows that, in this preferred configuration, the base socket 112 is at least twice as tall as the collar 130.
Figure 39:
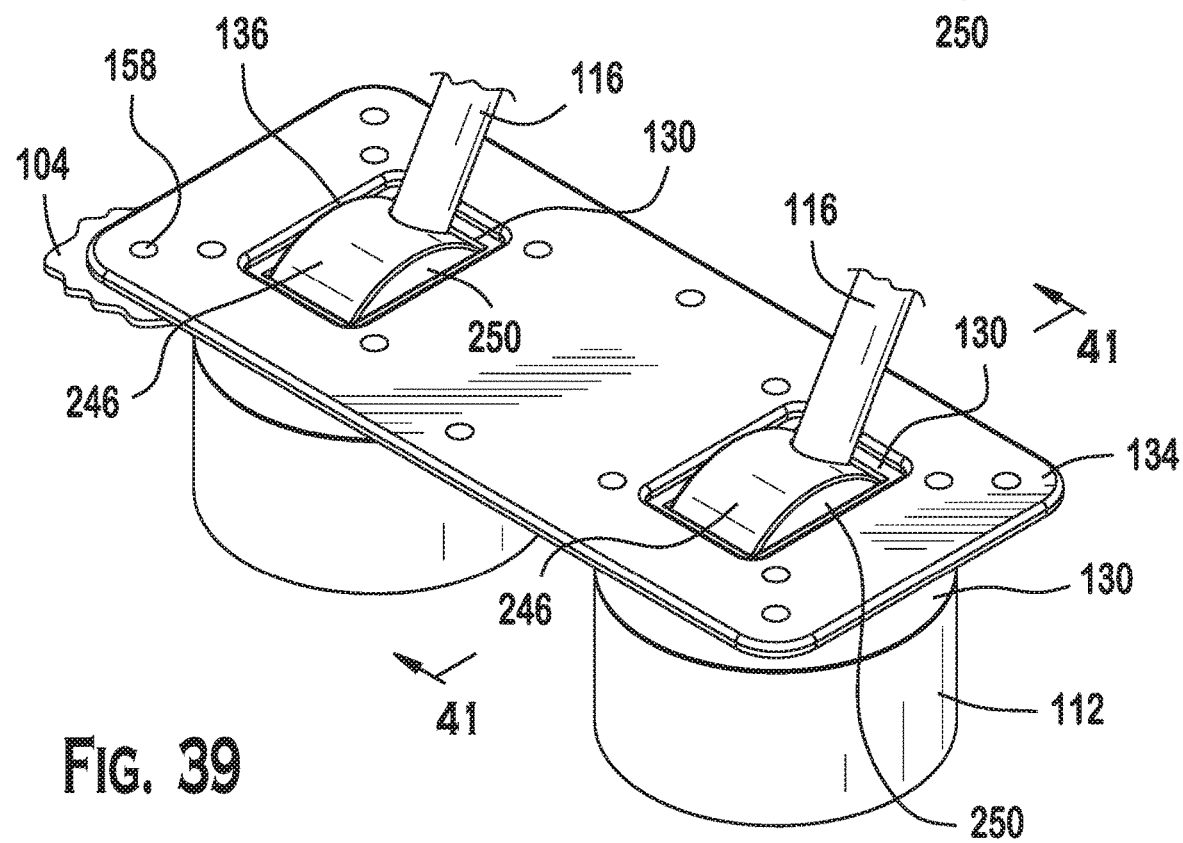
FIG. 39 is a partial front left-side perspective view of the adjustable frame 110 of FIG. 38, with the adjustable frame 110 in the second position. In the second position, with the backrest 118 reclined, the posts 116 preferably contact the plate 134 at the edges of the porthole 136. In this preferred embodiment, the porthole 136 is preferably rectangular, to tightly surround the turret 114, and the posts 116 thus contact the rear-most of the four sides of the porthole 136.
Figure 40:
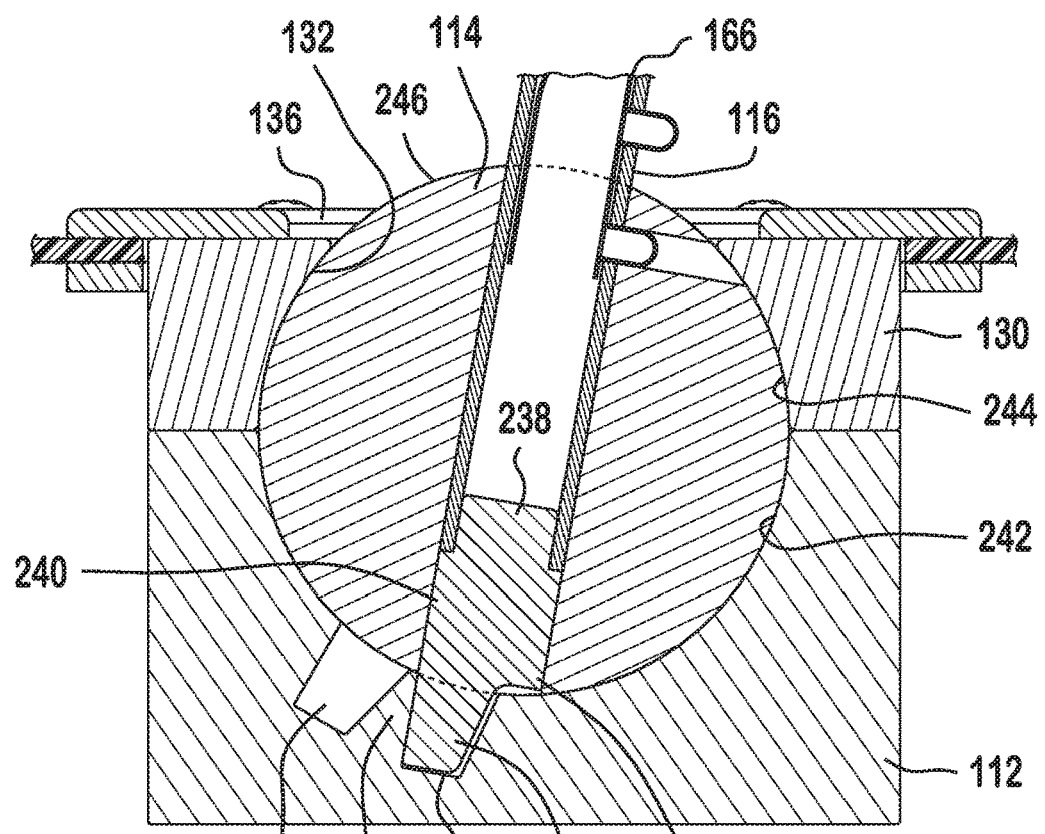
FIG. 40 is a cross-sectional view of the adjustable frame of FIG. 38 as taken along lines 40-40 of FIG. 38. The figure shows that in this preferred embodiment, the collar 130 defines a collar rotation surface 244 and the base socket 112 defines a rotatable engagement surface 242. The channel rotation surface 244 and the rotatable engagement surface 242 combine to form roughly the shape of the turret 114, with these curved surfaces allowing the turret 114 to rotate forward and backward therein. The base socket 112 preferably further defines a first tail slot 232 and a second tail slot 234, with the first and second tail slots 232, 234 being separated by a divider 236 but otherwise being open to the rotatable engagement surface 242. The first and second tail slots 232, 234 are preferably shaped to receive only the tail extension 216 of the post extension 240, with the extension footer 218 remaining outside of either tail slot 232, 234. The post extension 240 is preferably a single member configured to engage with the end of the post 116 opposite the backrest 118. Preferably, the post extension 240 includes a post engagement end 238 on one of its ends configured to fit snugly within the post 116, and ends in the other end with the tail extension 216 and extension footer 218. When in the first position, the tail extension 216 is preferably in the first tail slot 232 and the extension footer 218 on the rotatable engagement surface 242.
Figure 41:
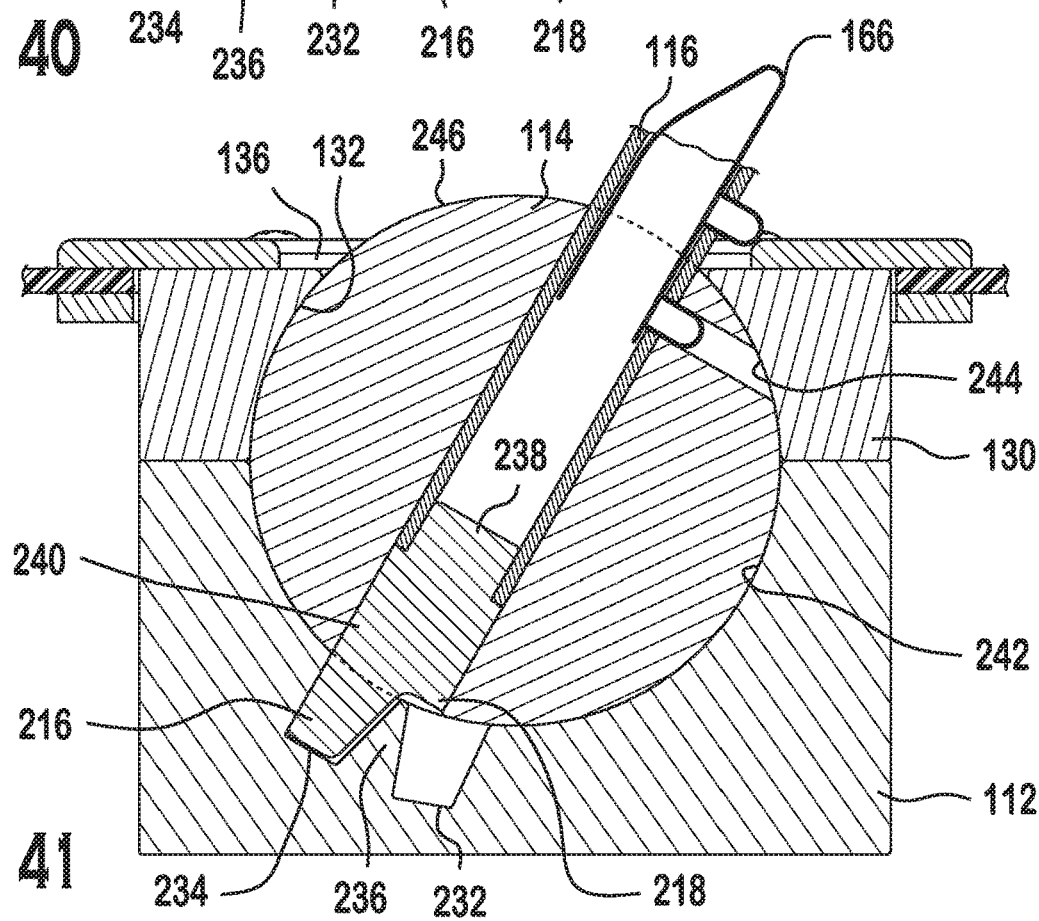
FIG. 41 is a cross-sectional view of the adjustable frame of FIG. 39 as taken along lines 41-41 of FIG. 41. The figure shows the adjustable frame 110 in the second position, with the tail extension 216 in the second tail slot 234 and the extension footer 218 on the divider 236. To transition the adjustable frame 110 from the first position to the second position, a user preferably depresses the locking pin 166 and withdraws the post 116 a portion of the way out of the post opening 146 until the tail extension 216 is removed from the first tail slot 232. The user may then recline the backrest 118, causing the turret rotation surface 248 to slide along the rotatable engagement surface 242 and collar rotation surface 244 until the tail extension 216 is past the divider 236. The post 116 may then be lowered back into the post opening 146 until the tail extension 216 fully enters the second tail slot 234 and the locking pin 166 allowed to re-engage with the manufacturing channel 148. A user may allow the end of the tail extensions 216 to rub along the rotatable engagement surface 242 to find the second tail slot 234, as it would not be visible during adjustment.
Figure 42:
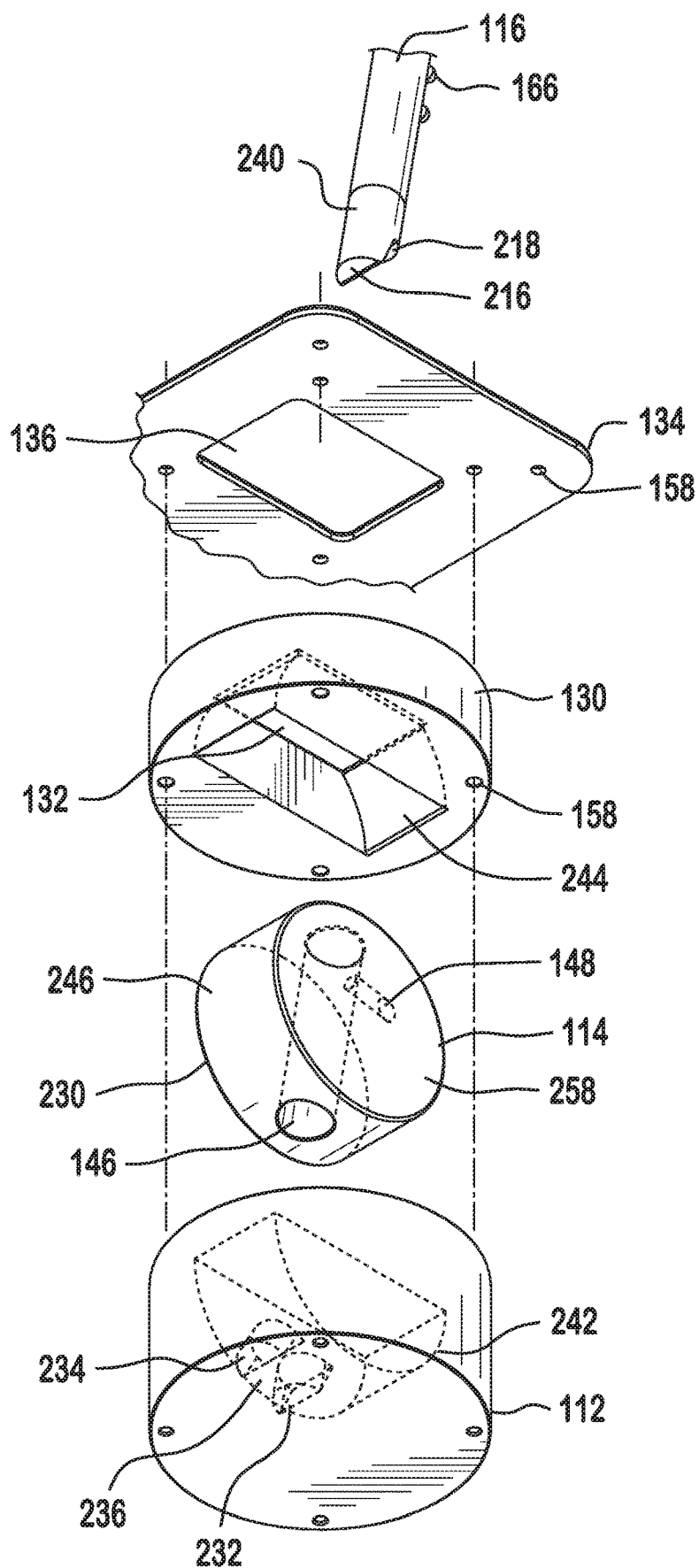
FIG. 42 is a bottom side exploded view of the adjustable frame of FIG. 38, showing the preferred assembly of some of the elements of the adjustable frame 200 of this preferred embodiment. The figure further demonstrates that the turret 114 is preferably placed in the lower base opening 224 of the base socket 112 and onto the rotatable engagement surface 242, with the collar 130 being positioned over the turret 114 with a portion of the turret 114 extending through the channel 132 (and, when assembled, the porthole 136 in the plate 134) while the channel rotation surface 244 abuts the curved outer surface 246 of the turret 114. Preferably, the length of the channel 132 (measured along its longest side) is less than seventy-five percent of the maximum length of the turret 114 (measured as the diameter through the first and second flat sidewalls 230, 250) to ensure that the collar 130 holds the turret 114 against the base socket 112.

Referring to FIGS. 35-37 in some preferred embodiments the receiving tube 200 may include a tube end 210 which extends through the base hollow 190. The tube end 210 preferably has a threaded section 212 to allow a threaded nut 226 or another fastener to be fastened thereon. The tube end 210 may also have a thread stop 214, an outwardly extending protrusion wider than the width of the threaded section 212 configured to prevent the nut 226 from being over turned and fastened high enough to impeded movement of the post 118 within the base hollow 190. A hemispherical washer 220 is preferably positionable about the threaded section 212 between the thread stop 214 and the nut 226, with its curved faced positioned proximate to the base hollow 212.

The base hollow 212 preferably includes a hemispherical cutaway 222 roughly of a corresponding shape to the hemispherical washer 226, allowing the hemispherical washer 226 and hemispherical cutaway 222 to guide the oscillation of the receiving tube 200 and post 119 within the base hollow 190. The base hollow 190 is preferably offset from the central post axis 182, as the receiving tube 200 and post 118 are meant to recline only in one direction, the reclining direction 192. Thus, the hemispherical cutaway 222 is preferably offset from the central post axis 182, having a deep end 225 on one side and a shallow end 223 on the opposite side, ensuring reclination of the post 114 in only one direction. In the first position, the hemispherical washer 222 is biased toward the shallow end 223, preferably contacting a portion of the shallow end shoulder 228. In the second position, the post 118 and receiving tube 200 tilt in the reclining direction 192 causing the hemispherical washer to pivot toward the deep end 225. Preferably, the hemispherical washer 220 contacts a portion of the deep end shoulder 229, to halt this rotation and provide additional support to the backrest 118.

Referring to FIGS. 38-42, in some preferred embodiments the turret 114 is in the shape of a squat cylinder, with this cylinder having been turned on its curved side and sandwiched between the collar and the base socket. The turret 114 is preferably positioned on its curved outer surface 146, through which the post 116 is inserted and which defines the post opening 146. The first flat sidewall 230 and second flat sidewall 250 of the turret 114 preferably face laterally when the turret 114 is positioned on its curved outer surface 146.

The collar 130 may define a channel rotation surface 244 and the base socket 112 may define a rotatable engagement surface 242. The channel rotation surface 244 and the rotatable engagement surface 242 combine to form roughly the shape of the turret 114, with these curved surfaces allowing the turret 114 to rotation forward and backward therein. In this preferred configuration, the base socket 112 is at least twice as tall as the collar 130.

In some preferred embodiments, the channel rotation surface 244, rotatable engagement surface 242, and/or curved outer surface 246 of the turret 114 may be smoothed or covered in a friction reducing material, to better facilitate rotation and reduce friction. However, in other preferred embodiments, the materials these elements are formed out of, such as molded plastic, may be suitable to avoid friction. Those of ordinary skill in the art will appreciate from this disclosure that the channel rotation surface 244, rotatable engagement surface 242, and/or curved outer surface 246 of the turret 114 may be formed of any suitable material, such as fiber glass, hard rubber, wood, PVC, or metal, without exceeding the scope of this disclosure.

The base socket 112 preferably further defines a first tail slot 232 and a second tail slot 234, with the first and second tail slots 232, 234 being separated by a divider 236 but otherwise being open to the lower base opening in the base socket 112, the surface of which also defines the rotatable engagement surface 242. The first and second tail slots 232, 234 are preferably shaped to receive only the tail extension 216 of the post extension 240, with the extension footer 218 remaining outside of either tail slot 232, 234. The post extension 240 is preferably a single member configured to engage with the end of the post 116 opposite the backrest 118. Preferably, the post extension 240 includes on one end a post engagement end 238 configured to fit snugly within the post 116, and ending in the other end in the tail extension 216 and extension footer 218. When in the first position, the tail extension 216 is preferably in the first tail slot 232 and the extension footer 218 on the rotatable engagement surface 242.

To transition the adjustable frame 110 from the first position to the second position, a user preferably depresses the locking pin 166 and withdraws the post 116 a portion of the way out of the post opening 146 until the tail extension 216 is removed from the first tail slot 232. The user may then recline the backrest 118, causing the turret rotation surface 248 to slide along the rotatable engagement surface 242 and collar rotation surface 244 until the tail extension 216 is past the divider 236. The post 116 may then be lowered back into the post opening 146 until the tail extension 216 fully enters the second tail slot 234 and the locking pin 166 allowed to re-engage with the manufacturing channel 148. A user may allow the end of the tail extensions 216 to rub along the rotatable engagement surface 242 to find the second tail slot 234, as it would not be visible during adjustment. Thus, it is preferred that the rotatable engagement surface 242 is smooth and rounded.

A portion of the turret 114 preferably extends through the channel 132 (and, when assembled, the porthole 136 in the plate 134) while the channel rotation surface 244 abuts the curved outer surface 246 of the turret 114. Preferably, the length of the channel 132 (measured along its longest side) is less than seventy-five percent of the maximum length of the turret 114 (measured as the diameter through the first and second flat sidewalls 230, 250) to ensure that the collar 130 holds the turret 114 against the base socket 112. The porthole 136 of the plate 134 is preferably rectangular, to tightly surround the turret 114. When the adjustable frame 110 is in the second position with the backrest 118 reclined, the posts 116 may contact the plate 134 at the edges of the porthole 136 to prevent over reclination. Specifically, the post 116 may contact the rear-most of the four sides of the porthole 136.

Figure 43:
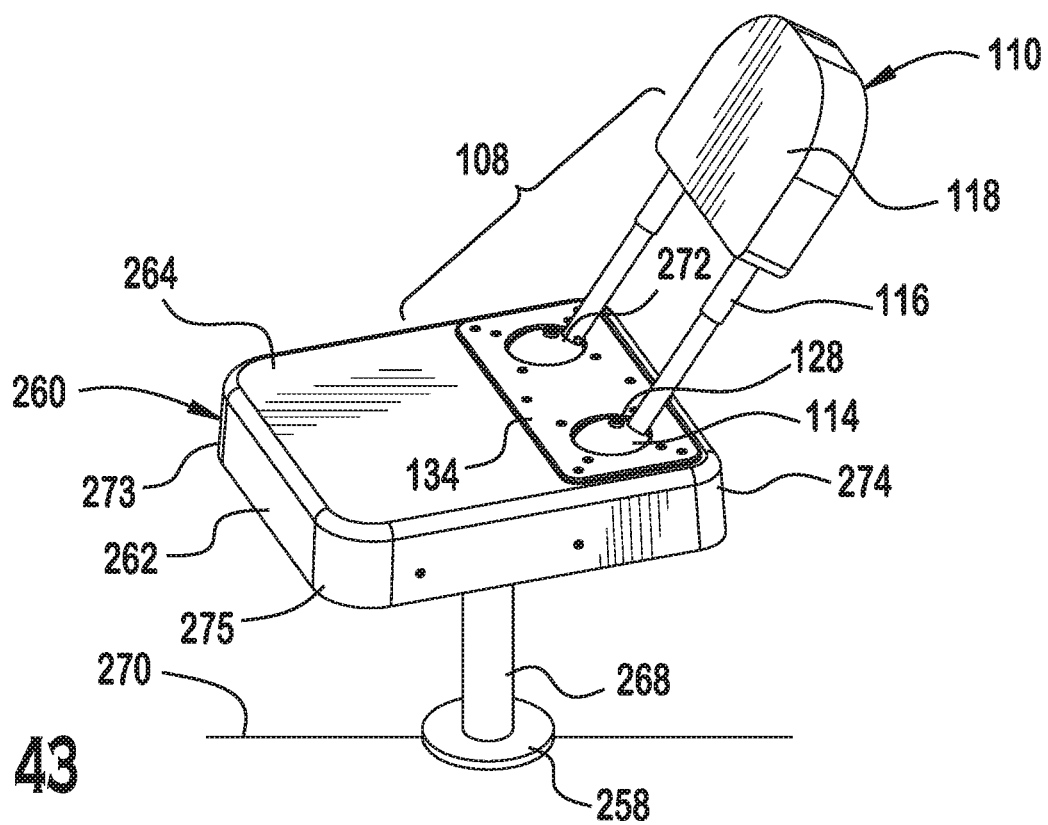
FIG. 43 is a top front left perspective view of a combination seat frame 260 and adjustable frame 100 of a preferred embodiment, wherein the seat frame 260 and adjustable frame 110 combine to form a seat 108. The seat frame 260 preferably includes a seat bottom 262 having an upper seat surface 264 onto which a person 106 might sit. The seat bottom 262 is preferably connected to the adjustable frame 110, with a base socket 112, turret 114, and collar 130 being contained fully or partially within first and second corners 272, 274 of the seat bottom 262. A single plate 134 preferably overlays a portion of the upper seat surface 264, with fasteners 160 connecting the plate 134 to both collars 130 and base sockets 112. A post 116 is preferably inserted into the post opening 146 in each turret 114, with the posts 116 each connecting to a single backrest 118. The backrest 118 may be recline by removing the posts 116 from their respective turrets 114, rotating each turret 114 roughly 180 degrees, and reinserting the posts 116 into their respective turrets 114.
Figure 44:
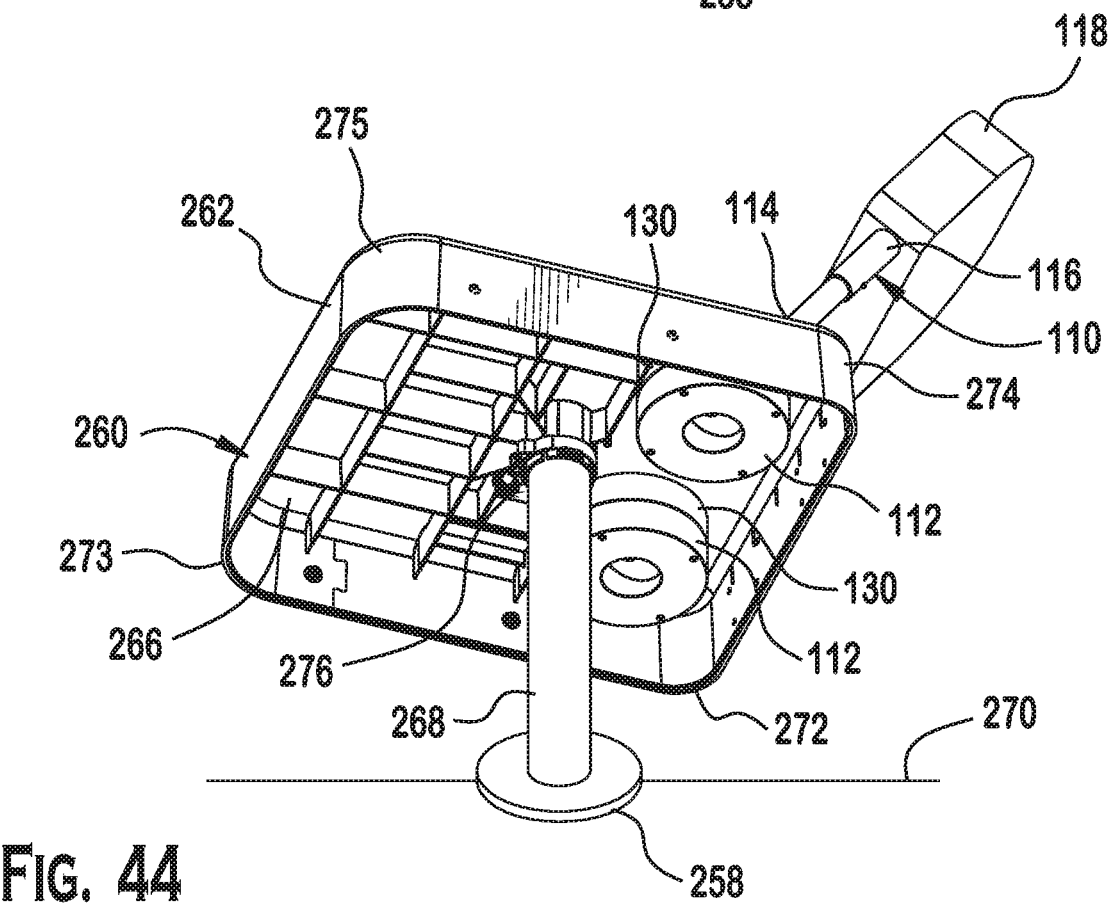
FIG. 44 is a bottom front left perspective view of a combination seat frame 260 and adjustable frame 100 of a preferred embodiment, wherein the seat frame 260 and adjustable frame 110 combine to form a seat 108. The seat frame 260 preferably includes a seat bottom 262 having a lower seat surface 266 opposite the upper seat surface 264. One or more legs 268 preferably can be detachably connected to the lower seat surface 226, to allow the seat frame 260 to be elevated from a support surface 270 onto which a person 106 might sit. In some preferred embodiments, a single leg 268 may be connected to a connection pedestal 276 on the lower seat frame 266, with the leg 268 being connectable on its lower end to a support connection 258 which may be positioned in or on a support surface 270. This support surface 270 may include the ground, boat decking 104, flooring, or any other suitable surface. In other preferred embodiments, the seat frame 260 may include four legs 268 attached to four connection pedestals 276, with a single one of the connection pedestals 276 being positioned on the lower seat surface 226 proximate to a different one of the first corner 272, second corner 274, third corner 273, and fourth corner 275 to provide a solid base to the seat frame 260. Each leg 268 preferably ends in support connection 258, such as a rubber footer, which may be positioned on a support surface 270, such as the ground or boat decking 104, for the seat frame 260 to be stood thereon. In some preferred embodiments, the seat bottom 262 is preferably configured such that the leg(s) 268 and backrest 118 can be stored in the seat bottom 262 for transporting the seat 108.

Referring to FIGS. 43-44, the adjustable frame 110 may be combined with a seat frame 260 to form a seat 108. Specifically, it is preferred that one or more adjustable frames 110 may be positioned within a seat frame 260 The seat frame 260 preferably includes a seat bottom 262 having an upper seat surface 264 onto which a person 106 might sit. The seat bottom 262 is preferably rectangular in shape, defining first and second corners 272, 274 on the rear side of the seat bottom 262 and third and fourth corners 276, 278 at the front side of the seat bottom 262. The seat bottom 262 preferably contains a base socket 112, turret 114, and collar 130 in each of the first and second corners 272, 274. A single plate 134 preferably overlays a portion of the upper seat surface 264, with fasteners 160 connecting the plate 134 to both collars 130 and base sockets 112. A post 116 is preferably inserted into the post opening 146 in each turret 114, with the posts 116 each connecting to a single backrest 118. The backrest 118 may be recline by removing the posts 116 from their respective turrets 114, rotating each turret 114 roughly 180 degrees, and reinserting the posts 116 into their respective turrets 114. Those of ordinary skill in the art will appreciate from this disclosure that the seat bottom may include only a single turret, base socket, and collar without exceeding the scope of this disclosure.

The seat frame 260 preferably also includes a seat bottom 262 having a lower seat surface 266 opposite the upper seat surface 264. One or more legs 268 may be detachably connected to the lower seat surface 226, to allow the seat frame 260 to be elevated from a support surface 270 onto which a person 106 might sit. A connection pedestal 276 may be included on the lower seat frame 266 to connect to the upper end of the leg 268. The lower end of the leg 268 may be connectable to a support connection 258 which may be positioned in or on a support surface 270. This support surface 270 may include the ground, boat decking 104, flooring, or any other suitable surface. The support surface 190 as discussed herein may be any hard, geometrically flat surface, such as a plastic, wood, metal, concrete, or cement flooring. However, those of ordinary skill in the art will appreciate from this disclosure that the support surface 190 is an imagined surface, and the combination 100 may be configured for use on any suitable surface.

In other preferred embodiments, the seat frame 260 may include four legs 268 attached to four connection pedestals 276, with a single one of the connection pedestals 276 being positioned on the lower seat surface 226 proximate to a different one of the first corner 272, second corner 274, third corner 272, and fourth corner 275 to provide a solid base to the seat frame 260. Each leg 268 preferably ends in support connection 258, such as a rubber footer, which may be positioned on a support surface 270, such as the ground or boat decking 104, for the seat frame 260 to be stood thereon. In some preferred embodiments, the seat bottom 262 is preferably configured such that the leg(s) 268 and backrest 118 can be stored in the seat bottom 262 for transporting the seat 108.

The seat bottom 262 is preferably formed of a molded plastic or fiber glass, preferably overlaying a metal seat pan. The lower seat surface 266 is preferably formed by the metal seat pan (preferably stainless steel) and the upper seat surface 264 is preferably formed of the molded plastic of fiber glass. However, in some preferred embodiments, the upper seat surface 264 may include seat cushions, including cushioning material and a vinyl or fabric seat cover. The connection pedestal 276 is preferably formed of stainless steel, to provide a strong connection between the leg(s) 268 and the seat bottom 262 that does not allow the seat bottom 262 to fall from the leg(s) 268. The connection pedestal 276 may include additional elements which may provide a more functional connection between the seat bottom 262 and the leg(s) 268. These additional elements may include bearings which may allow the seat bottom 262 to rotate without disconnecting from the leg(s) 268, a locking mechanism to detachably secure the leg(s) 268 within the connection pedestal 276, and any other suitable elements. The leg(s) 268 are preferably formed of a suitable strong and lightweight material which can support the weight of a user within the normal range of human weights. Preferably, the leg(s) 268 are formed of stainless steel, which may be hollow or solid metal. The leg(s) 268 may also include a mechanism for adjusting the height of the seat bottom 262 relative to the support surface 270, such as a spring lever or hydraulic lift mechanism. Those of ordinary skill in the art will appreciate from this disclosure that the elements of the seat frame 260, including the seat bottom 262, connection pedestal 276, and leg(s) 268, may be formed of any suitable material or combination of materials without exceeding the scope of this disclosure.

Those of ordinary skill in the art will appreciate from this disclosure that any of these additional reinforcement elements may be provided or omitted without exceeding the scope of this disclosure.

A preferred embodiment of the present invention operates as follows. A user first provides a boat 102 with circular openings in the boat decking 104 slightly larger in diameter that that of the base socket 112. The user may position a mounting frame 105 about the openings. To assemble the adjustable frame 110, the user may place a base socket 112, with the turret 114 positioned thereon and a collar 130 covering the turret 114, into the opening, holding the base socket 112 in place while positioning the plate 134 over the opening with the turret 114 protruding through the porthole 136. A user may then drill fasteners 160 through the fastener openings 158 to connect the base socket 112 to the plate 134. In some embodiments, the user may position a second set of base socket 112, collar 130, and turret 114 in an opening in the boat decking 104 proximate to the first to allow the second turret 114 to project through the second porthole 136 in the plate 134. Fasteners 160 may be inserted through the fastener openings 158 in the plate 134 and through the second collar 130 and base socket 112, connecting these elements to one another. A user may then provide a backrest 118 having a backrest sleeve 164, with the user inserting the top ends of the posts 116 into the backrest sleeve 164. The user may then insert the lower ends of the posts 116 into the post openings 148 in the turrets 114 until the locking pins 166 secure the posts 116 in place. When the adjustable frame 110 is assembled, the adjustable frame 110 preferably begins in the first position.

To convert the adjustable frame 110 to the second position, a user must first depress the locking pins 166 and lift the posts 116 (and, at the same time, the backrest 118) upward until the posts 116 are fully removed from the post openings 148. The user may then grasp the bumpers 128 to rotate each turret 114 one hundred and eighty degrees. Each turret 114 may be rotated about their respective central turret axis 142 until the rotation stop 157 in each groove 154 contacts the rotation guide pin 126 in each base socket 112, halting circular motion. The posts 118 may then be inserted back into the post openings 146, with the posts 118 now being positioned proximate to the rear side of the portholes 136 rather than the bumpers 128. The posts 116 may then be re-inserted into the post openings 146 until the locking pins 166 engage the manufacturing channels 148 in the turrets 114, securing the backrest 118 at the second angle 182. While the back rest 118 is reclined when in the second position, leaning back in the reclining direction 192, the forward directed surface 174 preferably remains facing in the same direction when in the first and second positions, namely facing the viewing direction 172. The user may transition the adjustable frame into the first configuration by removing the 116 posts and rotating the turrets 114 one hundred and eighty degrees in the opposite direction and reinserting the posts 116 into the post openings 146. The posts 116 may also be removed so the backrest 118 and posts 116 may be stored in lockers on the boat 102.

In an alternate embodiment, one method of use of the present invention may operate as follows. The user may provide a seat bottom 262 having an upper seat surface 264 configured for sitting and a lower seat surface 266 including a connection pedestal 276. The seat bottom 262 preferably includes an adjustable frame 110 in each of the first and second corners 272, 274. A user may position a leg 268 in the connection pedestal 276, before placing the lower end of the leg 268 into a support connection 258 in a support surface 270. The user may then insert posts 116 into the post openings 146 in the turrets 114, assembling the combination seat frame 260 and adjustable frame 110. To transition the adjustable frame 110 into the second configuration, a user may first depress the locking pins 166 and lift the posts 116 (and, at the same time, the backrest 118) upward until the posts 116 are fully removed from the post openings 146. The user may then grasp the bumpers 128 to rotate each turret 114 one hundred and eighty degrees. Each turret 114 may be rotated about their respective central turret axis 142 until the rotation stop 157 in each groove 154 contacts the rotation guide pin 126 in each base socket 112, halting circular motion. The posts 118 may then be inserted back into the post openings 146, with the posts 118 now being positioned proximate to the rear side of the portholes 136 rather than the bumpers 128. The posts 116 may then be re-inserted into the post openings 146 until the locking pins 166 engage the manufacturing channels 148 in the turrets 114, securing the backrest 118 at the second angle 182. While the back rest 118 is reclined when in the second position, leaning back in the reclining direction 192, the forward directed surface 174 preferably remains facing in the same direction when in the first and second positions, namely the viewing direction 172. The user may transition the adjustable frame into the first position by removing the posts 116 and rotating the turrets 114 one hundred and eighty degrees in the opposite direction and reinserting the posts 116 into the post openings 146.

To disassemble the combination seat frame 260 and adjustable frame 110, the user may remove the posts 116, then lift the seat frame 260 so the leg 268 is removed from the connection pedestal 176. The user may then remove the leg 268 from the support connection 258. The backrest 118, posts 116, seat frame 260, and leg(s) 268 may then be stored in a collapsed manner.

It is recognized by those skilled in the art that changes may be made to the above described methods and structures without departing from the broad inventive concept thereof. It is understood, therefore, that this invention is not limited to the particular embodiments disclosed, but is intended to cover all modifications which are within the spirit and scope of the invention as defined by the above specification, the appended claims and/or shown in the attached drawings.

What is claimed is:

1. An adjustable frame configured to support a backrest, comprising: a base socket defining an engagement surface, when viewed in cross section the engagement surface is angled relative to a horizontal plane; a turret having a flat section, the turret being positioned on the base socket with flat section abutting the engagement surface; a post disposed on or in the turret, the post being configured to engage the backrest; and wherein the turret being rotatable on the base socket between a first position, in which the post forms a first angle with the horizontal plane, and a second position, in which the post forms a second angle with the horizontal plane, the first angle being different from the second angle.

2. The adjustable frame of claim 1, wherein the turret is rotated one hundred and eighty degrees about a vertical axis to move from the first position to the second position, the post having a central axis, the central axis of the post being positioned on a same side of a vertical plane intersecting therewith such that the adjustable frame is configured to support the backrest at any one of the first angle and the second angle with a person facing in a same direction while sitting and using the backrest.

3. The adjustable frame of claim 1, wherein the backrest has a forward directed surface and wherein the turret is rotated one hundred and eighty degrees about a vertical axis to move from the first position to the second position, the turret and the base socket being configured such that the adjustable frame is configured to support the backrest at any one of the first angle and the second angle such that the forward directed surface faces in a same viewing direction regardless of whether the turret is in the first position or the second position.

4. The adjustable frame of claim 1, wherein the turret is rotated one hundred and eighty degrees about a vertical axis to move from the first position to the second position, the turret and the base socket being configured such that the adjustable frame is configured to support the backrest at any one of the first angle and the second angle such that a person using the backrest would face in a same direction regardless of whether the turret is in the first position or the second position.

5. The adjustable frame of claim 4, wherein, when viewed in cross-section, the turret has a central turret axis which is inclined at a third angle relative to the horizontal plane, the post and the central post axis rotating about the central turret axis when the turret is moved from the first position to the second position.

6. The adjustable frame of claim 5, wherein, when the turret is in the first position the central post axis is aligned at a fourth angle relative to the vertical axis and the central turret axis is aligned at a fifth angle relative to the central post axis in a direction away from the vertical axis such that the backrest is reclined at the fourth angle relative to the vertical axis, when the turret is in the second position the backrest is reclined at a more reclined angle equal to the sum of twice the fifth angle and the fourth angle relative to the vertical axis.

7. The adjustable frame of claim 6, wherein the turret defines a groove therein, the groove providing a guide track which is engageable by the base socket, the guide track controlling the rotation of the turret relative to the base socket, the guide track allowing rotation between the first position and the second position along one side of the base socket but not the other such that the turret is not rotated past the first position or the second position when being moved therein.

8. The adjustable frame of claim 6, wherein the base socket defines a rotation surface which is parallel to the engagement surface and connected thereto by a sidewall surface, the sidewall surface and the engagement surface combining to form a turret seat.

9. The adjustable frame of claim 8, wherein the turret comprises a main turret body and a turret base which defines the flat section, the turret base being configured to project from the main turret body and is configured to nest within the turret seat of the base socket such that the flat section of the turret base abuts the engagement surface of the base socket, a portion of the main turret body abuts the rotation surface of the base socket.

10. The adjustable frame of claim 9, wherein the main turret body has a generally hemispherical shape.

11. The adjustable frame of claim 9, further comprising a collar defining a channel therethrough, the collar being disposed on the base socket and about the turret such that a portion of the turret extends from the channel to project outwardly from the collar in a direction away from the base socket, the collar and the base socket combining to secure the turret to the base socket such that the flat section of the turret is maintained in abutment with the engagement surface of the base socket, the turret generally only being capable of rotational movement about the central turret axis.

12. The adjustable frame of claim 11, further comprising a plate disposed on an opposite side of the collar from the base socket, the plate defining a porthole through which at least some of the portion of the turret extends.

13. The adjustable frame of claim 12, further comprising a bumper disposed on the turret, the bumper being located on the at least some of the portion of the turret, wherein when the turret is in the first position the bumper is adjacent to the plate and configured to contact the plate when a pressure is applied in a reclining direction on the backrest.

14. The adjustable frame of claim 13, wherein when the turret is in the second position the post is adjacent to the plate to support the turret against torque resulting from a pressure applied in a reclining direction onto the backrest due to contact between the post and the plate.

15. The adjustable frame of claim 14, wherein the fourth angle is preferably between three (3) degrees and twenty (20) degrees and the fifth angle is between five (5) degrees and twenty-five (25) degrees.

16. The adjustable frame of claim 15, wherein the fourth angle is ten (10) degrees and the fifth angle is twelve and a half (12.5) degrees.

17. The adjustable frame of claim 11, further comprising two of each of: (1) the base socket; (2) the turret; (3) the collar; and (4) the post, the two posts being configured to engage the backrest.

18. A combination of a boat and an adjustable frame, comprising:
 the boat having boat decking;
 the adjustable frame of claim 17 being engaged with the boat decking; and
 wherein the boat decking and the backrest combine to form a seat.

19. A combination of a vehicle and an adjustable frame, comprising:
 the vehicle defining a surface;
 the adjustable frame of claim 17 being engaged with the surface; and
 wherein the surface and the backrest combine to form a seat.

20. A combination of a seat frame and an adjustable frame, comprising:
 a seat frame comprising a seat bottom having an upper seat surface and a lower surface, at least one leg connected to the lower surface, and the at least one leg being connectible to a support connection;
 the adjustable frame of claim 17 being engaged with the seat frame; and
 wherein the seat frame and the adjustable frame combine to form a seat.

* * * * *